(12) United States Patent
Lambourne et al.

(10) Patent No.: US 12,154,569 B2
(45) Date of Patent: *Nov. 26, 2024

(54) HOME GRAPH

(71) Applicant: Sonos, Inc., Santa Barbara, CA (US)

(72) Inventors: Robert Lambourne, Santa Barbara, CA (US); Dayn Wilberding, Portland, OR (US); Jeffrey Torgerson, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/310,025

(22) Filed: May 1, 2023

(65) Prior Publication Data

US 2023/0326458 A1 Oct. 12, 2023

Related U.S. Application Data

(63) Continuation of application No. 17/077,974, filed on Oct. 22, 2020, now Pat. No. 11,676,590, which is a
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/08* (2013.01); *H04R 3/005* (2013.01);
(Continued)

(58) Field of Classification Search
CPC ......... G10L 15/20; G10L 15/22; G10L 15/30; G06F 3/167
See application file for complete search history.

(56) References Cited

U.S. PATENT DOCUMENTS 999,715 A 8/1911 Gundersen
5,717,768 A 2/1998 Laroche
(Continued)

FOREIGN PATENT DOCUMENTS

CN 1323435 A 11/2001
CN 1748250 A 3/2006
(Continued)

OTHER PUBLICATIONS

Non-Final Office Action mailed on Sep. 2, 2021, issued in connection with U.S. Appl. No. 16/947,895, filed Aug. 24, 2020, 16 pages.
(Continued)

*Primary Examiner* — Daniel Abebe
(74) *Attorney, Agent, or Firm* — Fortem IP LLP

(57) ABSTRACT

Example techniques involve a control hierarchy for a "smart" home having smart appliances and related devices, such as wireless illumination devices, home-automation devices (e.g., thermostats, door locks, etc.), and audio playback devices, among others. An example home includes various rooms in which smart devices might be located. Under the example control hierarchy described herein and referred to as "home graph," a name of a room (e.g., "Kitchen") may represent a smart device (or smart devices) within that room. In other words, from the perspective of a user, the smart devices within a room are that room. This hierarchy permits a user to refer to a smart device within a given room by way of the name of the room when controlling smart devices within the home using a voice user interface (VUI) or graphical user interface (GUI).

20 Claims, 31 Drawing Sheets

Related U.S. Application Data continuation of application No. 16/216,357, filed on Dec. 11, 2018, now Pat. No. 10,818,290.

(60) Provisional application No. 62/597,355, filed on Dec. 11, 2017.

(51) Int. Cl.
   *G10L 15/08* (2006.01)
   *H04R 3/00* (2006.01)
   *H04R 3/12* (2006.01)
   *H04R 5/04* (2006.01)

(52) U.S. Cl.
   CPC ............... *H04R 3/12* (2013.01); *H04R 5/04* (2013.01); *G10L 2015/088* (2013.01); *G10L 2015/223* (2013.01)

(56) References Cited

U.S. PATENT DOCUMENTS

| | | |
|---|---|---|
| 5,857,172 A | 1/1999 | Rozak |
| 6,070,140 A | 5/2000 | Tran |
| 6,219,645 B1 | 4/2001 | Byers |
| 7,516,068 B1 | 4/2009 | Clark |
| 7,705,565 B2 | 4/2010 | Patino et al. |
| 8,085,947 B2 | 12/2011 | Haulick et al. |
| 8,233,632 B1 | 7/2012 | MacDonald et al. |
| 8,325,909 B2 | 12/2012 | Tashev et al. |
| 8,594,320 B2 | 11/2013 | Faller |
| 8,620,232 B2 | 12/2013 | Helsloot |
| 8,639,214 B1 | 1/2014 | Fujisaki |
| 8,676,273 B1 | 3/2014 | Fujisaki |
| 8,719,039 B1 | 5/2014 | Sharifi |
| 8,762,156 B2 | 6/2014 | Chen |
| 8,768,712 B1 | 7/2014 | Sharifi |
| 8,898,063 B1 | 11/2014 | Sykes et al. |
| 8,983,383 B1 | 3/2015 | Haskin |
| 9,002,024 B2 | 4/2015 | Nakadai et al. |
| 9,047,857 B1 | 6/2015 | Barton |
| 9,070,367 B1 | 6/2015 | Hoffmeister et al. |
| 9,088,336 B2 | 7/2015 | Mani et al. |
| 9,183,845 B1 | 11/2015 | Gopalakrishnan et al. |
| 9,313,317 B1 | 4/2016 | Lebeau et al. |
| 9,354,687 B2 | 5/2016 | Bansal et al. |
| 9,361,885 B2 | 6/2016 | Ganong, III et al. |
| 9,443,516 B2 | 9/2016 | Katuri et al. |
| 9,491,033 B1 | 11/2016 | Soyannwo et al. |
| 9,514,747 B1 | 12/2016 | Bisani et al. |
| 9,532,139 B1 | 12/2016 | Lu et al. |
| 9,542,941 B1 | 1/2017 | Weksler et al. |
| 9,558,755 B1 | 1/2017 | Laroche et al. |
| 9,640,194 B1 | 5/2017 | Nemala et al. |
| 9,672,812 B1 | 6/2017 | Watanabe et al. |
| 9,691,384 B1 | 6/2017 | Wang et al. |
| 9,706,320 B2 | 7/2017 | Starobin et al. |
| 9,749,738 B1 | 8/2017 | Adsumilli et al. |
| 9,756,422 B2 | 9/2017 | Paquier et al. |
| 9,767,786 B2 | 9/2017 | Starobin et al. |
| 9,779,732 B2 | 10/2017 | Lee et al. |
| 9,779,734 B2 | 10/2017 | Lee |
| 9,781,532 B2 | 10/2017 | Sheen |
| 9,799,330 B2 | 10/2017 | Nemala et al. |
| 9,805,733 B2 | 10/2017 | Park |
| 9,812,128 B2 | 11/2017 | Mixter et al. |
| 9,875,740 B1 | 1/2018 | Kumar et al. |
| 9,898,250 B1 | 2/2018 | Williams et al. |
| 9,899,021 B1 | 2/2018 | Vitaladevuni et al. |
| 9,916,839 B1 | 3/2018 | Scalise et al. |
| 9,992,642 B1 | 6/2018 | Rapp et al. |
| 10,025,447 B1 | 7/2018 | Dixit et al. |
| 10,028,069 B1 | 7/2018 | Lang |
| 10,038,419 B1 | 7/2018 | Elliot et al. |
| 10,074,371 B1 | 9/2018 | Wang et al. |
| 10,089,981 B1 | 10/2018 | Elangovan et al. |
| 10,134,388 B1 | 11/2018 | Lilly |
| 10,134,398 B2 | 11/2018 | Sharifi |
| 10,157,042 B1 | 12/2018 | Jayakumar et al. |
| 10,186,266 B1 | 1/2019 | Devaraj et al. |
| 10,186,276 B2 | 1/2019 | Dewasurendra et al. |
| 10,204,624 B1 | 2/2019 | Knudson et al. |
| 10,229,680 B1 | 3/2019 | Gillespie et al. |
| 10,241,754 B1 | 3/2019 | Kadarundalagi Raghuram Doss et al. |
| 10,249,205 B2 | 4/2019 | Hammersley et al. |
| 10,304,440 B1 | 5/2019 | Panchapagesan et al. |
| 10,304,475 B1 | 5/2019 | Wang et al. |
| 10,318,236 B1 | 6/2019 | Pal et al. |
| 10,332,508 B1 | 6/2019 | Hoffmeister |
| 10,339,957 B1 | 7/2019 | Chenier et al. |
| 10,354,658 B2 | 7/2019 | Wilberding |
| 10,424,296 B2 | 9/2019 | Penilla et al. |
| 10,445,365 B2 | 10/2019 | Luke et al. |
| 10,515,625 B1 | 12/2019 | Metallinou et al. |
| 10,565,999 B2 | 1/2020 | Wilberding |
| 10,565,998 B2 | 2/2020 | Wilberding |
| 10,573,312 B1 | 2/2020 | Thomson et al. |
| 10,580,405 B1 | 3/2020 | Wang et al. |
| 10,586,534 B1 | 3/2020 | Argyropoulos et al. |
| 10,593,328 B1 | 3/2020 | Wang et al. |
| 10,593,330 B2 | 3/2020 | Sharifi |
| 10,600,406 B1 | 3/2020 | Shapiro et al. |
| 10,621,981 B2 | 4/2020 | Sereshki |
| 10,623,811 B1 | 4/2020 | Cwik |
| 10,643,609 B1 | 5/2020 | Pogue et al. |
| 10,685,669 B1 | 6/2020 | Lan et al. |
| 10,699,711 B2 | 6/2020 | Reilly |
| 10,706,843 B1 | 7/2020 | Elangovan et al. |
| 10,720,173 B2 | 7/2020 | Freeman et al. |
| 10,728,196 B2 | 7/2020 | Wang |
| 10,735,870 B2 | 8/2020 | Ballande et al. |
| 10,746,840 B1 | 8/2020 | Barton et al. |
| 10,748,531 B2 | 8/2020 | Kim |
| 10,777,189 B1 | 9/2020 | Fu et al. |
| 10,777,203 B1 | 9/2020 | Pasko |
| 10,789,041 B2 | 9/2020 | Kim et al. |
| 10,797,667 B2 | 10/2020 | Fish et al. |
| 10,824,682 B2 | 11/2020 | Alvares et al. |
| 10,825,471 B2 | 11/2020 | Walley et al. |
| 10,837,667 B2 | 11/2020 | Nelson et al. |
| 10,847,137 B1 | 11/2020 | Mandal et al. |
| 10,847,149 B1 | 11/2020 | Mok et al. |
| 10,847,164 B2 | 11/2020 | Wilberding |
| 10,867,596 B2 | 12/2020 | Yoneda et al. |
| 10,867,604 B2 | 12/2020 | Smith et al. |
| 10,871,943 B1 | 12/2020 | D'Amato et al. |
| 10,878,811 B2 | 12/2020 | Smith et al. |
| 10,878,826 B2 | 12/2020 | Li et al. |
| 10,911,596 B1 | 2/2021 | Do et al. |
| 10,964,314 B2 | 3/2021 | Jazi et al. |
| 11,024,311 B2 | 6/2021 | Mixter et al. |
| 11,025,569 B2 | 6/2021 | Lind et al. |
| 11,050,615 B2 | 6/2021 | Mathews et al. |
| 11,062,705 B2 | 7/2021 | Watanabe et al. |
| 11,100,923 B2 | 8/2021 | Fainberg et al. |
| 11,127,405 B1 | 9/2021 | Antos et al. |
| 11,137,979 B2 | 10/2021 | Plagge |
| 11,138,969 B2 | 10/2021 | D'Amato |
| 11,159,878 B1 | 10/2021 | Chatlani et al. |
| 11,172,328 B2 | 11/2021 | Soto et al. |
| 11,172,329 B2 | 11/2021 | Soto et al. |
| 11,175,880 B2 | 11/2021 | Liu et al. |
| 11,184,704 B2 | 11/2021 | Jarvis et al. |
| 11,206,052 B1 | 12/2021 | Park et al. |
| 11,212,612 B2 | 12/2021 | Lang et al. |
| 11,264,019 B2 | 3/2022 | Bhattacharya et al. |
| 11,277,512 B1 | 3/2022 | Leeds et al. |
| 11,315,556 B2 | 4/2022 | Smith et al. |
| 11,354,092 B2 | 6/2022 | D'Amato et al. |
| 11,361,763 B1 | 6/2022 | Maas et al. |
| 11,373,645 B1 | 6/2022 | Mathew et al. |
| 11,411,763 B2 | 8/2022 | Mackay et al. |
| 11,445,301 B2 | 9/2022 | Park et al. |
| 11,514,898 B2 | 11/2022 | Millington |

(56) References Cited

U.S. PATENT DOCUMENTS

| | | |
|---|---|---|
| 11,531,520 B2 | 11/2022 | Wilberding |
| 2001/0003173 A1 | 6/2001 | Lim |
| 2002/0046023 A1 | 4/2002 | Fujii et al. |
| 2002/0054685 A1 | 5/2002 | Avendano et al. |
| 2002/0055950 A1 | 5/2002 | Witteman |
| 2002/0143532 A1 | 10/2002 | McLean et al. |
| 2003/0097482 A1 | 5/2003 | DeHart et al. |
| 2004/0153321 A1 | 8/2004 | Chung et al. |
| 2004/0161082 A1 | 8/2004 | Brown et al. |
| 2005/0033582 A1 | 2/2005 | Gadd et al. |
| 2005/0254662 A1 | 11/2005 | Blank et al. |
| 2007/0038461 A1 | 2/2007 | Abbott et al. |
| 2007/0038999 A1 | 2/2007 | Millington |
| 2007/0060054 A1 | 3/2007 | Romesburg |
| 2007/0286426 A1 | 12/2007 | Xiang et al. |
| 2008/0008333 A1 | 1/2008 | Nishikawa et al. |
| 2008/0031466 A1 | 2/2008 | Buck et al. |
| 2008/0144858 A1 | 6/2008 | Khawand et al. |
| 2008/0160977 A1 | 7/2008 | Ahmaniemi et al. |
| 2008/0192946 A1 | 8/2008 | Faller |
| 2008/0291916 A1 | 11/2008 | Xiong et al. |
| 2009/0013255 A1 | 1/2009 | Yuschik et al. |
| 2009/0046866 A1 | 2/2009 | Feng et al. |
| 2009/0113053 A1 | 4/2009 | Van Wie et al. |
| 2009/0191854 A1 | 7/2009 | Beason |
| 2009/0214048 A1 | 8/2009 | Stokes, III et al. |
| 2009/0299745 A1 | 12/2009 | Kennewick et al. |
| 2009/0323924 A1 | 12/2009 | Tashev et al. |
| 2010/0041443 A1 | 2/2010 | Yokota |
| 2010/0070276 A1 | 3/2010 | Wasserblat et al. |
| 2010/0179806 A1 | 7/2010 | Zhang et al. |
| 2010/0260348 A1 | 10/2010 | Bhow et al. |
| 2010/0278351 A1 | 11/2010 | Fozunbal et al. |
| 2010/0299639 A1 | 11/2010 | Ramsay et al. |
| 2010/0329472 A1 | 12/2010 | Nakadai et al. |
| 2010/0332236 A1 | 12/2010 | Tan |
| 2011/0019833 A1 | 1/2011 | Kuech et al. |
| 2011/0046952 A1 | 2/2011 | Koshinaka |
| 2011/0131032 A1 | 6/2011 | Yang, II et al. |
| 2011/0176687 A1 | 7/2011 | Birkenes |
| 2012/0009906 A1 | 1/2012 | Patterson et al. |
| 2012/0020485 A1 | 1/2012 | Visser et al. |
| 2012/0027218 A1 | 2/2012 | Every et al. |
| 2012/0076308 A1 | 3/2012 | Kuech et al. |
| 2012/0224457 A1 | 9/2012 | Kim et al. |
| 2012/0237047 A1 | 9/2012 | Neal et al. |
| 2012/0245941 A1 | 9/2012 | Cheyer |
| 2012/0265528 A1 | 10/2012 | Gruber et al. |
| 2012/0288100 A1 | 11/2012 | Cho |
| 2013/0051755 A1 | 2/2013 | Brown et al. |
| 2013/0073293 A1 | 3/2013 | Jang et al. |
| 2013/0080167 A1 | 3/2013 | Mozer |
| 2013/0080171 A1 | 3/2013 | Mozer et al. |
| 2013/0129100 A1 | 5/2013 | Sorensen |
| 2013/0185639 A1 | 7/2013 | Lim |
| 2013/0230184 A1 | 9/2013 | Kuech et al. |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1 | 11/2013 | Yoo et al. |
| 2013/0301840 A1 | 11/2013 | Yemdji et al. |
| 2013/0322634 A1 | 12/2013 | Bennett et al. |
| 2013/0336499 A1 | 12/2013 | Beckhardt et al. |
| 2013/0343567 A1 | 12/2013 | Triplett et al. |
| 2014/0056435 A1 | 2/2014 | Nems et al. |
| 2014/0064476 A1 | 3/2014 | Mani et al. |
| 2014/0108010 A1 | 4/2014 | Maltseff et al. |
| 2014/0126745 A1 | 5/2014 | Dickins et al. |
| 2014/0149118 A1 | 5/2014 | Lee et al. |
| 2014/0159581 A1 | 6/2014 | Pruemmer et al. |
| 2014/0161263 A1 | 6/2014 | Koishida et al. |
| 2014/0167929 A1 | 6/2014 | Shim et al. |
| 2014/0172899 A1 | 6/2014 | Hakkani-Tur et al. |
| 2014/0181199 A1 | 6/2014 | Kumar et al. |
| 2014/0188476 A1 | 7/2014 | Li et al. |
| 2014/0200881 A1 | 7/2014 | Chatlani |
| 2014/0229959 A1 | 8/2014 | Beckhardt et al. |
| 2014/0244269 A1 | 8/2014 | Tokutake |
| 2014/0270216 A1 | 9/2014 | Tsilfidis et al. |
| 2014/0278343 A1 | 9/2014 | Tran |
| 2014/0278372 A1 | 9/2014 | Nakadai et al. |
| 2014/0278445 A1* | 9/2014 | Eddington, Jr. ........ G10L 15/20 704/275 |
| 2014/0278933 A1 | 9/2014 | McMillan |
| 2014/0288686 A1 | 9/2014 | Sant et al. |
| 2014/0303969 A1 | 10/2014 | Inose et al. |
| 2014/0324203 A1 | 10/2014 | Coburn, IV et al. |
| 2014/0328490 A1 | 11/2014 | Mohammad et al. |
| 2014/0330896 A1 | 11/2014 | Addala et al. |
| 2014/0334645 A1 | 11/2014 | Yun et al. |
| 2014/0358535 A1 | 12/2014 | Lee et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0030172 A1 | 1/2015 | Gaensler et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0039317 A1 | 2/2015 | Klein et al. |
| 2015/0058018 A1 | 2/2015 | Georges et al. |
| 2015/0066479 A1 | 3/2015 | Pasupalak et al. |
| 2015/0073807 A1 | 3/2015 | Kumar |
| 2015/0088500 A1 | 3/2015 | Conliffe |
| 2015/0126255 A1 | 5/2015 | Yang et al. |
| 2015/0154953 A1 | 6/2015 | Bapat et al. |
| 2015/0170665 A1 | 6/2015 | Gundeti et al. |
| 2015/0200923 A1 | 7/2015 | Triplett |
| 2015/0221307 A1 | 8/2015 | Shah et al. |
| 2015/0243287 A1 | 8/2015 | Nakano et al. |
| 2015/0373100 A1 | 12/2015 | Kravets et al. |
| 2015/0382128 A1 | 12/2015 | Ridihalgh et al. |
| 2016/0018873 A1 | 1/2016 | Fernald et al. |
| 2016/0027440 A1 | 1/2016 | Gelfenbeyn et al. |
| 2016/0034448 A1 | 2/2016 | Tran |
| 2016/0035337 A1 | 2/2016 | Aggarwal et al. |
| 2016/0055847 A1 | 2/2016 | Dahan |
| 2016/0055850 A1 | 2/2016 | Nakadai et al. |
| 2016/0066087 A1 | 3/2016 | Solbach et al. |
| 2016/0070526 A1 | 3/2016 | Sheen |
| 2016/0077794 A1 | 3/2016 | Kim et al. |
| 2016/0088036 A1 | 3/2016 | Corbin et al. |
| 2016/0093281 A1 | 3/2016 | Kuo et al. |
| 2016/0104480 A1 | 4/2016 | Sharifi |
| 2016/0134924 A1 | 5/2016 | Bush et al. |
| 2016/0140957 A1 | 5/2016 | Duta et al. |
| 2016/0148612 A1 | 5/2016 | Guo et al. |
| 2016/0148615 A1 | 5/2016 | Lee et al. |
| 2016/0155443 A1 | 6/2016 | Khan et al. |
| 2016/0192099 A1 | 6/2016 | Oishi et al. |
| 2016/0212488 A1 | 7/2016 | Os et al. |
| 2016/0217789 A1 | 7/2016 | Lee et al. |
| 2016/0299737 A1 | 10/2016 | Clayton et al. |
| 2016/0372113 A1 | 12/2016 | David et al. |
| 2016/0379635 A1 | 12/2016 | Page |
| 2017/0025124 A1 | 1/2017 | Mixter et al. |
| 2017/0032244 A1 | 2/2017 | Kurata |
| 2017/0040002 A1 | 2/2017 | Basson et al. |
| 2017/0053648 A1 | 2/2017 | Chi |
| 2017/0053650 A1 | 2/2017 | Ogawa |
| 2017/0076726 A1 | 3/2017 | Bae |
| 2017/0083606 A1 | 3/2017 | Mohan |
| 2017/0084278 A1 | 3/2017 | Jung |
| 2017/0090864 A1 | 3/2017 | Jorgovanovic |
| 2017/0103748 A1 | 4/2017 | Weissberg et al. |
| 2017/0110130 A1 | 4/2017 | Sharifi et al. |
| 2017/0133011 A1 | 5/2017 | Chen et al. |
| 2017/0140750 A1 | 5/2017 | Wang et al. |
| 2017/0140757 A1 | 5/2017 | Penilla et al. |
| 2017/0151930 A1 | 6/2017 | Boesen |
| 2017/0164139 A1 | 6/2017 | Deselaers et al. |
| 2017/0186425 A1 | 6/2017 | Dawes et al. |
| 2017/0186427 A1 | 6/2017 | Wang et al. |
| 2017/0236512 A1 | 8/2017 | Williams et al. |

(56) References Cited

U.S. PATENT DOCUMENTS

| | | |
|---|---|---|
| 2017/0242656 A1 | 8/2017 | Plagge et al. |
| 2017/0269900 A1 | 9/2017 | Triplett |
| 2017/0269975 A1 | 9/2017 | Wood et al. |
| 2017/0300289 A1 | 10/2017 | Gattis |
| 2017/0300990 A1 | 10/2017 | Tanaka et al. |
| 2017/0329397 A1 | 11/2017 | Lin |
| 2017/0331869 A1 | 11/2017 | Bendahan et al. |
| 2017/0357390 A1 | 12/2017 | Alonso Ruiz et al. |
| 2017/0364371 A1 | 12/2017 | Nandi et al. |
| 2017/0365247 A1 | 12/2017 | Ushakov |
| 2017/0374552 A1 | 12/2017 | Xia et al. |
| 2018/0012077 A1 | 1/2018 | Laska et al. |
| 2018/0018965 A1 | 1/2018 | Daley |
| 2018/0033429 A1 | 2/2018 | Makke et al. |
| 2018/0033438 A1 | 2/2018 | Toma et al. |
| 2018/0061409 A1 | 3/2018 | Valentine et al. |
| 2018/0061419 A1 | 3/2018 | Melendo Casado et al. |
| 2018/0061420 A1 | 3/2018 | Patil et al. |
| 2018/0096678 A1 | 4/2018 | Zhou et al. |
| 2018/0108351 A1 | 4/2018 | Beckhardt et al. |
| 2018/0137857 A1 | 5/2018 | Zhou et al. |
| 2018/0139512 A1 | 5/2018 | Moran et al. |
| 2018/0152557 A1 | 5/2018 | White et al. |
| 2018/0158454 A1 | 6/2018 | Campbell et al. |
| 2018/0182383 A1 | 6/2018 | Kim et al. |
| 2018/0182397 A1* | 6/2018 | Carbune ............. G10L 15/22 |
| 2018/0182410 A1 | 6/2018 | Kaskari et al. |
| 2018/0188948 A1 | 7/2018 | Ouyang et al. |
| 2018/0190274 A1 | 7/2018 | Kirazci et al. |
| 2018/0196776 A1 | 7/2018 | Hershko et al. |
| 2018/0199130 A1 | 7/2018 | Jaffe et al. |
| 2018/0204569 A1 | 7/2018 | Nadkar et al. |
| 2018/0211665 A1 | 7/2018 | Park et al. |
| 2018/0233130 A1 | 8/2018 | Kaskari et al. |
| 2018/0233137 A1 | 8/2018 | Torok et al. |
| 2018/0233141 A1 | 8/2018 | Solomon et al. |
| 2018/0233142 A1 | 8/2018 | Koishida et al. |
| 2018/0233150 A1 | 8/2018 | Gruenstein et al. |
| 2018/0260680 A1 | 9/2018 | Finkelstein et al. |
| 2018/0261213 A1 | 9/2018 | Arik et al. |
| 2018/0270573 A1 | 9/2018 | Lang et al. |
| 2018/0270575 A1 | 9/2018 | Akutagawa |
| 2018/0277119 A1 | 9/2018 | Baba et al. |
| 2018/0286394 A1 | 10/2018 | Li et al. |
| 2018/0286414 A1 | 10/2018 | Ravindran et al. |
| 2018/0293221 A1 | 10/2018 | Finkelstein et al. |
| 2018/0301147 A1 | 10/2018 | Kim |
| 2018/0322891 A1 | 11/2018 | Van Den Oord et al. |
| 2018/0330727 A1 | 11/2018 | Tulli |
| 2018/0336892 A1* | 11/2018 | Kim .................. G10L 15/30 |
| 2018/0349093 A1 | 12/2018 | McCarty et al. |
| 2018/0350356 A1* | 12/2018 | Garcia ............... G10L 15/20 |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0356962 A1 | 12/2018 | Corbin |
| 2018/0358019 A1 | 12/2018 | Mont-Reynaud |
| 2019/0013019 A1 | 1/2019 | Lawrence |
| 2019/0019112 A1 | 1/2019 | Gelfenbeyn et al. |
| 2019/0035404 A1 | 1/2019 | Gabel et al. |
| 2019/0037173 A1 | 1/2019 | Lee |
| 2019/0043488 A1 | 2/2019 | Bocklet et al. |
| 2019/0044745 A1 | 2/2019 | Knudson et al. |
| 2019/0051298 A1 | 2/2019 | Lee et al. |
| 2019/0066680 A1 | 2/2019 | Woo et al. |
| 2019/0066687 A1 | 2/2019 | Wood et al. |
| 2019/0066710 A1 | 2/2019 | Bryan et al. |
| 2019/0073999 A1 | 3/2019 | Prémont et al. |
| 2019/0081810 A1 | 3/2019 | Jung |
| 2019/0087455 A1 | 3/2019 | He et al. |
| 2019/0096408 A1 | 3/2019 | Li et al. |
| 2019/0122662 A1 | 4/2019 | Chang et al. |
| 2019/0156847 A1 | 5/2019 | Bryan et al. |
| 2019/0172467 A1 | 6/2019 | Kim et al. |
| 2019/0172476 A1 | 6/2019 | Wung et al. |
| 2019/0186937 A1 | 6/2019 | Sharifi et al. |
| 2019/0188328 A1 | 6/2019 | Oyenan et al. |
| 2019/0189117 A1 | 6/2019 | Kumar |
| 2019/0206391 A1 | 7/2019 | Busch et al. |
| 2019/0206405 A1 | 7/2019 | Gillespie et al. |
| 2019/0219976 A1 | 7/2019 | Giorgi et al. |
| 2019/0221206 A1 | 7/2019 | Chen et al. |
| 2019/0237089 A1 | 8/2019 | Shin |
| 2019/0244608 A1 | 8/2019 | Choi et al. |
| 2019/0251960 A1 | 8/2019 | Maker et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0288970 A1 | 9/2019 | Siddiq |
| 2019/0289367 A1 | 9/2019 | Siddiq |
| 2019/0295542 A1 | 9/2019 | Huang et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0347063 A1 | 11/2019 | Liu et al. |
| 2019/0348044 A1 | 11/2019 | Chun et al. |
| 2019/0362714 A1 | 11/2019 | Mori et al. |
| 2019/0364422 A1 | 11/2019 | Zhuo |
| 2019/0371310 A1 | 12/2019 | Fox et al. |
| 2019/0371324 A1 | 12/2019 | Powell et al. |
| 2019/0371342 A1 | 12/2019 | Tukka et al. |
| 2019/0392832 A1 | 12/2019 | Mitsui et al. |
| 2020/0043489 A1 | 2/2020 | Bradley et al. |
| 2020/0074990 A1 | 3/2020 | Kim et al. |
| 2020/0090647 A1 | 3/2020 | Kurtz |
| 2020/0098354 A1 | 3/2020 | Lin et al. |
| 2020/0098379 A1 | 3/2020 | Tai et al. |
| 2020/0105245 A1 | 4/2020 | Gupta et al. |
| 2020/0105264 A1 | 4/2020 | Jang et al. |
| 2020/0110571 A1 | 4/2020 | Liu et al. |
| 2020/0125162 A1 | 4/2020 | D'Amato et al. |
| 2020/0135194 A1 | 4/2020 | Jeong |
| 2020/0135224 A1 | 4/2020 | Bromand et al. |
| 2020/0152206 A1 | 5/2020 | Shen et al. |
| 2020/0184964 A1 | 6/2020 | Myers et al. |
| 2020/0211539 A1 | 7/2020 | Lee |
| 2020/0211550 A1 | 7/2020 | Pan et al. |
| 2020/0234709 A1 | 7/2020 | Kunitake |
| 2020/0244650 A1 | 7/2020 | Burris et al. |
| 2020/0251107 A1 | 8/2020 | Wang et al. |
| 2020/0265838 A1 | 8/2020 | Lee et al. |
| 2020/0310751 A1 | 10/2020 | Anand et al. |
| 2020/0342869 A1 | 10/2020 | Lee et al. |
| 2020/0366477 A1 | 11/2020 | Brown et al. |
| 2020/0409926 A1 | 12/2020 | Srinivasan et al. |
| 2021/0067867 A1 | 3/2021 | Kagoshima |
| 2021/0118439 A1 | 4/2021 | Schillmoeller et al. |
| 2021/0166680 A1 | 6/2021 | Jung et al. |
| 2021/0183366 A1 | 6/2021 | Reinspach et al. |
| 2021/0280185 A1 | 9/2021 | Tan et al. |
| 2021/0295849 A1 | 9/2021 | Van Der Ven et al. |
| 2021/0358481 A1 | 11/2021 | D'Amato et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |

FOREIGN PATENT DOCUMENTS

| | | |
|---|---|---|
| CN | 1781291 A | 5/2006 |
| CN | 101427154 A | 5/2009 |
| CN | 102999161 A | 3/2013 |
| CN | 104115224 A | 10/2014 |
| CN | 104282305 A | 1/2015 |
| CN | 104520927 A | 4/2015 |
| CN | 104572009 A | 4/2015 |
| CN | 104885406 A | 9/2015 |

(56) References Cited

FOREIGN PATENT DOCUMENTS

| | | |
|---|---|---|
| CN | 104885438 A | 9/2015 |
| CN | 105162886 A | 12/2015 |
| CN | 105284168 A | 1/2016 |
| CN | 105389099 A | 3/2016 |
| CN | 105427861 A | 3/2016 |
| CN | 105453179 A | 3/2016 |
| CN | 105472191 A | 4/2016 |
| CN | 105493179 A | 4/2016 |
| CN | 105632486 A | 6/2016 |
| CN | 105679318 A | 6/2016 |
| CN | 106030699 A | 10/2016 |
| CN | 106796784 A | 5/2017 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108028047 A | 5/2018 |
| CN | 108028048 A | 5/2018 |
| CN | 108198548 A | 6/2018 |
| CN | 109712626 A | 5/2019 |
| EP | 2051542 A1 | 4/2009 |
| EP | 2986034 A1 | 2/2016 |
| EP | 3133595 A1 | 2/2017 |
| GB | 2501367 A | 10/2013 |
| JP | 863301998 A | 12/1988 |
| JP | H0883091 A | 3/1996 |
| JP | 2004109361 A | 4/2004 |
| JP | 2004163590 A | 6/2004 |
| JP | 2007235875 A | 9/2007 |
| JP | 2008217444 A | 9/2008 |
| JP | 2014510481 A | 4/2014 |
| JP | 2016009193 A | 1/2016 |
| JP | 2017129860 A | 7/2017 |
| JP | 2017227912 A | 12/2017 |
| JP | 2018055259 A | 4/2018 |
| JP | 2019109510 A | 7/2019 |
| KR | 100966415 B1 | 6/2010 |
| KR | 101284134 B1 | 7/2013 |
| KR | 20140005410 A | 1/2014 |
| KR | 20140054643 A | 5/2014 |
| KR | 20140111859 A | 9/2014 |
| TW | 201629950 A | 8/2016 |
| WO | 03054854 A2 | 7/2003 |
| WO | 2008096414 A1 | 8/2008 |
| WO | 2015105788 A1 | 7/2015 |
| WO | 2015133022 A1 | 9/2015 |
| WO | 2015195216 A1 | 12/2015 |
| WO | 2016003509 A1 | 1/2016 |
| WO | 2016014686 A1 | 1/2016 |
| WO | 2016136062 A1 | 9/2016 |
| WO | 2018140777 A1 | 8/2018 |
| WO | 2019005772 A1 | 1/2019 |

OTHER PUBLICATIONS

Non-Final Office Action mailed on Apr. 20, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Nov. 29, 2021, issued in connection with U.S. Appl. No. 16/989,350, filed Aug. 10, 2020, 15 pages.
Non-Final Office Action mailed on Jul. 3, 2023, issued in connection with U.S. Appl. No. 17/135,173, filed Dec. 28, 2020, 22 pages.
Non-Final Office Action mailed on Sep. 30, 2022, issued in connection with U.S. Appl. No. 17/353,254, filed Jun. 21, 2021, 22 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Feb. 8, 2022, issued in connection with U.S. Appl. No. 16/806,747, filed Mar. 2, 2020, 17 pages.

(56) References Cited

OTHER PUBLICATIONS

Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Aug. 4, 2021, issued in connection with U.S. Appl. No. 16/780,483, filed Feb. 3, 2020, 5 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Jun. 30, 2022, issued in connection with European Application No. 21212763.3, 9 pages.
European Patent Office, European Extended Search Report mailed on Jul. 8, 2022, issued in connection with European Application No. 22153523.0, 9 pages.
European Patent Office, European Search Report mailed on Mar. 1, 2022, issued in connection with European Application No. 21180778.9, 9 pages.
European Patent Office, European Search Report mailed on Oct. 4, 2022, issued in connection with European Application No. 22180226.7, 6 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Final Office Action mailed Jul. 23, 2021, issued in connection with U.S. Appl. No. 16/439,046, filed Jun. 12, 2019, 12 pages.
Final Office Action mailed on Jun. 1, 2022, issued in connection with U.S. Appl. No. 16/806,747, filed Mar. 2, 2020, 20 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on Mar. 21, 2022, issued in connection with U.S. Appl. No. 16/153,530, filed Oct. 5, 2018, 23 pages.
Final Office Action mailed on Aug. 22, 2022, issued in connection with U.S. Appl. No. 16/168,389, filed Oct. 23, 2018, 37 pages.
Final Office Action mailed on Jul. 27, 2022, issued in connection with U.S. Appl. No. 16/989,350, filed Aug. 10, 2020, 15 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Oct. 4, 2021, issued in connection with U.S. Appl. No. 16/806,747, filed Mar. 2, 2020, 17 pages.
Final Office Action mailed on Jun. 7, 2022, issued in connection with U.S. Appl. No. 16/736,725, filed Jan. 7, 2020, 14 pages.
Final Office Action mailed on Aug. 9, 2023, issued in connection with U.S. Appl. No. 17/493,430, filed Oct. 4, 2021, 19 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 26, 2022, issued in connection with International Application No. PCT/US2020/056632, filed on Oct. 21, 2020, 7 pages.

(56) References Cited

OTHER PUBLICATIONS

International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Oct. 6, 2017, issued in connection with International Application No. PCT/US2017/045551, filed on Aug. 4, 2017, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Notice of Allowance mailed on Feb. 23, 2023, issued in connection with U.S. Appl. No. 17/532,674, filed Nov. 22, 2021, 10 pages.
Notice of Allowance mailed on Mar. 24, 2022, issued in connection with U.S. Appl. No. 16/378,516, filed Apr. 8, 2019, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.
Notice of Allowance mailed on Mar. 29, 2023, issued in connection with U.S. Appl. No. 17/722,438, filed Apr. 18, 2022, 7 pages.
Notice of Allowance mailed on Sep. 29, 2021, issued in connection with U.S. Appl. No. 16/876,493, filed May 18, 2020, 5 pages.
Notice of Allowance mailed on Mar. 3, 2022, issued in connection with U.S. Appl. No. 16/679,538, filed Nov. 11, 2019, 7 pages.
Notice of Allowance mailed on Jun. 30, 2023, issued in connection with U.S. Appl. No. 17/303,001, filed May 18, 2021, 8 pages.
Notice of Allowance mailed on Mar. 30, 2023, issued in connection with U.S. Appl. No. 17/303,066, filed May 19, 2021, 7 pages.
Notice of Allowance mailed on Mar. 31, 2023, issued in connection with U.S. Appl. No. 17/303,735, filed Jun. 7, 2021, 19 pages.
Notice of Allowance mailed on Aug. 4, 2023, issued in connection with U.S. Appl. No. 18/145,520, filed Dec. 22, 2022, 10 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Notice of Allowance mailed on Apr. 8, 2022, issued in connection with U.S. Appl. No. 16/813,643, filed Mar. 9, 2020, 7 pages.
Notice of Allowance mailed on Nov. 8, 2021, issued in connection with U.S. Appl. No. 17/008,104, filed Aug. 31, 2020, 9 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Oord et al. WaveNet: A Generative Model for Raw Audio. Arxiv. org, Cornell University Library, Sep. 12, 2016, 15 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision mailed on Jan. 18, 2022, issued in connection with U.S. Appl. No. 16/806,747, filed Mar. 2, 2020, 2 pages.
Renato De Mori. Spoken Language Understanding: A Survey. Automatic Speech Recognition & Understanding, 2007. IEEE, Dec. 1, 2007, 56 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Snips: How to Snips—Assistant creation Installation, Jun. 26, 2017, 6 pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Tsung-Hsien Wen et al: "A Network-based End-to-End Trainable Task-oriented Dialogue System", CORR (ARXIV), vol. 1604.04562v1, Apr. 15, 2016 (Apr. 15, 2016), pp. 1-11.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.

(56) References Cited

OTHER PUBLICATIONS

Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Xiaoguang et al. "Robust Small-Footprint Keyword Spotting Using Sequence-to-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection and Channel Weighting. The Institute of Electronics, Information and Communication Engineers, arXiv:1604.03276v1 [cs.SD] Jan. 1, 2010, 8 pages.
Advisory Action mailed on Nov. 7, 2022, issued in connection with U.S. Appl. No. 16/168,389, filed Oct. 23, 2018, 4 pages.
Advisory Action mailed on Aug. 13, 2021, issued in connection with U.S. Appl. No. 16/271,550, filed Feb. 8, 2019, 4 pages.
Advisory Action mailed on Feb. 28, 2022, issued in connection with U.S. Appl. No. 16/813,643, filed Mar. 9, 2020, 3 pages.
Advisory Action mailed on Sep. 8, 2021, issued in connection with U.S. Appl. No. 16/168,389, filed Oct. 23, 2018, 4 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Audhkhasi Kartik et al. End-to-end ASR-free keyword search from speech. 2017 IEEE International Conference on Acoustics, Speech and Signal Processing, Mar. 5, 2017, 7 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 28, 2022, issued in connection with Australian Application No. 2018338812, 3 pages.
Australian Patent Office, Australian Examination Report Action mailed on Mar. 4, 2022, issued in connection with Australian Application No. 2021202786, 2 pages.
Canadian Patent Office, Canadian Examination Report mailed on Dec. 1, 2021, issued in connection with Canadian Application No. 3096442, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jun. 7, 2022, issued in connection with Canadian Application No. 3105494, 5 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916 X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
Chung et al. Empirical Evaluation of Gated Recurrent Neural Network on Sequence Modeling. Dec. 11, 2014, 9 pages.
Couke et al. Efficient Keyword Spotting using Dilated Convolutions and Gating, arXiv:1811.07684v2, Feb. 18, 2019, 5 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.

(56) References Cited

OTHER PUBLICATIONS

European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Jul. 31, 2023, issued in connection with European Application No. 21164130.3, 5 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
Japanese Patent Office, Decision of Refusal and Translation mailed on Jul. 26, 2022, issued in connection with Japanese Patent Application No. 2020-513852, 10 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Nov. 28, 2021, issued in connection with Japanese Patent Application No. 2020-550102, 9 pages.
Japanese Patent Office, Office Action and Translation mailed on Nov. 15, 2022, issued in connection with Japanese Patent Application No. 2021-146144, 9 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Office Action and Translation mailed on Feb. 27, 2023, issued in connection with Korean Application No. 10-2022-7021879, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Mathias Wolfel. Channel Selection by Class Separability Measures for Automatic Transcriptions on Distant Microphones, InterspeecH 2007 10.21437/Interspeech.2007-255, 4 pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Non-Final Office Action mailed Jul. 22, 2021, issued in connection with U.S. Appl. No. 16/179,779, filed Nov. 2, 2018, 19 pages.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Aug. 10, 2023, issued in connection with U.S. Appl. No. 18/070,024, filed Nov. 28, 2022, 4 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2022, issued in connection with U.S. Appl. No. 17/145,667, filed Jan. 11, 2021, 9 pages.
Non-Final Office Action mailed on Apr. 12, 2023, issued in connection with U.S. Appl. No. 17/878,649, filed Aug. 1, 2022, 16 pages.
Non-Final Office Action mailed on Oct. 13, 2021, issued in connection with U.S. Appl. No. 16/679,538, filed Nov. 11, 2019, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.

(56) References Cited

OTHER PUBLICATIONS

Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Aug. 18, 2021, issued in connection with U.S. Appl. No. 16/845,946, filed Apr. 10, 2020, 14 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 19, 2022, issued in connection with U.S. Appl. No. 17/385,542, filed Jul. 26, 2021, 9 pages.
Notice of Allowance mailed on Nov. 9, 2022, issued in connection with U.S. Appl. No. 17/385,542, filed Jul. 26, 2021, 8 pages.
Notice of Allowance mailed on Feb. 1, 2022, issued in connection with U.S. Appl. No. 16/439,046, filed Jun. 12, 2019, 9 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Aug. 12, 2021, issued in connection with U.S. Appl. No. 16/819,755, filed Mar. 16, 2020, 6 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2021, issued in connection with U.S. Appl. No. 16/879,553, filed May 20, 2020, 15 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Aug. 14, 2023, issued in connection with U.S. Appl. No. 17/549,034, filed Dec. 13, 2021, 9 pages.
Notice of Allowance mailed on Jan. 14, 2022, issued in connection with U.S. Appl. No. 16/966,397, filed Jul. 30, 2020, 5 pages.
Notice of Allowance mailed on Aug. 15, 2022, issued in connection with U.S. Appl. No. 17/101,949, filed Nov. 23, 2020, 11 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725, filed Jan. 1, 2020, 11 pages.
Notice of Allowance mailed on Aug. 16, 2023, issued in connection with U.S. Appl. No. 17/536,572, filed Nov. 29, 2021, 7 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Notice of Allowance mailed on Jul. 18, 2022, issued in connection with U.S. Appl. No. 17/222,151, filed Apr. 5, 2021, 5 pages.
Notice of Allowance mailed on Dec. 2, 2021, issued in connection with U.S. Appl. No. 16/841,116, filed Apr. 6, 2020, 5 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.

* cited by examiner

| PLAYBACK - Initiation | |
|---|---|
| COMMAND | COGNATES |
| play | turn on |
| | play some/my music |
| | let's rock/jam |
| | break it down |
| | bust it |
| | kick it |
| play (content) | play (content) |
| | play me (content) |
| | please play (content) |
| | can you/will you play (content) |
| | I'd love to hear (content) |
| | can I hear some (content)? |
| | put on some (content) |
| | switch (content) |
| play (content) for mood | play (content) for (mood) |
| play (content) for activity | play (content) for (activity) |
| play (content) ... service target | play (content) ... service target |
| | play (content) on Spotify |
| play radio | play/turn on/put on the radio |
| | find a station that's playing music |
| play news | play the news |
| | play my news |
| find/create station for (artist/song) | find/create station for (artist/song) |
| playback steering | play artists/song like x |
| | play more x |
| | play more/less like x |
| | play something more (descriptive) |
| playback multi-turn | ⋮ |

| CONTROL |
|---|
| ⋮ |

| TARGETING |
|---|
| ⋮ |

| INQUIRY |
|---|

*Figure 9C*

PLAYBACK - Initiation

CONTROL

Transport:

| COMMAND | COGNATES |
|---|---|
| pause | pause |
| stop | stop, shut up, (turn) off |
| next | next/skip |
| | next song/track/chapter/episode |
| previous | previous/back |
| | skip back/go back |
| restart track | start over/repeat this song |
| | start this song/track over |
| | play this from the top/beginning |
| repeat | repeat |
| | play that again (track or container) |
| shuffle on/off | shuffle/unshuffle/randomize |
| Go to specific location or track | skip to halfway through this song |
| | go to last minute of this song |
| Resume | resume/continue |

| | |
|---|---|
| volume up/down | louder/quieter |
| | turn it up/down |
| tune volume a lot/little | turen it up/down a lot/little |
| | a lot softer/quieter/louder |
| | volume 50 percent/volume half |
| | volume 5 |
| | mute |
| Source | turn on/off |
| | turn on/off quiet mode |
| | enhance speech |
| | switch to line in |
| | switch/change to music/TV |

TARGETING

INQUIRY

*Figure 9D*

| PLAYBACK - Initiation | |
|---|---|
| ⋮ | |
| CONTROL | |
| ⋮ | |

| TARGETING - Zone/Group/Device | |
|---|---|
| COMMANDS | COGNATES |
| device grouping | *group/join/combine (devices)* |
| | *group/join/combine (groups)* |
| | *ungroup (devices)* |
| | *ungroup (groups)* |
| | *add/drop (devices/groups)* |
| | *turn off* |
| calibrate | *calibrate (devices/groups)* |
| | *trueplay (devices/groups)* |
| pairing/consolidating | *pair/bond (devices)* |
| | *separate (devices/groups)* |
| | *break apart (devices/groups)* |
| group volume | *increase/decrease (group volume)* |
| | *mute/unmute (device(s)) in (group)* |
| | *raise/lower volume of (device(s))* |
| group head | *select (device) as (group) head* |
| | *make (device) (group) head* |
| calibrate multi-turn commands<br>pairing multi-turn commands<br>consolidating multi-turn commands | |

⋮

| TARGETING |
|---|

⋮

| INQUIRY |
|---|

*Figure 9E*

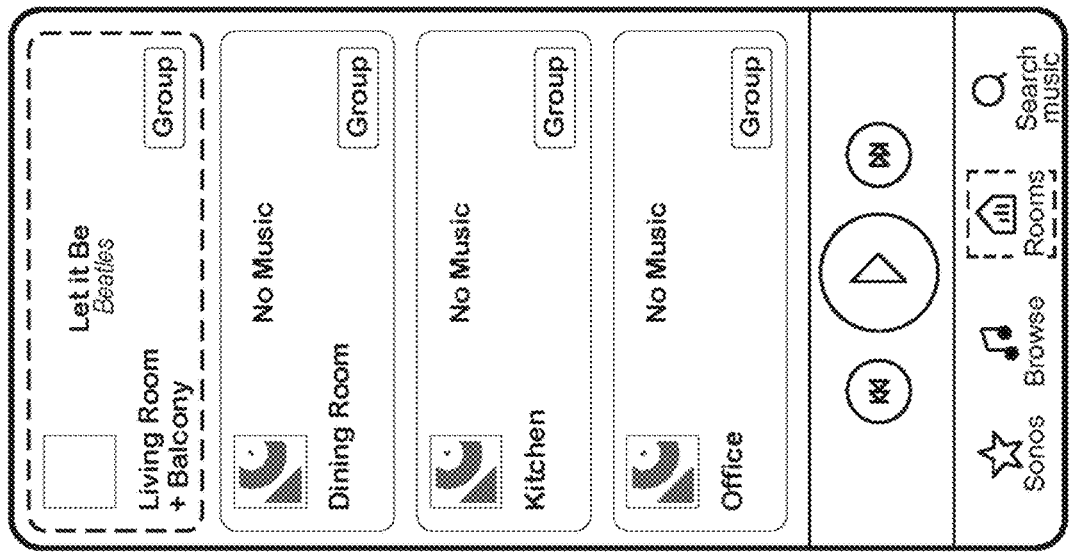
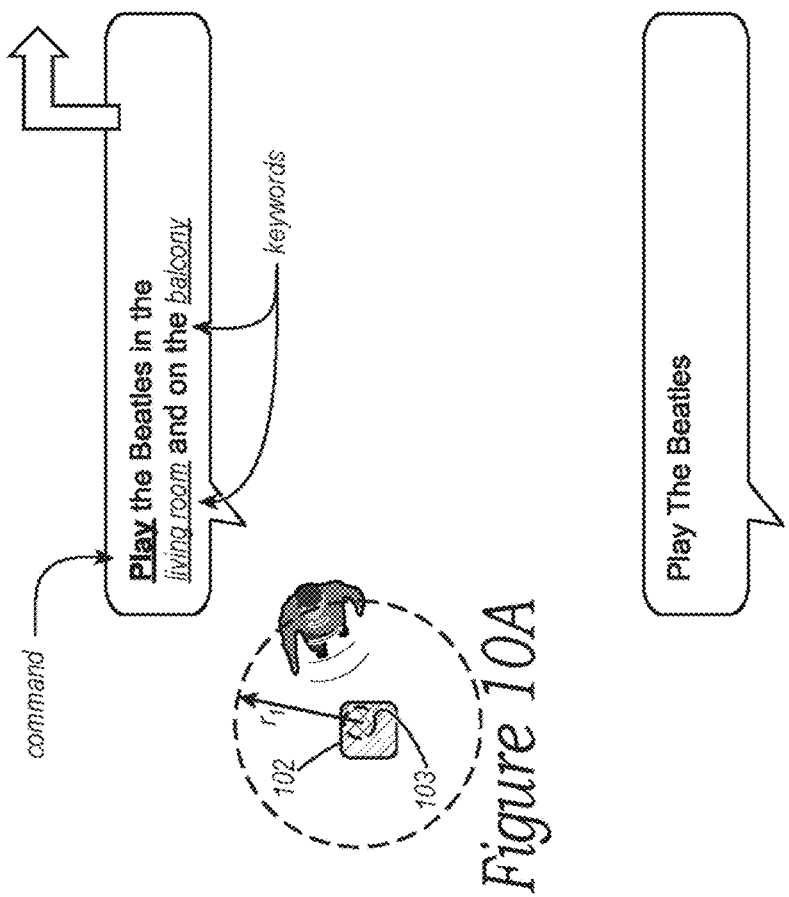
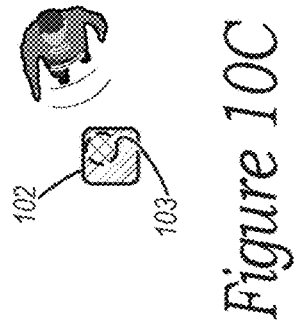
*Figure 10A*
*Figure 10B*
*Figure 10C*

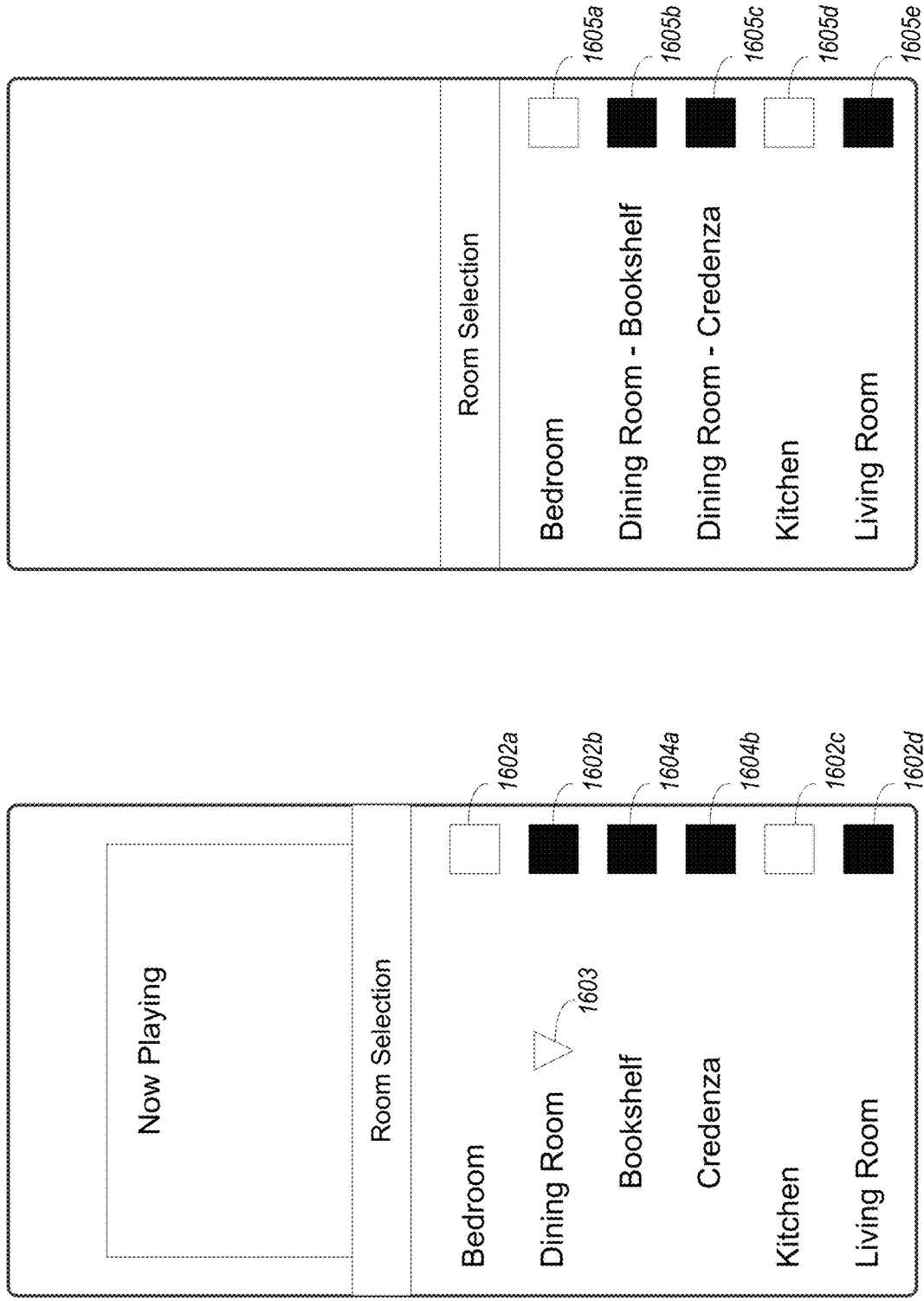

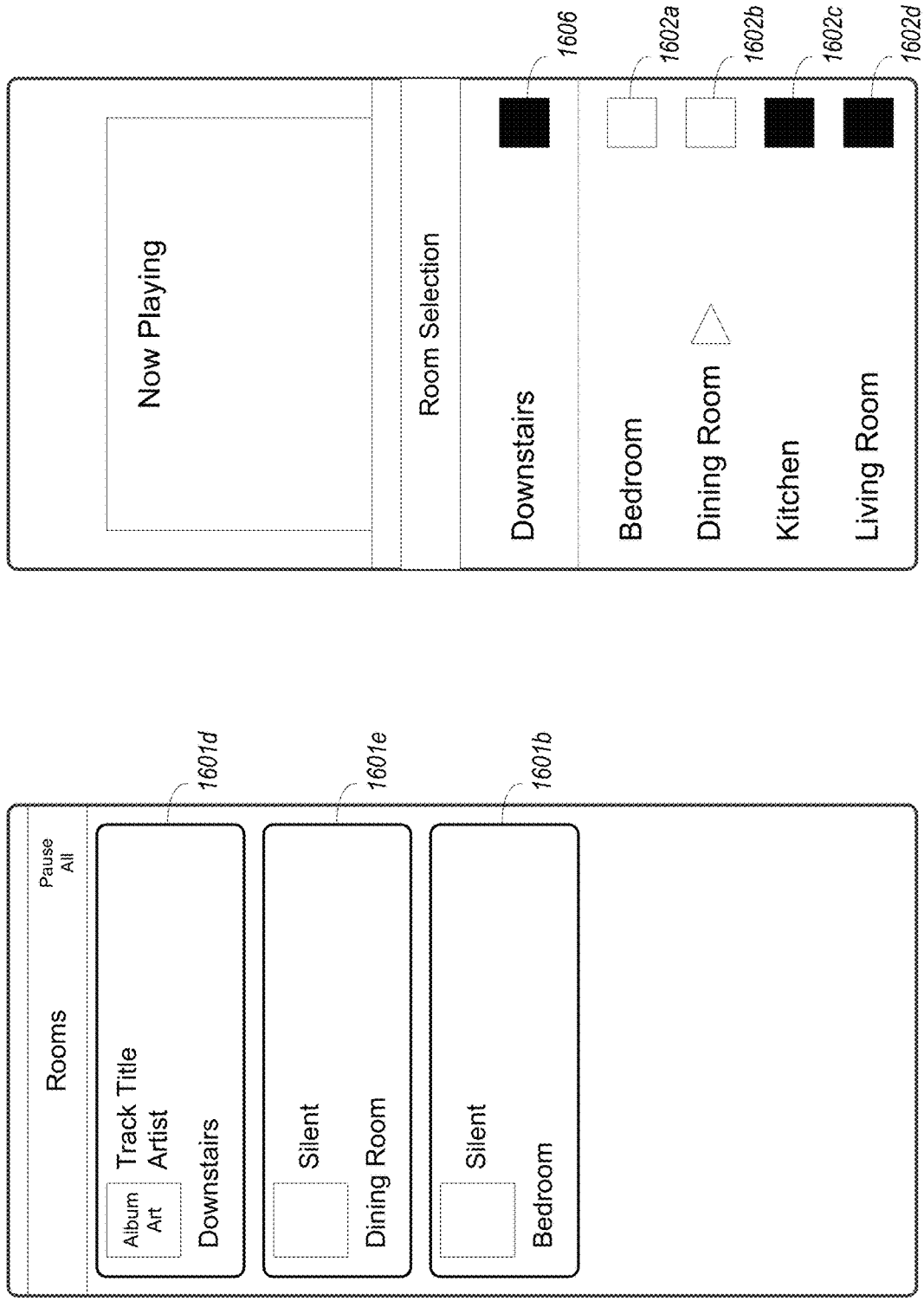

HOME GRAPH

CROSS REFERENCE TO RELATED APPLICATIONS

This application is a continuation of U.S. patent application Ser. No. 17/077,974, filed Oct. 22, 2020, now U.S. Pat. No. 11,676,590, which is a continuation of U.S. patent application Ser. No. 16/216,357, filed Dec. 11, 2018, now U.S. Pat. No. 10,818,290, which claims priority and the benefit of U.S. Patent Application No. 62/597,355, filed Dec. 11, 2017, which are incorporated herein by reference in their entireties.

FIELD OF THE DISCLOSURE

The disclosure is related to consumer goods and, more particularly, to methods, systems, products, features, services, and other elements directed to voice control of media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 9C, 9D, and 9E are tables with example voice input commands and associated information in accordance with aspects of the disclosure;

FIGS. 10A, 10B, and 10C are diagrams showing example voice inputs for invoking a VAS in accordance with aspects of the disclosure;

FIGS. 16A, 16B, 16C, 16D, 16E, 16F, 16G, and 16H are diagrams showing example control interfaces for home graph targeting in accordance with aspects of the disclosure;

Figure 1:
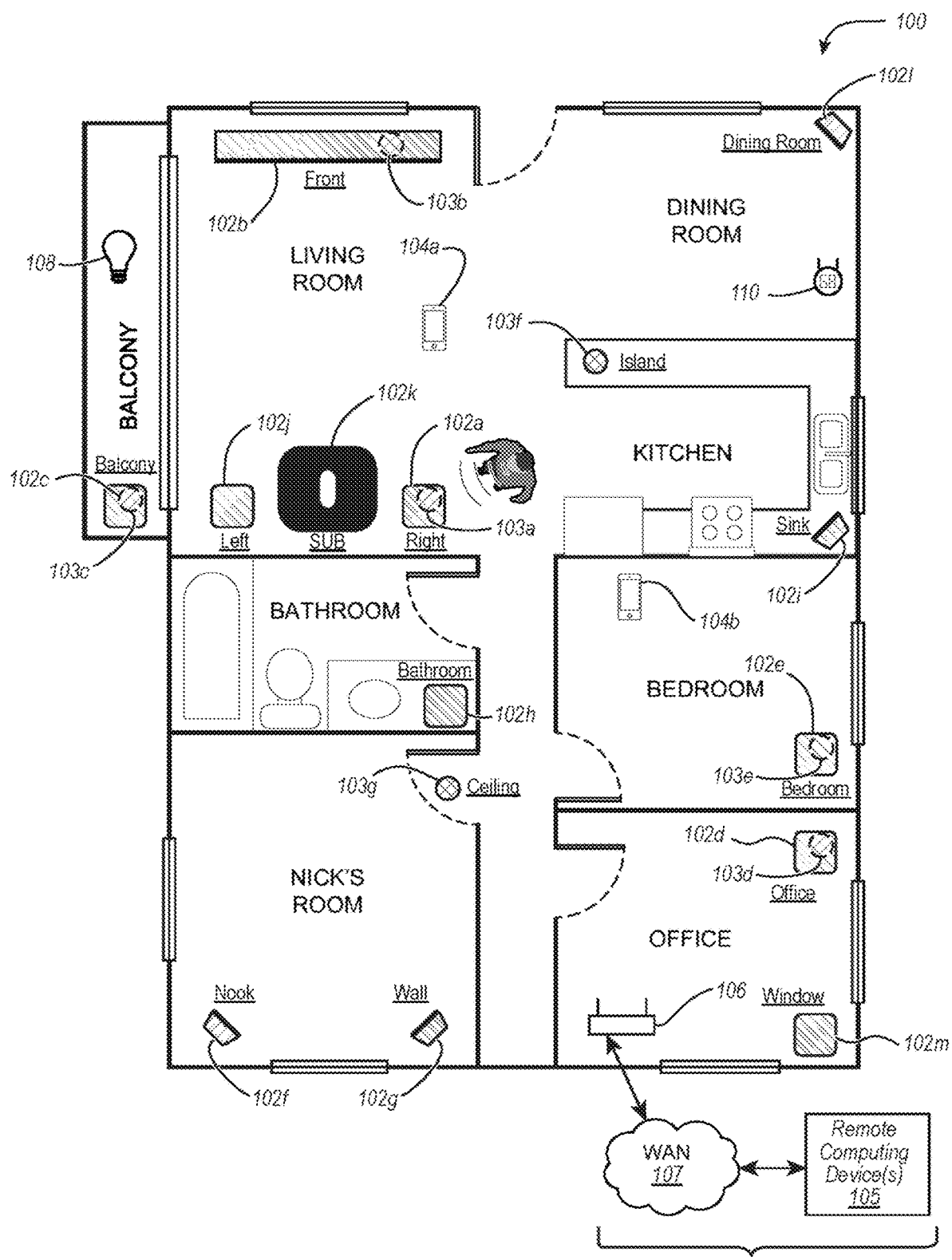
FIG. 1 shows a media playback system in which certain embodiments may be practiced.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 107 is first introduced and discussed with reference to FIG. 1.

DETAILED DESCRIPTION

I. Overview

Example techniques involve a control hierarchy for a "smart" home having smart appliances and related devices, such as wireless illumination devices, home-automation devices (e.g., thermostats, door locks, etc.), and audio playback devices. An example home includes various rooms in which smart devices might be located. Under the example control hierarchy described herein and referred to as "home graph," a name of a room (e.g., "Kitchen") may represent a smart device (or smart devices) within that room. In other words, from the perspective of a user, the smart devices within a room are that room. This hierarchy permits a user to refer to a smart device within a given room by way of the name of the room when controlling smart devices within the home using a voice user interface (VUI) or graphical user interface (GUI). For instance, using a VUI, a user may say "Play music in Living Room" to play music on the audio playback devices located in the living room.

The base unit of the home graph hierarchy is a "Set." For the purpose of this disclosure, a "Set" refers to an individual device or multiple devices that operate together in performing a given function. For instance, a bonded zone of audio playback devices (e.g., a stereo pair or surround sound configuration) function together in playing back audio content by playing back respective channels or portions of that content. As another example, multiple smart lightbulbs in the same light fixture function together in providing illumination from that light fixture. To individually control different smart devices, each of these smart devices may be assigned into a respective Set.

For the purpose of home graph, each Set is assigned a human-readable name. Following the home graph hierarchy described herein, the name of a particular Set is indicative of the location in the home that the Set is located. For instance, an audio playback device on a kitchen island might be assigned the name "Kitchen Island" by a user using voice control or a GUI on a control device. As another example, a set of lights in the kitchen might be assigned the name "Kitchen Lights."

After Sets, the next level of the hierarchy is a "Room." Under the example home graph hierarchy described herein, a "Room" can be considered a container for Sets in a given room of a home. For example, an example Room might correspond to the kitchen of a home, and be assigned the name "Kitchen." The afore-mentioned Sets having the names "Kitchen Island" and "Kitchen Lights" may belong to the Room.

Under home graph, Sets within the room container may be referred to by the name of the room. For instance, the voice command "Play music in Kitchen" causes the "Kitchen Island" Set (which includes an audio playback device) to start playing music. If there are multiple Sets in the Kitchen that include audio playback devices, the voice command "Play music in Kitchen" invokes every Set in the "Kitchen" Room that includes an audio playback device. If control of an individual Set is desired, that Set may be selected by reference to its name (e.g., "Kitchen Island") rather than the name of the Room.

The next level of the example home graph hierarchy is "Area." Many homes are naturally divided into areas, such as upstairs and downstairs. Under a first example implementation of home graph, an Area includes two or more rooms. For instance, a user may pre-define two Areas named "Upstairs" and "Downstairs," which include the Rooms upstairs and the Rooms downstairs in the home, respectively. Under a second example, an area contains two or more sets (possibly in different Rooms).

The highest level of the home graph hierarchy is "Home." A Home refers to the entire home, and all of the Sets within.

In some implementations, the Home may be referred to in a VUI or a GUI by reference to "everywhere."

As indicated above, for the purposes of this disclosure, the terms "Set," "Room," "Area" and "Home" are capitalized when referring to levels of the home graph hierarchy so as to distinguish from the common usage of these terms. Moreover, human-readable names (i.e., character strings) are used in identifying Sets, Rooms, Areas, and Home and are denoted by quotations marks (e.g., "Nick's Room" Set).

While some embodiments described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102m), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point connections and/or over other connections, which may be wired and/or wireless, via a LAN including a network router 106. For example, the playback device 102j (designated as "Left") may have a point-to-point connection with the playback device 102a (designated as "Right"). In one embodiment, the Left playback device 102j may communicate over the point-to-point connection with the Right playback device 102a. In a related embodiment, the Left playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide a VAS 160 for the media playback system 100.

In some embodiments, one or more of the playback devices 102 may include an on-board (e.g., integrated) network microphone device. For example, the playback devices 102a-e include corresponding NMDs 103a-e, respectively. Playback devices that include network microphone devices may be referred to herein interchangeably as a playback device or a network microphone device unless indicated otherwise in the description.

In some embodiments, one or more of the NMDs 103 may be a stand-alone device. For example, the NMDs 103*f* and 103*g* may be stand-alone network microphone devices. A stand-alone network microphone device may omit components typically included in a playback device, such as a speaker or related electronics. In such cases, a stand-alone network microphone device may not produce audio output or may produce limited audio output (e.g., relatively low-quality audio output).

In use, a network microphone device may receive and process voice inputs from a user in its vicinity. For example, a network microphone device may capture a voice input upon detection of the user speaking the input. In the illustrated example, the NMD 103*a* of the playback device 102*a* in the Living Room may capture the voice input of a user in its vicinity. In some instances, other network microphone devices (e.g., the NMDs 103*b* and 103*f*) in the vicinity of the voice input source (e.g., the user) may also detect the voice input. In such instances, network microphone devices may arbitrate between one another to determine which device(s) should capture and/or process the detected voice input. Examples for selecting and arbitrating between network microphone devices may be found, for example, in U.S. application Ser. No. 15/438,749 filed Feb. 21, 2017, and titled "Voice Control of a Media Playback System," which is incorporated herein by reference in its entirety.

In certain embodiments, a network microphone device may be assigned to a playback device that might not include a network microphone device. For example, the NMD 103*f* may be assigned to the playback devices 102*i* and/or 102*l* in its vicinity. In a related example, a network microphone device may output audio through a playback device to which it is assigned. Additional details regarding associating network microphone devices and playback devices as designated or default devices may be found, for example, in previously referenced U.S. patent application Ser. No. 15/438,749.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback and Network Microphone Devices

Figure 2A:
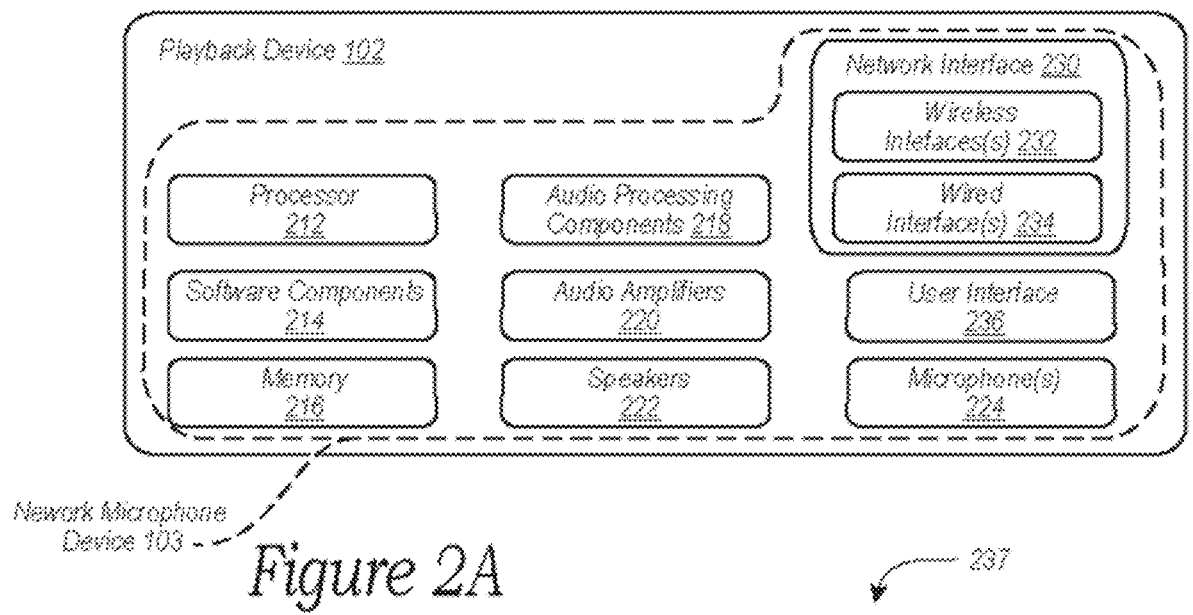
FIG. 2A is a functional block diagram of an example playback device.

FIG. 2A is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device may not include the speaker(s) 222, but rather a speaker interface for connecting the playback device to external speakers. In certain embodiments, the playback device may include neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener may not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2A includes both wireless interface(s) 232 and wired interface(s) 234, the network interface 230 may in some embodiments include only wireless interface(s) or only wired interface(s).

Figure 2B:
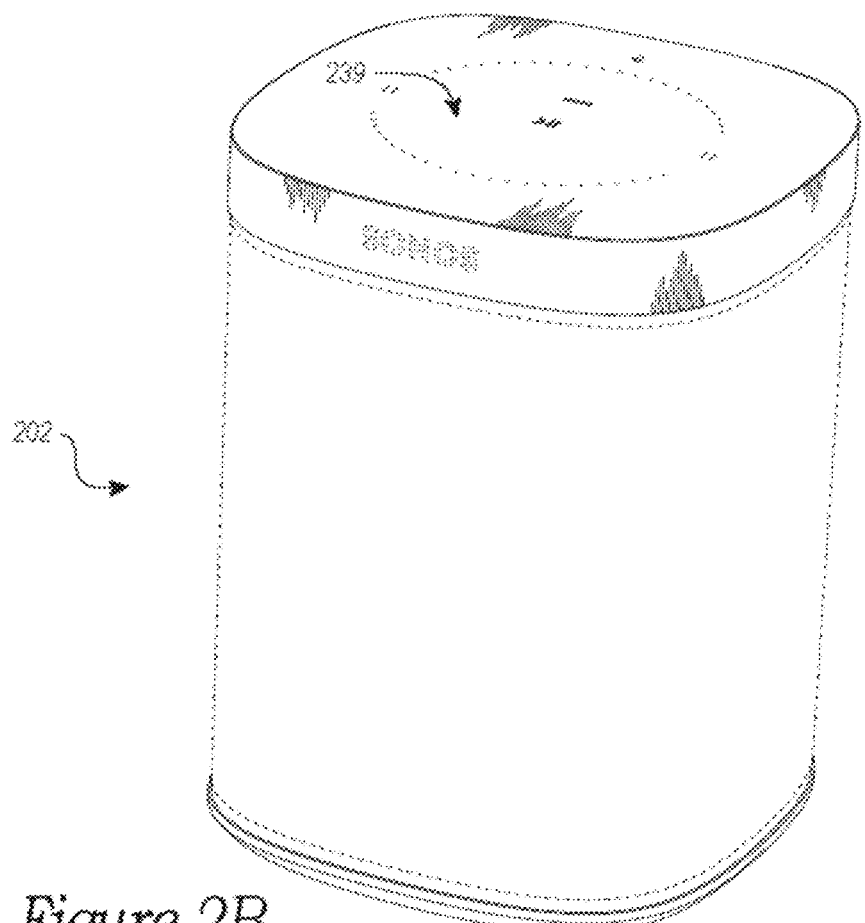
FIG. 2B is a isometric diagram of an example playback device that includes a network microphone device.

As discussed above, a playback device may include a network microphone device, such as one of the NMDs 103 shown in FIG. 1. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above. FIG. 2B is an isometric diagram showing an example playback device 202 incorporating a network microphone device. The playback device 202 has a control area 237 at the top of the device for enabling/disabling microphone(s). The control area 237 is adjacent another area 239 at the top of the device for controlling playback.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2A or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

FIGS. 3A-3D show example configurations of playback devices in zones and zone groups. In one example, a single playback device may belong to a zone. For example, the playback device 102c in the Balcony may belong to Zone A. In some implementations described below, multiple playback devices may be "bonded" to form a "bonded pair" which together form a single zone. For example, the playback device 102f named Nook in FIG. 1 may be bonded to the playback device 102g named Wall to form Zone B. Bonded playback devices may have different playback responsibilities (e.g., channel responsibilities). In another implementation described below, multiple playback devices may be merged to form a single zone. For example, the playback device 102d named Office may be merged with the playback device 102m named Window to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

Each zone in the media playback system 100 may be provided for control as a single user interface (UI) entity. For example, Zone A may be provided as a single entity named Balcony. Zone C may be provided as a single entity named Office. Zone B may be provided as a single entity named Shelf.

In various embodiments, a zone may take on the name of one of the playback device(s) belonging to the zone. For example, Zone C may take on the name of the Office device 102d (as shown). In another example, Zone C may take on the name of the Window device 102m. In a further example, Zone C may take on a name that is some combination of the Office device 102d and Window device 102 m. The name that is chosen may be selected by user. In some embodiments, a zone may be given a name that is different than the device(s) belonging to the zone. For example, Zone B is named Shelf but none of the devices in Zone B have this name.

Figure 3A:
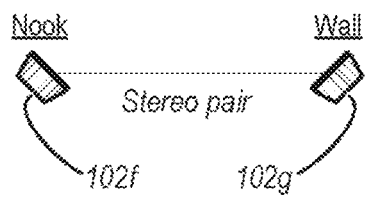
FIGS. 3A, 3B, 3C, and 3D are diagrams showing example zones and zone groups in accordance with aspects of the disclosure.

Playback devices that are bonded may have different playback responsibilities, such as responsibilities for certain audio channels. For example, as shown in FIG. 3A, the Nook and Wall devices 102f and 102g may be bonded so as to produce or enhance a stereo effect of audio content. In this example, the Nook playback device 102f may be configured to play a left channel audio component, while the Wall playback device 102g may be configured to play a right channel audio component. In some implementations, such stereo bonding may be referred to as "pairing."

Figure 3B:
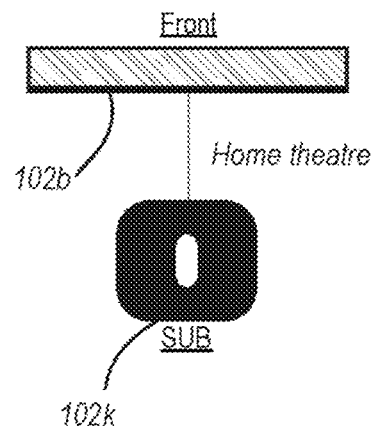
Figure 3C:
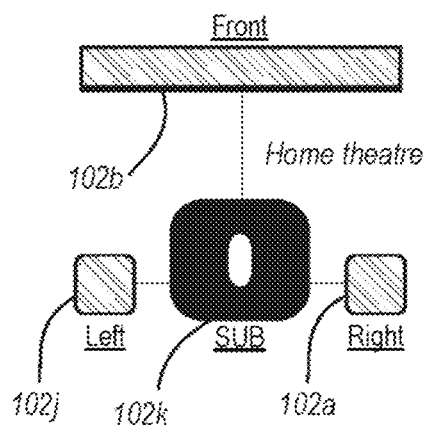
Figure 3D:
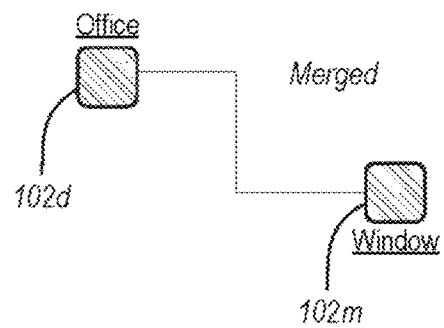

Additionally, bonded playback devices may have additional and/or different respective speaker drivers. As shown in FIG. 3B, the playback device 102b named Front may be bonded with the playback device 102k named SUB. The Front device 102b may render a range of mid to high frequencies and the SUB device 102k may render low frequencies as, e.g., a subwoofer. When unbonded, the Front device 102b may render a full range of frequencies. As another example, FIG. 3C shows the Front and SUB devices 102b and 102k further bonded with Right and Left playback devices 102a and 102k, respectively. In some implementations, the Right and Left devices 102a and 102k may form surround or "satellite" channels of a home theatre system. The bonded playback devices 102a, 102b, 102j, and 102k may form a single Zone D.

Playback devices that are merged may not have assigned playback responsibilities, and may each render the full range of audio content the respective playback device is capable of. Nevertheless, merged devices may be represented as a single UI entity (i.e., a zone, as discussed above). For instance, the playback device 102d and 102m in the Office have the single UI entity of Zone C. In one embodiment, the playback devices 102d and 102m may each output the full range of audio content each respective playback device 102d and 102m are capable of, in synchrony.

In some embodiments, a stand-alone network microphone device may be in a zone by itself. For example, the NMD 103g in FIG. 1 named Ceiling may be Zone E. A network microphone device may also be bonded or merged with another device so as to form a zone. For example, the NMD device 103f named Island may be bonded with the playback device 102i Kitchen, which together form Zone G, which is also named Kitchen. Additional details regarding associating network microphone devices and playback devices as designated or default devices may be found, for example, in previously referenced U.S. patent application Ser. No. 15/438,749. In some embodiments, a stand-alone network microphone device may not be associated with a zone.

Zones of individual, bonded, and/or merged devices may be grouped to form a zone group. For example, Zone A may be grouped with Zone B to form a zone group that includes the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Playback devices may be dynamically grouped and ungrouped to form new or different groups that synchronously play back audio content.

In various implementations, the zones in an environment may be the default name of a zone within the group or a combination of the names of the zones within a zone group, such as Dining Room+Kitchen. In some embodiments, a zone group may be given a unique name selected by a user, such as Nick's Room.

Referring again to FIG. 2A, certain data may be stored in the memory 216 as one or more state variables that are periodically updated and used to describe the state of a playback zone, the playback device(s), and/or a zone group associated therewith. The memory 216 may also include the data associated with the state of the other devices of the media system, and shared from time to time among the devices so that one or more of the devices have the most recent data associated with the system.

In some embodiments, the memory may store instances of various variable types associated with the states. Variables instances may be stored with identifiers (e.g., tags) corresponding to type. For example, certain identifiers may be a first type "a1" to identify playback device(s) of a zone, a second type "b 1" to identify playback device(s) that may be bonded in the zone, and a third type "cl" to identify a zone group to which the zone may belong. As a related example, in FIG. 1, identifiers associated with the Balcony may indicate that the Balcony is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

The memory 216 may be further configured to store other data. Such data may pertain to audio sources accessible by a playback device or a playback queue that the playback device (or some other playback device(s)) may be associated with.

During operation, one or more playback zones in the environment of FIG. 1 may each be playing different audio content. For instance, the user may be grilling in the Balcony zone and listening to hip hop music being played by the playback device 102c while another user may be preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being playing by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices 102 in the Living Room zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Living Room zone in such a manner may allow one user to listen to music in the listening zone in one area of the living room space, and another user to watch the television in another area of the living room space. In a related example, a user may implement either of the NMD 103a or 103b to control the Living Room zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the media playback system 100.

c. Example Controller Devices

Figure 4A:
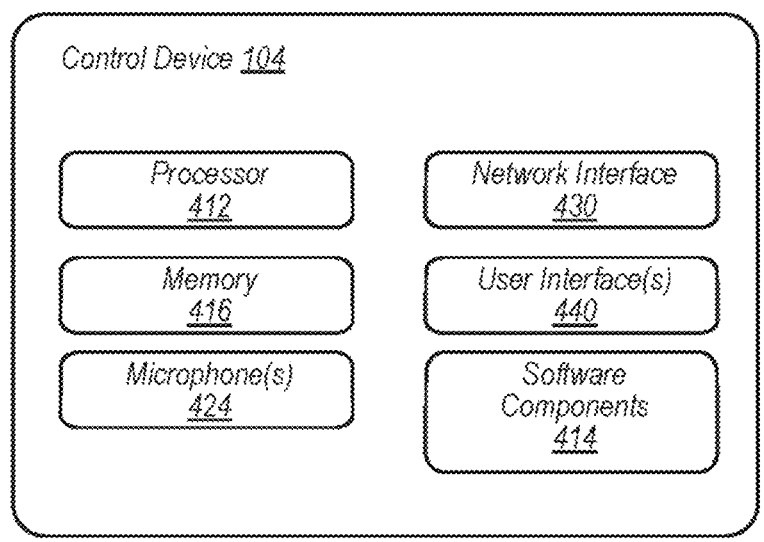
FIG. 4A is a functional block diagram of an example controller device in accordance with aspects of the disclosure.

FIG. 4A is a functional block diagram illustrating certain aspects of a selected one of the controller devices 104 of the media playback system 100 of FIG. 1. Such controller devices may also be referred to as a controller. The controller device shown in FIG. 3 may include components that are generally similar to certain components of the network devices described above, such as a processor 412, memory 416, microphone(s) 424, and a network interface 430. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™).

The memory 416 of a controller device may be configured to store controller application software and other data associated with the media playback system 100 and a user of the system 100. The memory 416 may be loaded with one or more software components 414 executable by the processor 412 to achieve certain functions, such as facilitating user access, control, and configuration of the media playback system 100. A controller device communicates with other network devices over the network interface 430, such as a wireless interface, as described above.

In one example, data and information (e.g., such as a state variable) may be communicated between a controller device and other devices via the network interface 430. For instance, playback zone and zone group configurations in the media playback system 100 may be received by a controller device from a playback device, a network microphone device, or another network device, or transmitted by the controller device to another playback device or network device via the network interface 406. In some cases, the other network device may be another controller device.

Playback device control commands such as volume control and audio playback control may also be communicated from a controller device to a playback device via the network interface 430. As suggested above, changes to configurations of the media playback system 100 may also be performed by a user using the controller device. The configuration changes may include adding/removing one or more playback devices to/from a zone, adding/removing one or more zones to/from a zone group, forming a bonded or merged player, separating one or more playback devices from a bonded or merged player, among others.

Figures 4B, 4C:
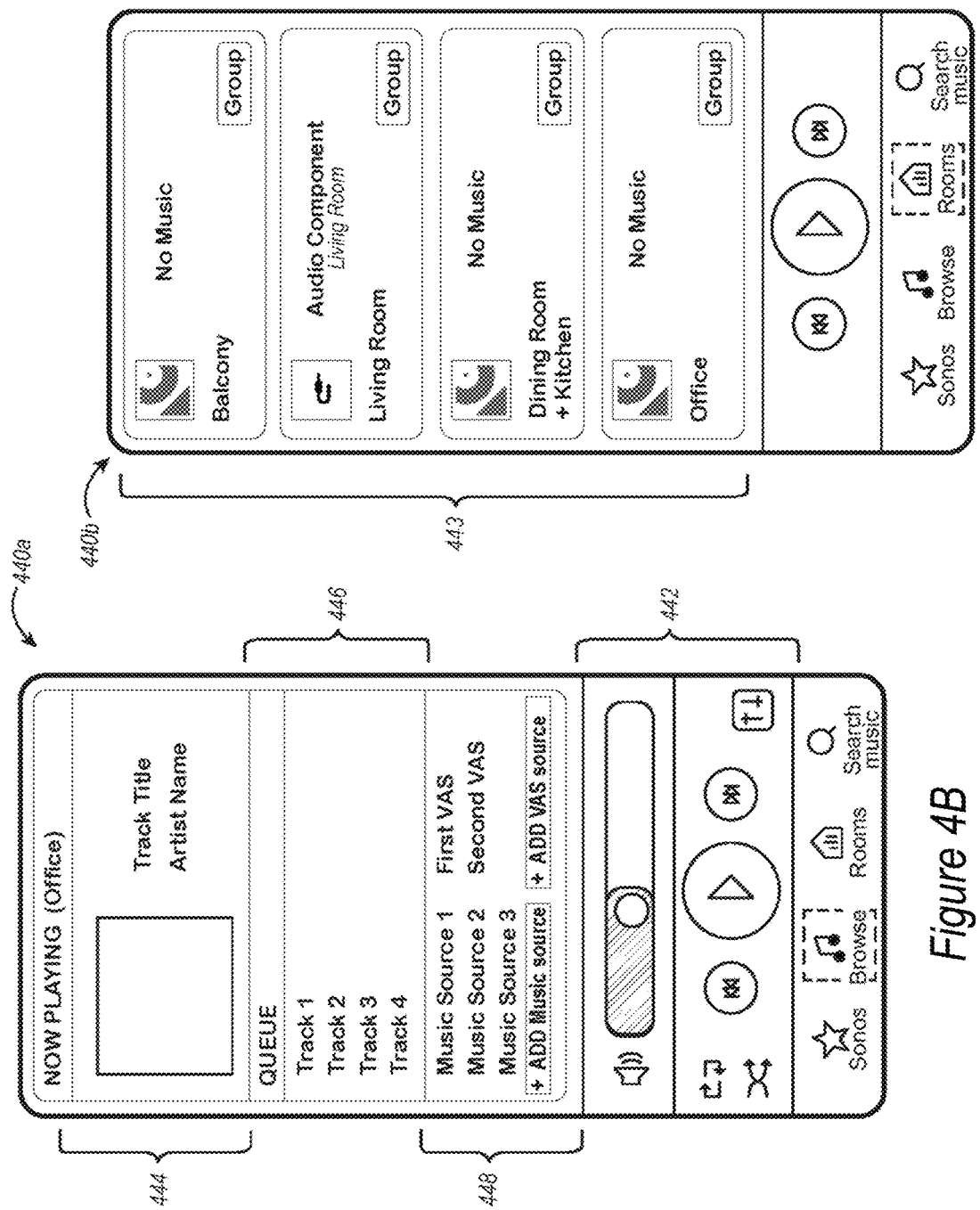
FIGS. 4B and 4C are controller interfaces in accordance with aspects of the disclosure.

The user interface(s) 440 of a controller device may be configured to facilitate user access and control of the media playback system 100, by providing controller interface(s) such as the controller interfaces 440a and 440b shown in FIGS. 4B and 4C, respectively, which may be referred to collectively as the controller interface 440. Referring to FIGS. 4B and 4C together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4C) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4C) may include representations of playback zones within the media playback system 100. The playback zones regions may also include representation of zone groups, such as the Dining Room+Kitchen zone group, as shown. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4B and 4C, the graphical representations of audio content in the playback queue region 446 (FIG. 4C) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
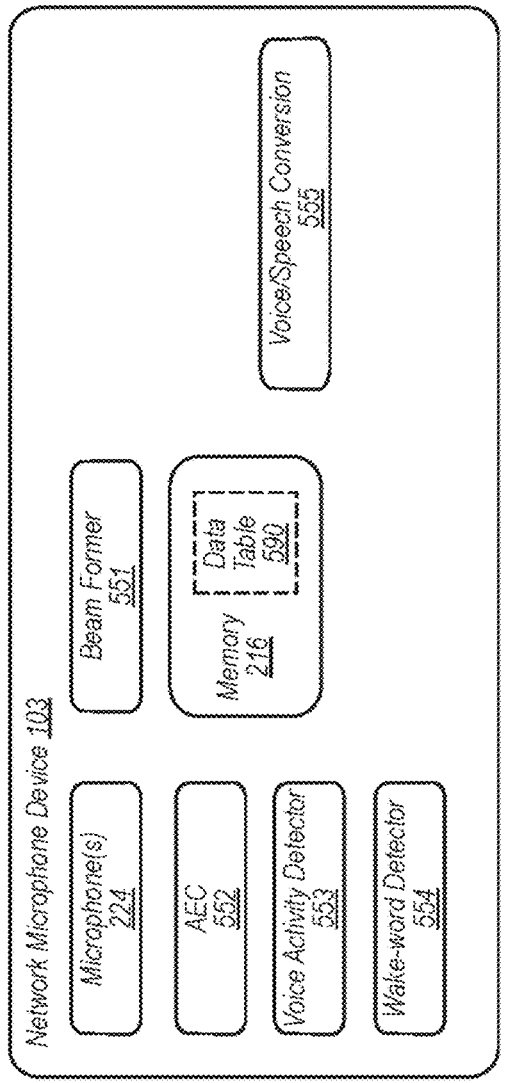
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 1), network interface 230 (FIG. 2A), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include beam former components 551, acoustic echo cancellation (AEC) components 552, voice activity detector components 553, wake word detector components 554, speech/text conversion components 555 (e.g., voice-to-text and text-to-voice), and VAS selector components 556. In various embodiments, one or more of the components 551-556 may be a subcomponent of the processor 512.

The beamforming and AEC components 551 and 552 are configured to detect an audio signal and determine aspects of voice input within the detect audio, such as the direction, amplitude, frequency spectrum, etc. For example, the beamforming and AEC components 551 and 552 may be used in a process to determine an approximate distance between a network microphone device and a user speaking to the network microphone device. In another example, a network microphone device may detective a relative proximity of a user to another network microphone device in a media playback system.

The voice activity detector activity components 553 are configured to work closely with the beamforming and AEC components 551 and 552 to capture sound from directions where voice activity is detected. Potential speech directions can be identified by monitoring metrics which distinguish speech from other sounds. Such metrics can include, for example, energy within the speech band relative to background noise and entropy within the speech band, which is a measure of spectral structure. Speech typically has a lower entropy than most common background noise.

The wake-word detector components 554 are configured to monitor and analyze received audio to determine if any wake words are present in the audio. The wake-word detector components 554 may analyze the received audio using a wake word detection algorithm. If the wake-word detector 554 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wakewords.

In some embodiments, the wake-word detector 554 runs multiple wake word detections algorithms on the received audio simultaneously (or substantially simultaneously). As noted above, different voice services (e.g. AMAZON's ALEXA®, APPLE's SIRI®, or MICROSOFT's COR-TANA®) each use a different wake word for invoking their respective voice service. To support multiple services, the wake word detector 554 may run the received audio through the wake word detection algorithm for each supported voice service in parallel.

Command criteria for a given command in a voice input may be based, for example, on the inclusion of certain keywords within the voice input. A keyword may be, for example, a word in the voice input identifying a particular device or group in the media playback system 100. As used herein, the term "keyword" may refer to a single word (e.g., "Bedroom") or a group of words (e.g., "the Living Room").

In addition or alternately, command criteria for given command(s) may involve detection of one or more control state and/or zone state variables in conjunction with detecting the given command(s). Control state variables may include, for example, indicators identifying a level of volume, a queue associated with one or more device(s), and playback state, such as whether devices are playing a queue, paused, etc. Zone state variables may include, for example, indicators identifying which, if any, zone players are grouped. The VAS selector components 556 may store in the memory 216 a set of command information, such as in a data table 590, that contains a listing of commands and associated command criteria, which are described in greater detail below.

In some embodiments, one or more of the components 551-556 described above can operate in conjunction with the microphone(s) 224 to detect and store a user's voice profile, which may be associated with a user account of the media playback system 100. In some embodiments, voice profiles may be stored as and/or compared to variables stored in the set of command information 590, as described below. The voice profile may include aspects of the tone or frequency of user's voice and/or other unique aspects of the user such as those described in previously referenced U.S. patent application Ser. No. 15/438,749.

In some embodiments, one or more of the components 551-556 described above can operate in conjunction with the microphone array 524 to determine the location of a user in the home environment and/or relative to a location of one or more of the NMDs 103. The location or proximity of a user may be detected and compared to a variable stored in the command information 590, as described below. Techniques for determining the location or proximity of a user may include or more techniques disclosed in previously referenced U.S. patent application Ser. No. 15/438,749, U.S. Pat. No. 9,084,058 filed Dec. 29, 2011, and titled "Sound Field Calibration Using Listener Localization." Each of these applications is incorporated herein by reference in its entirety. In addition, techniques for determining the location or proximity of a user may include or more techniques disclosed in U.S. Pat. No. 8,965,033 filed Aug. 31, 2012, and titled "Acoustic Optimization" is incorporated herein by reference in its entirety.

Figure 5B:
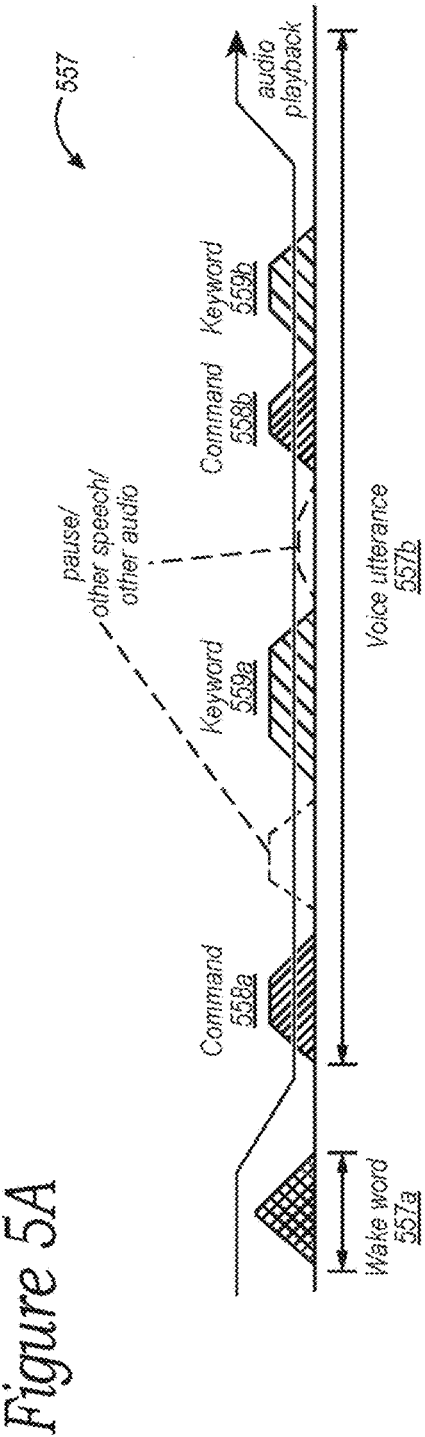
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®). In other embodiments, the voice input 557 may not include a wake word.

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in previously referenced U.S. patent application Ser. No. 15/438,749.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®).

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoke by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in U.S. patent application Ser. No. 15/277,810 filed Sep. 27, 2016 and titled "Audio Playback Settings for Voice Interaction," which is incorporated herein by reference in its entirety.

f. Example Network and Remote Computing Systems

Figure 6:
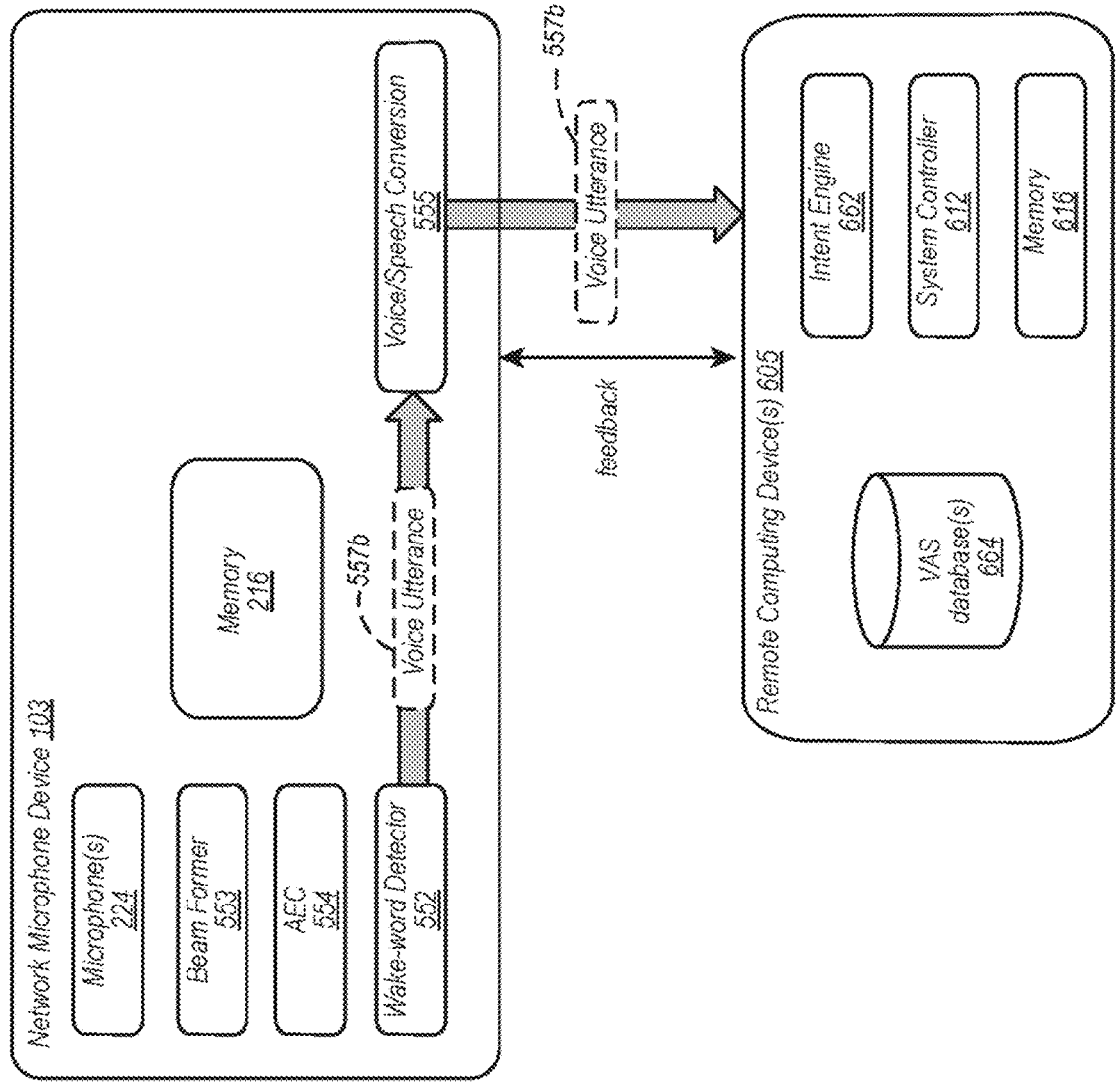
FIG. 6 is a functional block diagram of example remote computing device(s) in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B)

The remote computing device(s) 105 include a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in U.S. Pat. No. 9,811,314 filed Apr. 18, 2016, and titled "Metadata exchange involving a networked playback system and a networked microphone system," which is incorporated by reference in its entirety.

Processing of a voice input by devices of the media playback system 100 may be carried out at least partially in parallel with processing of the voice input by the remote computing device(s) 105. Additionally, the speech/text conversion components 555 of a network microphone device may convert responses from the remote computing device(s) 105 to speech for audible output via one or more speakers.

In accordance with various embodiments of the present disclosure, the remote computing device(s) 105 carry out functions of the VAS 160 for the media playback system

Figure 7:
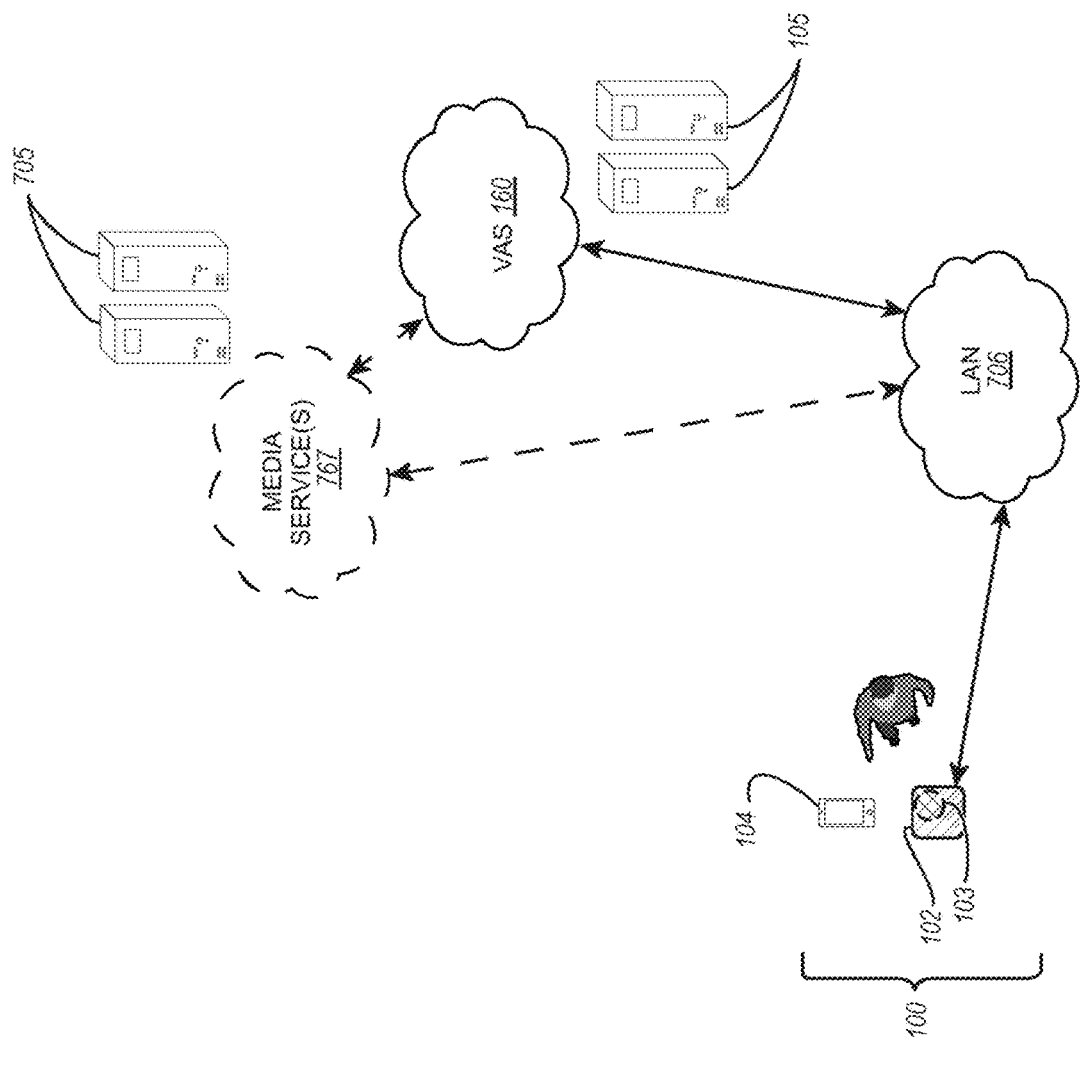
FIG. 7 is a functional block diagram of an example VAS in accordance with aspects of the disclosure.

100. FIG. 7 is schematic diagram of an example network system 700 that comprises the VAS 160. As shown, the remote computing device(s) 105 are coupled to the media playback system 100 via the WAN 107 (FIG. 1) and/or a LAN 706 connected to the WAN 107. In this way, the various playback, network microphone, and controller devices 102-104 of the media playback system 100 may communicate with the remote computing device(s) 105 to invoke functions of the VAS 160.

The network system 700 further includes additional remote computing device(s) 705 (e.g., cloud servers). The remote computing device(s) 705 may be associated with a media service provider 767, such as SPOTIFY® or PANDORA®. In some embodiments, the remote computing device(s) 705 may communicate directly the computing device(s) of the VAS 160. In addition or alternately, the remote computing device(s) 705 may communicate with the media playback system 100 and/or other intervening remote computing device(s).

III. Example Conversion to Home Graph Hierarchy

As discussed above, the media playback system 100 may be arranged into various zones and zone groups as part of a household. For the purposes of discussion, this hierarchy is referred to as the zone hierarchy, so as to distinguish from the presently disclosed home graph hierarchy. FIG. 7A is a representation of the zone hierarchy, which includes, at respective levels, a zone, a zone group, and a household, as shown. A zone includes an individual playback device 102 or, alternatively, a bonded zone of multiple playback devices 102 configured to operate as a single functional unit. A zone group includes two or more zones configured to play back audio content in synchrony. A household refers to all of the zones of the media playback system 100.

Figure 7B:
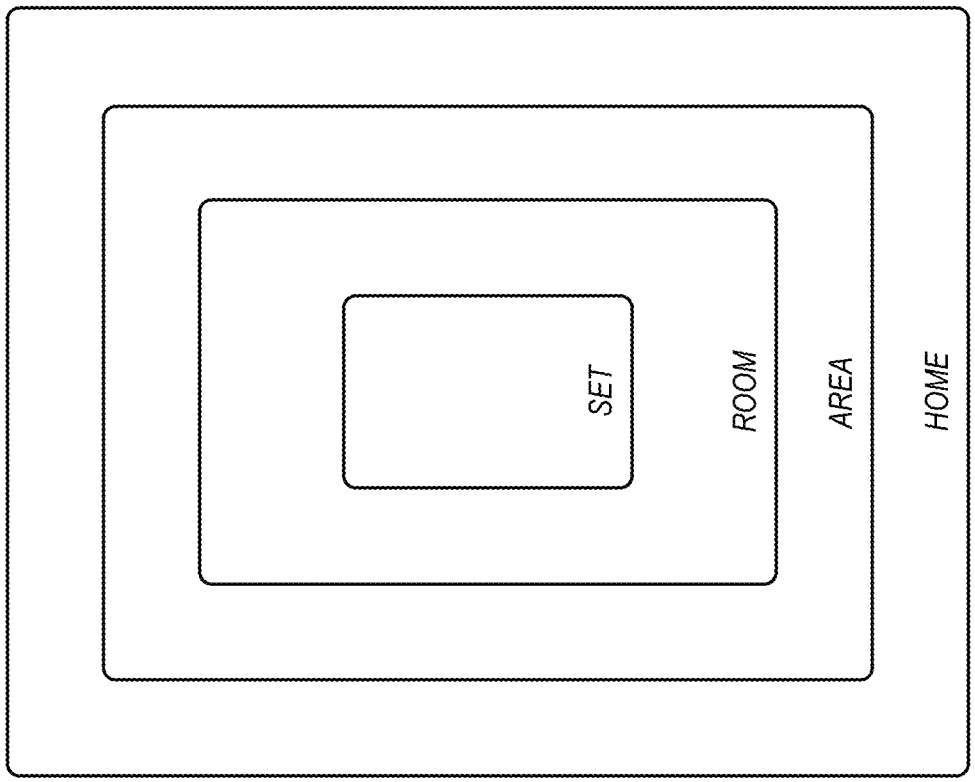
FIGS. 7A and 7B are representations of example hierarchies in accordance with aspects of the disclosure.
Figure 7A:
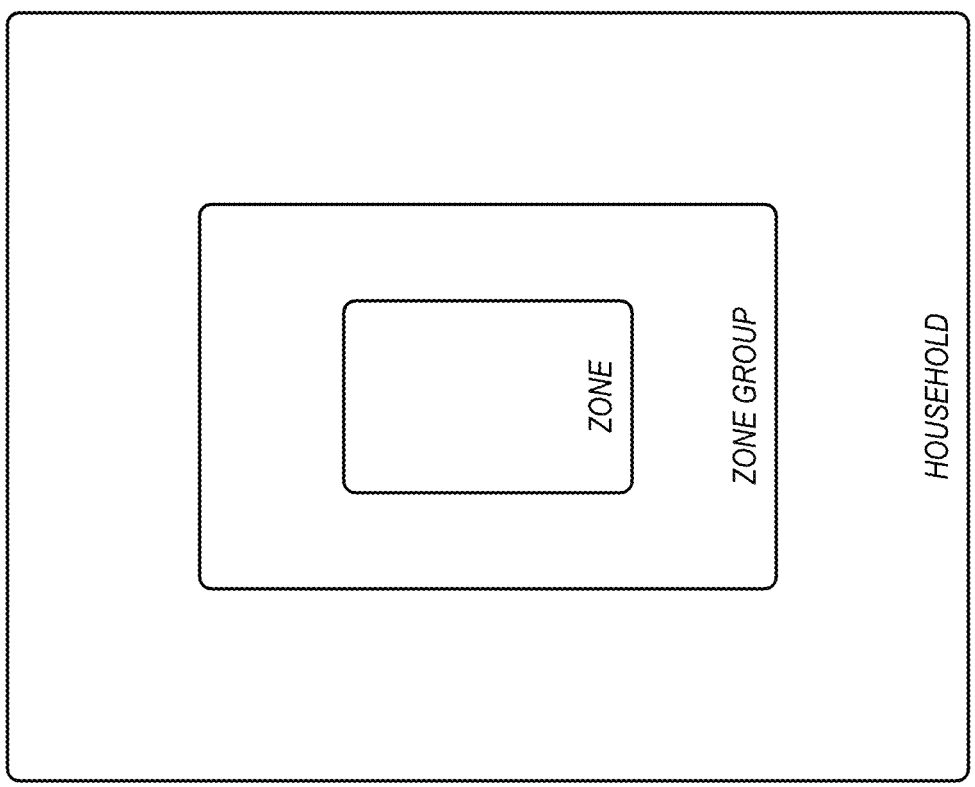

FIG. 7B is a representation of the home graph hierarchy, which includes, at respective levels, a Set, a Room, an Area, and a Home.

Like a zone, a Set includes individual playback device or, alternatively, a bonded zone of playback devices configured to operate as a single functional unit. As noted above, examples of bonded zones include a stereo pair (as shown in FIG. 3A), a surround sound configuration (as shown in FIG. 3C), or one or more playback devices bonded with a subwoofer (as shown in FIG. 3B). In each of these bonded zone configurations, the playback devices of the bonded zones play different portions of the same content (e.g., different channels (e.g., right and left) or different frequency ranges (e.g., bass vs. full-range)).

A Room of the home graph hierarchy includes zero or more Sets. Under the home graph hierarchy, a "Room" is a container for Sets in a given room of a home. In contrast to a zone, a room can include multiple playback devices (that are not part of a bonded zone). Under the zone hierarchy, each playback device (that is not part of a bonded zone) would be considered a separate zone. Two or more zones within the same physical room might be confusing, as users tend to equate rooms of their homes with zones under the zone hierarchy. Under the home graph hierarchy, a room with two playback devices could be designated as a Room with two Sets, each set including one playback device.

Generally, each room will include at least one Set. However, in some cases, a user might create Rooms for rooms of their home that do not contain a Set. Such empty Rooms might provide a placeholder for that room, and remind a user that there are no smart devices within that room.

The next level of the example home graph hierarchy is "Area." Many homes are naturally divided into areas, such as upstairs and downstairs. Under a first example implementation of home graph, an Area includes two or more rooms. For instance, a user may pre-define two Areas named "Upstairs" and "Downstairs," which include the Rooms upstairs and the Rooms downstairs in the home, respectively. Under a second example, an area contains two or more sets (possibly in different Rooms).

One distinction between a zone group and an Area is how they are formed. Areas are pre-defined (e.g., during a set-up procedure) and are generally static (similar to how the layout of a home is generally static). Individual Sets and Rooms within the Area can be individually operated within affecting the Area. In contrast, when two or more zones are joined into a zone group, a given zone of the zone group cannot be operated individually until that zone is removed from the zone group (effectively causing the zone group to cease to exist). Zone groups are created by via a series of user inputs to select the constituent zones and instruct the selected zones to form the zone group.

Areas form only when they are targeted (selected) using a GUI or VUI. This facilitates individual control of constituent Rooms and Sets when individual control is desired while also maintaining the ability to control an entire Area as a functional unit. Moreover, under this arrangement, a given Room can belong to multiple Areas. For instance, a given Home might include a "Front Area" that includes a "Living Room" Room, a "Dining Room" Room, and a "Kitchen" Room and an "Eating Area" Area that includes the "Kitchen" Room as well as the "Dining Room" Room. These two Areas may be targeted individually (e.g., "play music in "Front" or "play David Bowie in Eating Area") or together (e.g., "play music in "Front and Eating Areas") to play music in the Rooms that are the union of the two Areas.

The highest level of the home graph hierarchy is "Home." A Home refers to the entire house, and all of the Rooms, Sets, and Areas within. As such, a Home generally refers to all of the smart devices within a home. Targeting a Home or "everywhere" targets all Rooms within the Home (and all constituent Sets). Targeting the Home does not necessarily invoke an Area, as targeting the Home targets all Rooms and targeting Areas would be redundant.

Under home graph, each Set, Room, Area, and Home is assigned a human-readable name. To aid in identifying a Set based on its name, the name of a particular Set is generally indicative of its location within the home (e.g., "Living Room TV," "Kitchen Counter," "Credenza," among others). Similarly, the names of each Room with a Home correspond to the rooms of a home. Likewise, as indicated above, Area names correspond to areas of a home, such as "Upstairs" and "Downstairs" or "Front" and "Back" or "Main Level," among other examples. In some implementations, the Home may be referred to in a VUI or GUI by reference to "everywhere."

A user may configure the names of Sets, Rooms, Areas, and the Home during a set-up procedure using a controller interface (e.g., controller interfaces 440*a* and 440*b* shown in FIGS. 4B and 4C) or voice commands, among other options. The names of Sets may be stored in data storage of one or more playback devices of the media playback system 100 and shared among devices in the Home via a network (e.g., via a LAN including a network router 106).

In some examples, the media playback system 100 is configured using the zone hierarchy. Example techniques may involve automatic conversion of the zones hierarchy to the home graph hierarchy.

Figure 8A:
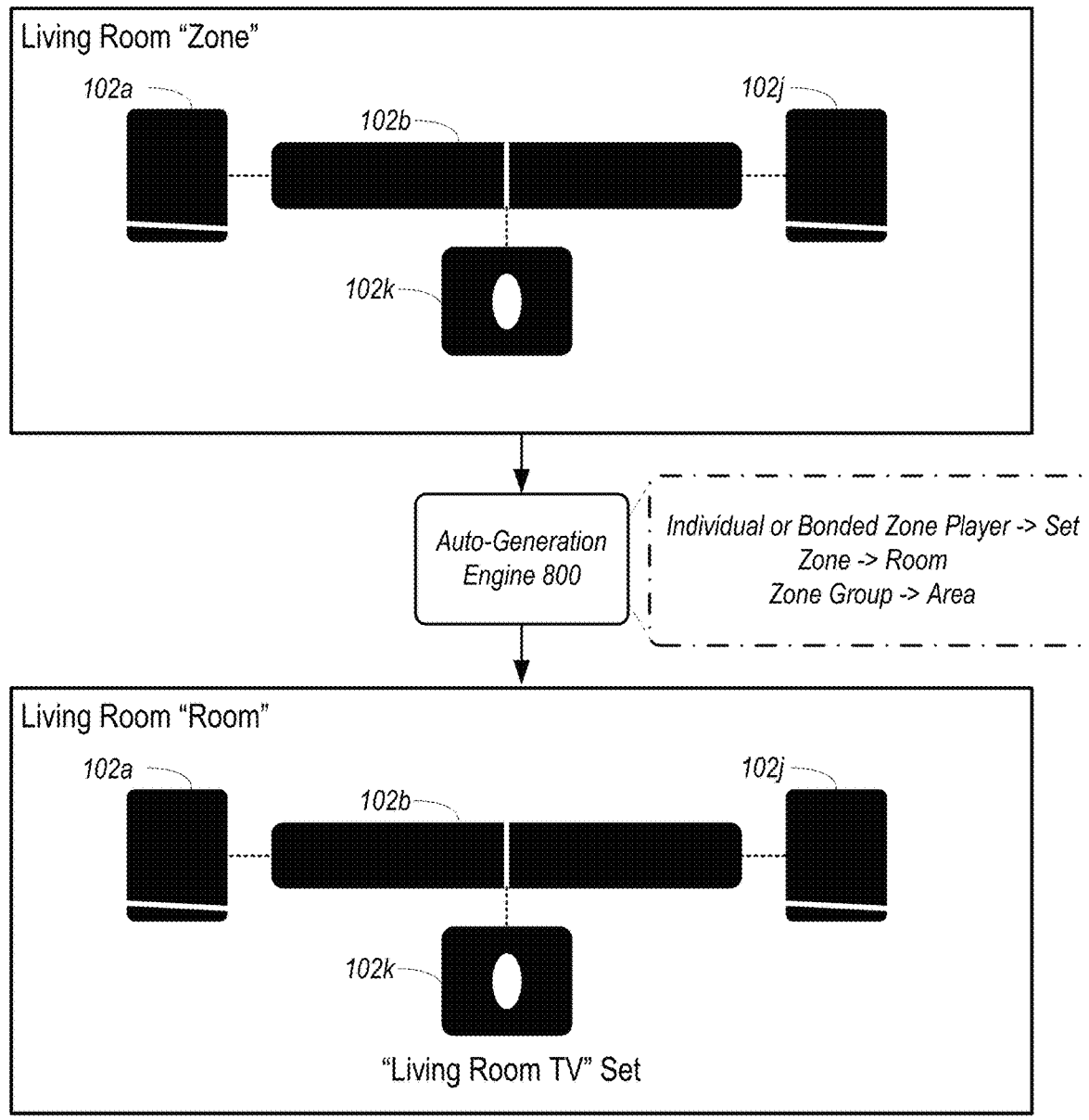
FIG. 8A is a functional block diagram of an example auto-generation engine 800 in accordance with aspects of the disclosure.

FIG. 8A shows an auto-generation engine 800. As shown in FIG. 8A, the auto-generation engine 800 converts the Living Room zone of the media playback system 100 to corresponding Rooms and Sets of the home graph hierarchy. The auto-generation engine 800 may be implemented on the playback device 102, the NMD 103, the control device 104, or the remote computing devices 105. The auto-generation engine 800 may be invoked in response to the media playback system 100 detecting a setup request from a smart hub or a discovery message from a smart hub that requests the media playback system 100 to respond with information on its devices.

In operation, the auto-generation engine 800 may receive, as input, state variables (e.g., a state table) indicating the configuration of one or more playback devices of the media playback system 100 (e.g., one or more of the playback devices 102*a-m*). The state variables indicate the zone names of the respective zones and their configuration as individual devices or bonded zones. The auto-generation engine 800 reads the configuration of each zone from the state variables and generates Rooms, Sets, Areas, and/or a Home from these configurations as output.

Based on the state variables, the auto-generation engine 800 may generate Rooms based on existing zones in the media playback system 100. For instance, as shown in FIG. 8A, the configuration of the Living Room zone in the state variables may cause the auto-generation engine 800 to form a Room. The auto-generation engine 800 may assign the new Room with the same name as the zone ("Living Room").

Further, the auto-generation engine 800 configures the playback devices 102*a*, 102*b*, 102*j*, and 102*k* in the Living Room as one or more Sets within the "Living Room" Room. If these devices are configured into a bonded zone, the auto-generation engine 800 may configure these devices as a single set (e.g., a "Living Room TV" Set). Alternatively, the auto-generation engine 800 may configure each device as a respective set (e.g., as "Front," "Right Surround," and "Left Surround" Sets).

In some cases, two or more zones under the zone hierarchy may each have names that correspond to the same room of a home. For instance, an example media playback system may have "Living Room" and "Living Room TV" zones to represent a playback device in the living room for general purpose audio playback and another that is used primarily for playing audio accompanied with video playing on a connected television. The playback devices in these two zones may be added as respective Sets to a "Living Room" Room.

In some implementations, zone names under the zone hierarchy may be configured during set-up of a new playback device via selection of a zone name from a pre-defined list of zone names corresponding to different rooms of a house. For instance, the pre-defined list may include room names commonly found in many residences such as Kitchen, Living Room, Master Bedroom, Office, and Bathroom, among others. Yet further, users might provide custom zone names instead of selecting from the pre-defined list.

When converting zones having zone names from the pre-defined list, the auto-generation may assume that these zones should be converted to Rooms, as the pre-defined zone names may correspond to rooms of a home. However, custom zone names (e.g., "Living Room TV") might not necessarily correspond to a room of a home but might instead be more closely represented as Sets within a Room. As such, in some examples, rather than automatically converting zones with custom zone names to Rooms, the media playback system may seek input from a user on whether to convert a given zone to a Room or Set. For instance, a control device of the media playback system may display one or more prompts to select between a Room or Set when converting a zone with a custom zone name.

As indicated above, Rooms and Sets each share certain characteristics with zones, but are also each different from zones. Like zones, Rooms are representative of a physical room in a home, but unlike zones, can include multiple, individually controllable playback devices (as respective Sets). Like zones, Sets can include an individual playback device (or a bonded zone), but unlike zones, are no longer representative of a physical room. As such, the auto-generation engine 800 takes certain characteristics from zones (e.g., names) and applies those characteristics when forming Rooms and takes other characteristics from zones (e.g., the individual device or bonded zone configuration) and applies those other characteristics in forming Sets.

Zone groups indicated in the state variables may be used to facilitate the creation of Areas. If the state variables indicate that a zone group is configured, the auto-generation engine 800 may cause the control device 104 to display a prompt with a selectable control that when selected, configures a new Area based on the combination of Rooms (formerly zones) in the zone group.

Further, given the transitory nature of zone groups, a zone group might not necessarily be formed at the time that the auto-generation engine 800 is run. The media playback system 100 may store historical data indicating zone groups that have been created and how frequently. If a given zone group is created at a threshold frequency (e.g., more than a threshold number of times over a period of time), the auto-generation engine 800 may cause the control device 104 to display a prompt with a selectable control that when selected, configures a new Area based on the combination of Rooms (formerly zones) in the frequently created zone group.

Figure 8B:
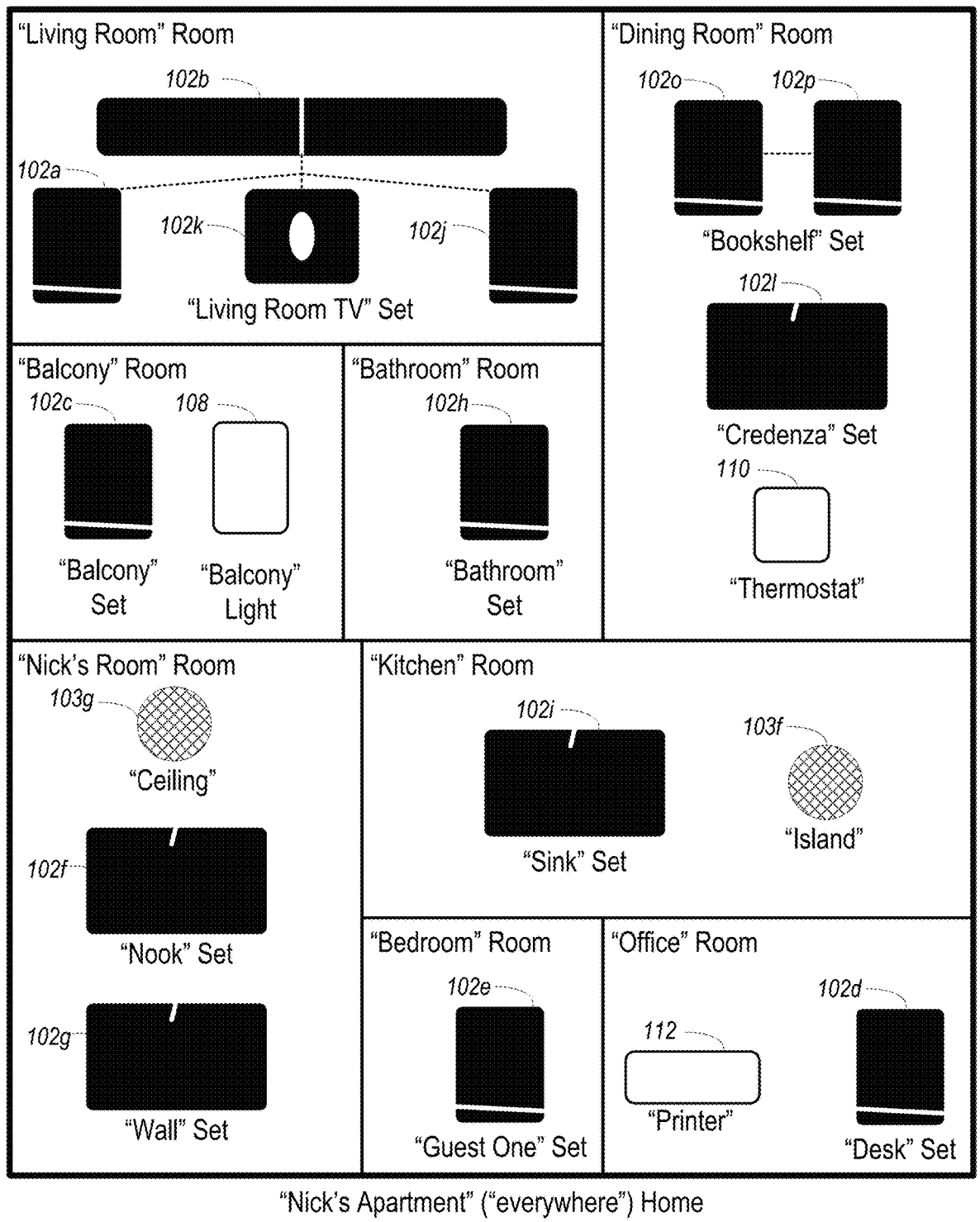
FIG. 8B is a representation of an example media playback system using a home graph hierarchy in accordance with aspects of the disclosure.

FIG. 8B is a graphical representation of a home graph hierarchy of the media playback system 100 created by auto-generation engine 800 from the zone hierarchy of the media playback system 100. As shown, the auto-generation engine 800 formed a new Home called "Nick's Apartment" (as known as "everywhere") that includes all of the playback devices 102 of the media playback system 100. The auto-generation engine 800 formed "Living Room," "Dining Room," "Balcony," "Bathroom," "Nick's Room," "Kitchen," "Bedroom," and "Office" Rooms from the previous zones. Moreover, the auto-generation engine 800 formed Sets from the individual playback devices (or bonded zones) that were previously zones.

As shown, the Rooms of media playback system 100 can also include other smart devices other than audio playback devices. For instance, the "Balcony" Room includes the illumination device 108 and the "Dining Room" Room includes the thermostat 110. In alternative implementations, smart devices that affect multiple rooms of a home (such as the thermostat 110) might not be assigned to a Room, but are instead a Set assigned to the Home generally. Further, if a smart device affects only a portion of the home, the media playback system 100 may assign that device to an Area. For instance, if a home includes a dual zone HVAC system, a Home might include an "Upstairs" Area with a first "Upstairs" thermostat 110 for that level of the home and a "Downstairs" Area with a second "Downstairs" thermostat 110 to control HVAC for the other level of the home.

IV. Example Room, Set, Area and Group Control

As described above, the playback devices 102 of media playback system 100 may be controlled via a VUI of NMD 103, a GUI displayed by the control device 104, or via the user interface 236 of a playback device 102, or a combination thereof. In some cases, configuration of playback devices into the home graph hierarchy may cause a given control command (e.g., transport control) to be carried out on multiple playback devices.

When a particular playback device 102 (e.g., playback device 102a) receives input representing a given control command on its own user interface, that control command is carried out by that playback device 102. Further, the control command is also carried out on any other playback devices 102 that are in the same Set as the particular playback device, as these playback devices 102 are part of a bonded zone with the particular playback device 102 (e.g., playback devices 102b, 102j, and 102k of the "Living Room" Set, which are in a bonded zone with playback device 102a).

A control command may extend to the Room, Area, or Home if that Room or Area (or the entire Home) is targeted for playback. For instance, if the Room that includes the particular playback device 102 is presently targeted (selected) for playback (instead of only the Set), then all playback devices in all Sets within the Room carry out the command, as all of these playback devices 102 are configured to play back in synchrony. Similarly, if an Area that includes the particular playback device 102 is presently targeted (selected) for playback (instead of only the Room), then all playback devices in all Sets within all Rooms in the Area carry out the command, as all of these playback devices 102 are configured to play back in synchrony. Finally, if the entire Home is targeted for playback, then all playback devices 102 carry out the command.

If the particular playback device 102 that receives a control command is part of a group configuration, then other playback devices 102 in that group configuration will also carry out the command. Rooms, Sets, and Areas may be grouped with one another into group configurations in which playback devices 102 of the grouped Sets, Rooms, and/or Areas are configured to play back audio content in synchrony. Room Groups are denoted herein using a '+' symbol (e.g., "Living Room+Dining Room"). The zone group capability for synchronous playback is a feature of the example playback devices 102 using either the zone hierarchy or the home graph hierarchy. For instance, if playback device 102a receives a control command when the "Living Room" Room is in a Room Group with the "Dining Room" Room, then the control command is carried out by all playback devices 102 in the both the "Living Room" and "Dining Room" Rooms, as all of these playback devices 102 are configured to play back in synchrony. In various embodiments, the groups under the home graph hierarchy may incorporate example methods and systems of groupings described in U.S. Pat. No. 8,483,853 filed Sep. 11, 2007, and titled "Controlling and manipulating groupings in a multi-zone media system," which is incorporated herein by reference in its entirety.

As described above, the NMD 103 or the control device 104 may be used to control the playback device 102 of media playback system 100. Control inputs, such as transport control, targeting of Sets/Rooms/Areas/Home, volume adjustments, among other various media playback controls, received by the NMD 103 or the control device 104 may be distributed as control messaging to the physical playback devices 102 via a network provided by router 106. The particular playback devices that are instructed via control messaging to carry out a given command are dependent upon the Sets, Rooms, Areas, Home, or groups that are targeted. In some embodiments, the media playback system 100 may route control messaging from the NMD 103 or the control device 104 directly to a targeted Set or Room (e.g., via router 106).

For Rooms that include two or more Sets, each with respective playback devices 102, the media playback system 100 may route control messaging from the NMD 103 or the control device 104 directly to each Set (i.e., to each playback device of each Set) or indirectly through a Room Coordinator. The Room Coordinator is a particular playback device 102 of a given Set within a Room that, like a zone group coordinator, provides audio playback data (i.e., playback and/or synchronous playback timing information) to other Sets within the Room so as to facilitate synchronous playback among Sets within the Room. The Room Coordinator may be configured to receive control messages from the control device 103 and distribute the messages to other playback devices of other Sets within the Room. In various embodiments, the Room Coordinator may incorporate example methods and systems of zone group coordinators described in previously incorporated U.S. Pat. No. 8,234,395 filed Apr. 1, 2004, and titled "System and Method for Synchronizing Operations Among A Plurality of Independently Clocked Digital Processing Devices." In addition, the Room Coordinator may incorporate example methods and systems of zone group coordinators described in U.S. Pat. No. 9,654,545 filed Sep. 30, 2013, and titled "Group Coordinator Device Selection," which is incorporated herein by reference in its entirety.

Similarly, for group configurations that include two or more Rooms configured to play back audio content in synchrony, the media playback system 100 may route control messaging from the NMD 103 or the control device 104 directly to each Room (i.e., to each playback device of each Set within each Room) or indirectly through a Room Group Coordinator. A Room Group Coordinator is a particular playback device 102 of a Room that, like a zone group coordinator, provides audio playback data (i.e., playback and/or synchronous playback timing information) to other Rooms within the Room Group so as to facilitate synchronous playback among Rooms within the Room Group. The Room Group Coordinator may be configured to receive control messages from the control device 103 and distribute the messages to other playback devices within the Room and to playback devices of other Rooms. In various embodiments, the Room Group Coordinator may incorporate example methods and systems of zone group coordinators described in previously incorporated by reference U.S. Pat. Nos. 8,234,39 and 9,654,545.

In various embodiments, the media playback system 100 may incorporate example methods and systems for multi-zone control described in U.S. Pat. No. 7,571,014 filed Jun. 5, 2004, and titled "Method and Apparatus for Controlling Multimedia Players in a Multi-Zone System," which is incorporated herein by reference in its entirety.

In example implementations, the media playback system 100 is concurrently controllable using multiple control interfaces 440. For instance, a first control interface may be a "native" controller interface, which might be available for one or more platforms (e.g., iOS®, Android®, Windows®, MAC®, etc). Multiple instances of this controller interface on different physical control devices 104 may concurrently control the media playback system 100. A second control interface may be a "third-party" control interface. Access to the media playback system 100 may be provided through an Application Programming Interface (API) to allow third-parties to make alternate control interfaces available. For instance, a smart home service provider might publish a controller interface that includes controls for the media playback system 100, as well as other smart home devices such as smart plugs, smart lights, NMDs, and others.

Further, such a controller interface may include controls for media playback systems from multiple manufacturers which adhere to a standard (e.g., AirPlay®). The media playback system(s) may incorporate example methods and systems described in application Ser. No. 15/714,950 filed Sep. 25, 2017, and titled "Grouping in a System with Multiple Media Playback Protocols," which is incorporated herein by reference in its entirety. In addition, the media playback system(s) may incorporate example methods and systems described in application Ser. No. 15/714,882 filed Sep. 25, 2017, and titled "Networked Device Group Information in a System with Multiple Media Playback Devices," which is incorporated herein by reference in its entirety. In addition, the media playback system(s) may incorporate example methods and systems described in application Ser. No. 15/714,927 filed Sep. 25, 2017, and titled "Grouped Zones in a System with Multiple Media Playback Protocols," which is incorporated herein by reference in its entirety.

Under the home group hierarchy, media playback systems from multiple manufactures may be configured into the same Home. The different levels of the home graph hierarchy may help with partitioning these different systems into functional units, which may simplify control. For instance, a first media playback system may be assigned into a first set of Rooms and/or Sets that use a first API to generate control messaging, while a second media playback system is assigned into a second set of Rooms and/or Sets that use a second API to generate control messaging. These different APIs may utilize different control messaging techniques, such as the different control messaging techniques described above.

V. Example Control of Sets, Rooms, Areas, and Home Using VUI

Further example techniques involve control of the various Sets, Rooms, Areas within a Home using various user interfaces, such as one or more VUIs. Names of Sets, Rooms, Areas within a Home are used to target the smart device(s) (e.g., playback devices 102) within a given Set, Room, or Area.

Figure 9A:
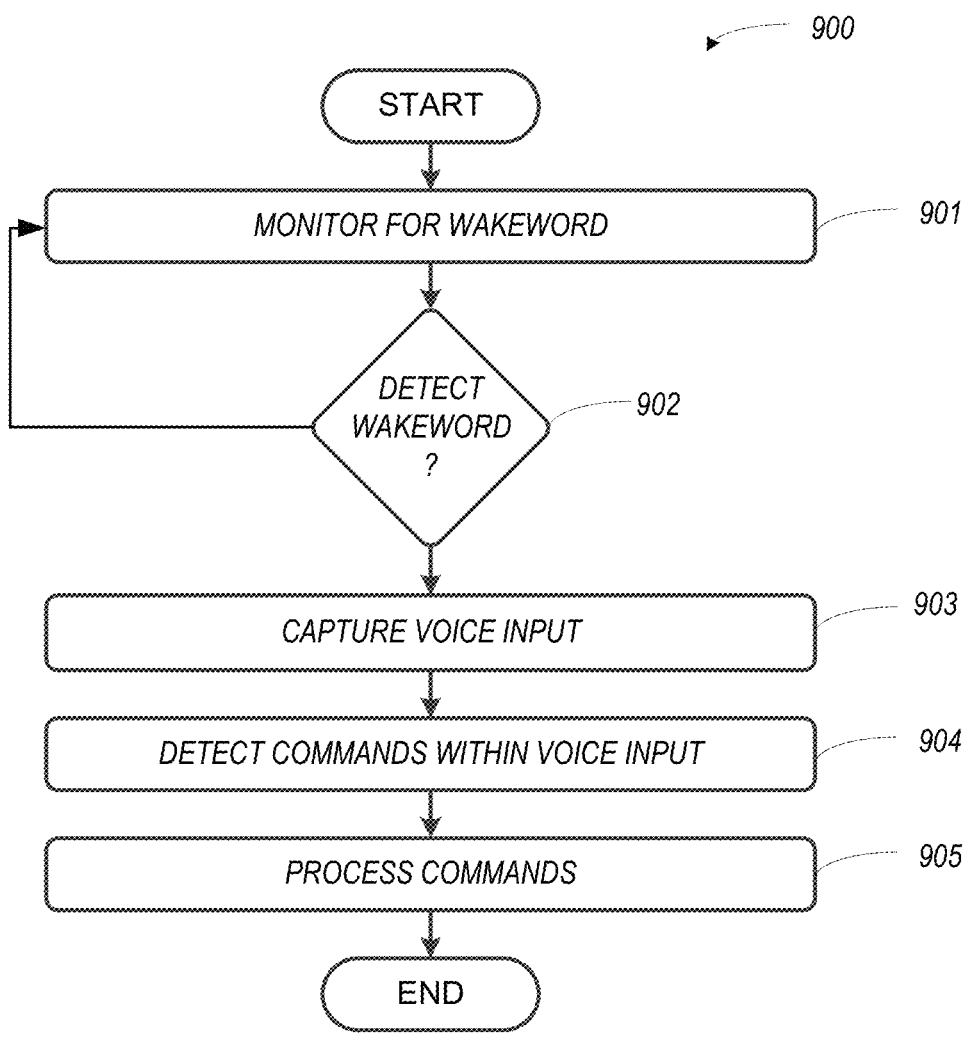
FIG. 9A is a flow diagram of an example method for invoking a voice assistant service in accordance with aspects of the disclosure.

FIG. 9A is an example flow diagram of a method 900 for controlling Sets, Rooms, Areas within a Home with a VUI. The method 900 presents an embodiment of a method that can be implemented within an operating environment involving, for example, the media playback system 100 or another media playback system configured in accordance with embodiments of the disclosure.

The method 900 may involve transmitting and receiving information between various devices and systems as described herein and/or in previously referenced U.S. patent application Ser. No. 15/438,749. For example, the method may involve transmitting and receiving information between one or more of the playback, network microphone, controller, and remote computing devices 102-104 of the playback system, and the remote computing device(s) 105. Although the blocks in FIG. 9 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flow diagrams show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. The computer readable medium may be comprised by one or more of the memories described above with reference to the various playback, network microphone, controller, and remote computing devices. In addition, for the method 900 and other processes and methods disclosed herein, each block in FIG. 9 may represent circuitry that is wired to perform the specific logical functions in the process.

In some embodiments, the method 900 may further involve receiving user input for launching an application, receiving user and user account information, determining system parameters, interacting with a music service, and/or interacting with a controller, such as for displaying, selecting, and entering system information. In various embodiments, the method 800 may incorporate example methods and systems described in application Ser. No. 15/223,218 filed Jul. 29, 2016, and titled "Voice Control of a Media Playback System," which is incorporated herein by reference in its entirety.

Referring back to FIG. 9, at blocks 901 and 902, the method 900 involves monitoring for and detecting a wake word in a voice input. For instance, the media playback system 100 may analyze received audio representing voice input to determine if wake words are represented. The media playback system 100 may analyze received audio using one or more wake word detection algorithms, such as via a wake-word detection component, as discussed above.

At block 903, the method 900 involves capturing the voice input following detection of the wake word at blocks 901 and 902. In various embodiments, the voice input may be captured via one or more of the NMDs 103 of the playback system 100. As used herein, the terms "capture" or "capturing" can refer to a process that includes recording at least a portion of a voice input, such as a voice utterance following the wake word. In some embodiments, the captured voice input may include the wake word. In certain embodiments described below the terms "capture" or "capturing" can also refer to recording at least a portion of a voice input and converting the voice input to a particular format, such as text, using e.g., speech to text conversion.

At block 904, the method 900 involves detecting one or more commands 992 (FIG. 9B) within voice input captured at block 904 and processing those commands at block 905. In various embodiments, the method 900 may detect commands by parsing voice input and determining if one of the command 992 has a syntax that matches a syntax found in the captured voice input. In this manner, the method 900 may using the matching syntax to detect an intent of a command in the voice input. The matching syntax may be a word, a group of words, a phrase, etc. The method 800 may process commands using VAS 160

Figure 9B:
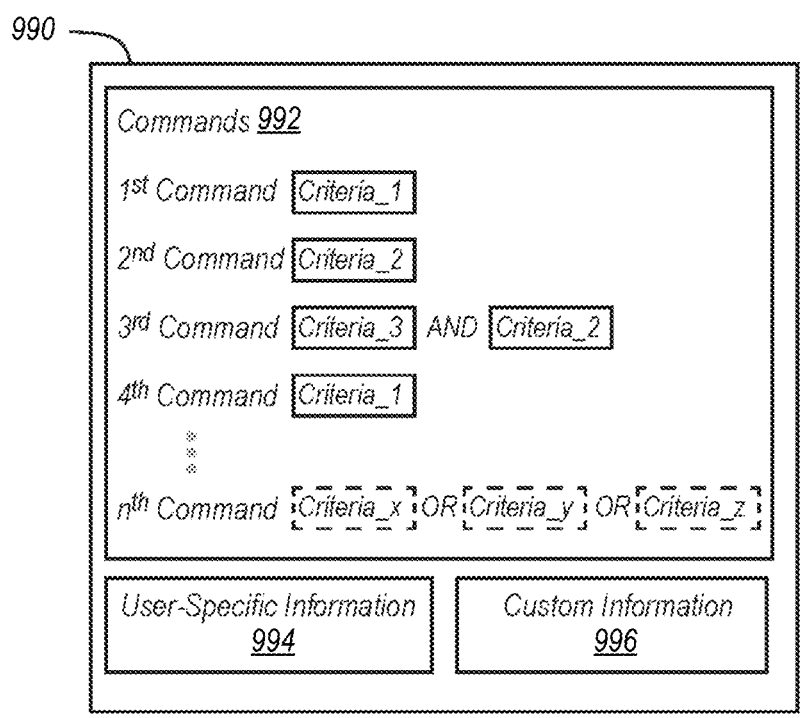
FIG. 9B is a block diagram of an example set of command information in accordance with aspects of the disclosure.

The media playback system 100 may store a set of command information, such as the set of command information 590 stored in the memory 216 of a network microphone device. Referring to FIG. 9B, an example set of command information 990 may contain a listing of commands 992. The set of command information 990 may be a data table or other data structure. The set of command information 990 may be stored, for example, in the memory of one or more of the playback, controller, network microphone, and/or remote computing devices 102-105. In some embodiments, the set of command information 990 may be accessible via the metadata exchange channel and/or any other communication path between the media playback system and a remote computing system.

In the illustrated example, the set of commands 992 includes $1^{st}$ through $n^{th}$ Commands. As an example, the $1^{st}$ Command may be a command for initiating playback, such as when the user says "play music." The $2^{nd}$ Command may be a control command, such as a transport control command, for e.g., pausing, resuming, skipping, playback. For example, the $2^{nd}$ command may be a command involving a user asking to "skip to the next track in a song." The $3^{rd}$ Command may be a zone targeting command, such as command for grouping, bonding, and merging playback devices. For example, the $3^{rd}$ command may be a command involving a user asking to "group the Living Room and the Dining Room."

As further shown in FIG. 9B, the commands 992 are associated with command criteria also stored in the set of command data 990. For example, the $1^{st}$ Command is associated with one or more first command Criteria 1, the $2^{nd}$ Command is associated with one or second command Criteria 2, and the $3^{rd}$ Command is associated with one or more third command Criteria 3.

The command criteria may involve determinations relating to certain variable instances. Variables instances may be stored with identifiers (e.g., tags), which may or may not be associated with a user account. Variable instances may be continuously, periodically, or aperiodically updated to include new custom names added or removed by the user or associated with the user's account. A custom name may be any name supplied by the user which may or might not already exist in a database.

Variables instances may be present in keywords in voice input; referenced as names and/or values stored in a state table; and/or dynamically stored and modified in a state table via one or more the playback, network microphone, controller, and remote computing devices 102-105. Example variable instances may include zone variable instances, control state variable instances, target variable instances, and other variable instances. Zone variable instances may involve, for example, identifiers representing zones, zone groups, playback devices, network microphone devices, bonded states, areas, etc., including those described above. Control state variables may involve, for example, a current control state of individual playback and network microphone devices and/or multiple devices, such as information indicating devices playing music, volumes of the devices, queues stored on the devices, etc.

Target variable instances may involve, for example, certain control state and/or advanced state information corresponding to a group of devices, bonded devices, and merged devices. Target variable instances may also correspond to a calibration state, such as equalization settings, of various devices in the media playback system 100. Under the home graph hierarchy, target variable instances may involve names of Sets, Rooms, or Areas within the home.

Other variable instances are possible. For example, a media variable instance may identify media content, such as audio content (e.g., a particular track, album, artist, playlist, station, or genre of music). In some embodiments, media variables may be identified in response to searching a database for audio or content desired by user. A media variable may be present in a voice input; referenced, maintained, and updated in a state table; or referenced in query, as discussed above. As another example, certain variable instances may indicate a location or proximity of a user within a home environment, whether a user's voice profile is detected in a given voice input, whether a specific wake word is detected, etc. Variable instances may include custom variable instances.

In certain embodiments, at least some of the criteria stored in the set of command information 990 may include a scalar vector of variable instances or other such set of variable instances. For example, Criteria_1 may include a vector that identifies zone variables representing the zones shown in the media playback system 100 of FIG. 1. Such a vector may include [Balcony, Living Room, Dining Room, Kitchen, Office, Bedroom, Nick's Room]. In one embodiments, Criteria_1 may be satisfied if two or more of the zone variables within the vector are detected as keywords in a voice input.

Some types of variables may be scalar in that the scalar variables may be formed into a vector or set which contains more than one instance of the same variable. A vector of a scalar variable may have the format or syntax when spoken by the user of "[first scalar variable] and [second scalar variable]," "[first scalar variable], [second scalar variable], and [third scalar variable]," or "[first scalar variable] [second scalar variable] [third scalar variable]." For example, a target variable may be a scalar variable, and the user may specify that media content be played in more than one target Set, Room, or Zone such as "Kitchen, Living Room, and Dining Room." In some aspects, a vector or a predefined set of scalar variables may be given a name. A predefined vector named, for example, "downstairs" may be associated with an Area. To define an Area, the control device 300 can show a list of Rooms, and a user can select from the list of Rooms those Rooms to associate with the Area "downstairs."

The set of command information 990 may also include other information, such as user-specific information 994 and custom information 996. User-specific information 994 may be associated with a user account and/or a Home identifier (HI). Custom information 996 may include, for example, custom variables, such as custom zone names under the zone hierarchy, custom Room, Set, Area, or Home names, custom playlists, and/or custom playlist names. For instance, "Nick's Faves" may be a custom playlist with a custom name created by the user.

The commands described herein are examples and other commands are possible. For example, FIGS. 10C-10E show tables with additional example playback initiation, control, and zone targeting commands. As an additional example, commands may include inquiry commands. An inquiry command may involve, for example, a query by a user as to what audio is currently playing. For example, the user may speak an inquiry command of "Tell me what is playing in the Living Room."

In one example command, the user may say "play The Beatles in the Balcony and the Living Room." In this example, the method 800 may recognize the syntax to "play" as matching a syntax for the 1$^{st}$ playback initiation Command in the set of command information 990. Additionally, the method 800 may recognize "The Beatles" as a media variable, and the "Balcony" and "Living Room" as target variables (targeting the "Balcony" and "Living Room" Rooms). Accordingly, the syntax of the command may also be represented in terms of variable instances as follows: "Play [media variable] in [first target variable] and the [second target variable]." A similar command may include "Let me hear [media variable] in [first target variable] and the [second target variable]." "Let me hear" may be a cognate of the "play" intent, as discussed below.

In some embodiments, a user may speak a command that is accompanied by one target variable instance or no target variable instance. In one example, a user may give a voice input by simply saying "play some Beatles." In such a case, the method 800 may determine an intent to "play some Beatles" on a default Set or Room. In another case, the method 800 may determine an intent to "play some Beatles" on one or more playback devices based on other command criteria that may be satisfied for the command, such if the user's presence is detected in a particular Room while the user requests to play The Beatles. For example, the VAS 160 may cause the media playback system 100 to play back some Beatles in the "Living Room" Room shown in FIG. 1 if the voice input is detected by the playback device 102a in the "Living Room" Room.

Another example command may be a play next command which may cause a selected media content to be added to the top of a queue to be played next in a zone. An example syntax for this command may be to "play [media variable] next."

Another example of a command may be a move or transfer command which may move or transfer currently playing music and/or the playback queue of a zone from one zone to another. For example, a user may speak the voice input of "Move music to [target variable]" where the command word "move" or "transfer" may correspond to an intent to move playback state to another zone. As a related example, the intent of moving music may correspond to two media playback system commands. The two commands may be to group a first zone with a second zone and then to remove the second zone from the group to in effect transfer the state of the second zone to the first zone.

When receiving a name as a target variable as part of a voice input, the method 900 may involve identifying the corresponding Set, Room, or Area. In some example implementations, the name indicated by the target variable is checked from the outside in. For example, if the name "Credenza" is given, the VAS 160 checks against Home first, Areas next, then Rooms, and then Sets until a match is found. If a match is found first at the Areas level of the home graph hierarchy, then the corresponding Area is selected for carrying out the commands associated with the voice input. This causes all devices corresponding to the commands in the Area to be instructed to carry out the command (e.g., audio playback devices for an audio playback command, such as "play music . . . "). If a match is not found until the Set level of the home graph hierarchy, then only the individual device (or bonded zone) in that Set is instructed to carry out the command. In other implementations, the name indicated by the target variable is checked from the inside out, by first checking Sets, then Rooms, than Areas.

Identifying a corresponding Set, Room, or Area from a name received as a target variable may involve traversing a topology graph, topology table, topology tree, or other data structure mapping names to Sets, Rooms, or Areas within a Home. The specific structure of the data structure mapping names to Sets, Rooms, or Areas within a Home may depend on the search.

Figure 9F:
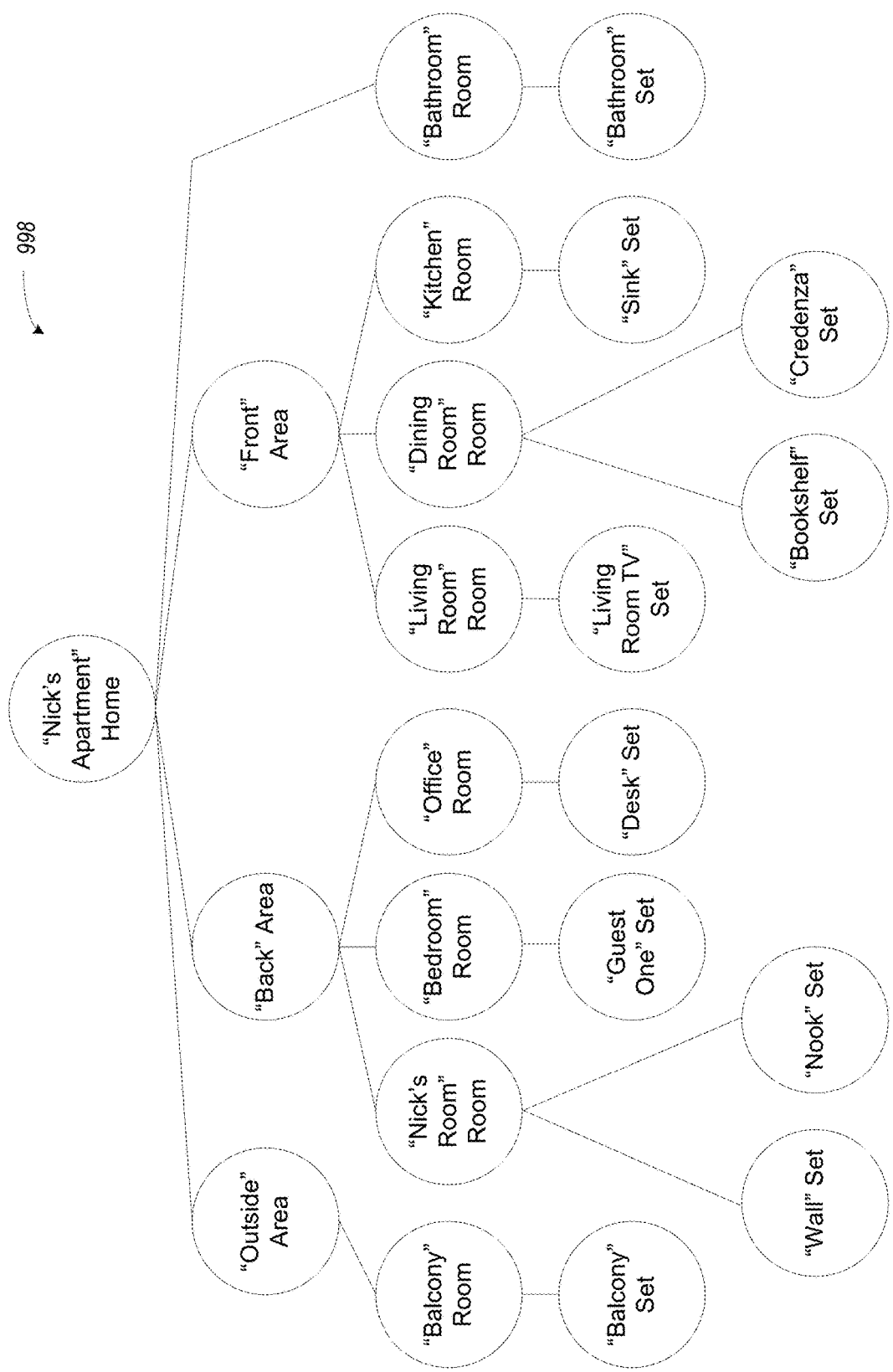
FIG. 9F is an example data structure of a home group hierarchy in accordance with aspects of the disclosure.

For instance, a given Home may be represented as a tree with Home as the Root, Areas as child nodes of the Home node, Rooms as child nodes of the Area(s), and individual Sets within the Rooms as child nodes of the Rooms (and great-grandchildren nodes of the Home). FIG. 9F shows an example data structure 998 mapping an example Home topology of media playback system 100. Although not shown in FIG. 9F, other smart devices may be mapped to the data structure as well. In alternative implementations, Sets may form multiple root nodes of a tree structure, with Rooms as child nodes of the Sets, Areas as child nodes of the Rooms, and so on.

In an attempt to speed up matching of a name as a target variable to a corresponding Room, the VAS 160 (or the media playback system 100) may maintain a look-up table (e.g., a hash table) that maps names as keys to Rooms as values. In example implementations, the look-up table may be checked first to see if the name is matched to a Room. If a match is found, the command may be carried out on the matching Room. If no match is found, the complete data structure mapping the entire Home (e.g., the tree shown in FIG. 9F) may be searched.

The intent for commands and variable instances that may be detected in voice input may be based on any of number predefined syntaxes that may be associated with a user's intent (e.g., play, pause, adding to queue, grouping, other transport controls, controls available via, e.g., the control devices 104). In some implementations, processing of commands and associated variable instances may be based on predetermined "slots" in which command(s) and/or variable(s) are expected to be specified in the syntax. In these and other implementations, sets of words or vocabulary used for determining user intent may be updated in response to user customizations and preferences, feedback, and adaptive learning, as discussed above.

In some embodiments, different words, syntaxes, and/or phrases used for a command may be associated with the same intent. For example, including the command word "play," "listen," or "hear" in a voice input may correspond to a cognate reflecting the same intent that the media playback system play back media content.

FIGS. 9C-9E show further examples of cognates. For instance, the commands in the left-hand side of the table may have certain cognates represented in the right-hand side of the table. Referring to FIG. 9C, for example, the "play" command in the left-hand column has the same intent as the cognate phrases in the right-hand column, including "break it down," "let's j am", "bust it." In various embodiments, commands and cognates may be added, removed, or edited in the table. For example, commands and cognates may be added, removed, or edited in response to user customizations and preferences, feedback, training, and adaptive learning, as discussed above. FIGS. 9D and 9E show examples cognates related to control and zone targeting, respectively.

In some embodiments, variable instances may have cognates that are predefined in a manner similar to cognates for commands. For example, a "Balcony" target variable in the media playback system 100 may have the cognate "Outside" representing the same target variable. Alternatively, the "Balcony Room" may be pre-defined as part of the "Outside" Area. As another example, the "Living Room" Room may have the cognates "Living Area", "TV Room," "Family Room," etc. to enable a user to refer to that Room by alternate names.

As noted above, the method 900 may process commands via the VAS 160. The example method 900 involves sending a voice input to the VAS 160. The method 900 may further involve processing a response from the VAS that received the voice input. Processing the response from the VA may include processing an instruction from the VAS to execute the command(s) in a voice input, such as playback, control, zone targeting, and other commands discussed above. In some embodiments, a remote computing device may be directed to initiate or control playback of content associated with media variables, which may be included in the initial voice input or be the result of a database search.

In some embodiments, processing the commands may cause media content to be retrieved. In one embodiment, media variables may be provided to the media playback system 100 as results from a database search for media content. In some embodiments, the media playback system 100 may directly retrieve media content from one or more media services. In other embodiments, the VAS may automatically retrieve media content in conjunction with processing a voice input received at block 905. In various embodiments, media variables may be communicated over the metadata exchange channel and/or any other communication path established between the media playback system 100.

In some embodiments, a database search may return results based on media variables detected in the voice input. For example, the database search may return an artist who has an album named the same as a media variable, the album name which matches or is similar to the media variable, a track named the media variable, a radio station of the media variable, a playlist named the media variable, a streaming service provider identifier of content related to the media variable and/or the raw speech-to-text conversion results. Using the example of "American Pie," the search results may return the artist "Don McLean," the album(s) named "American Pie," track(s) named "American Pie," radio station(s) named "American Pie" (e.g., identifier for Pandora radio station for "American Pie"), a music service (e.g., streaming music service such as SPOTIFY® or PANDORA®) track identifier for the track "American Pie" (e.g., SPOTIFY® track identifier for "American Pie", URI, and/or URL) and/or the raw speech-to-text result of "American Pie."

In some embodiments, the method 900 may involve updating playback queues stored on the playback devices in response to the change in a playlist or playback queue stored on a cloud network, such that the portion of the playback queue matches a portion or entirety of the playlist or playback queue in cloud network.

In response to causing an action in the media playback system 100, the method 900 may involve updating and/or storing information relating to the action at block 905. For example, one or more control state, zone state, zone identifiers or other information may be updated. Other information that may updated may include, for instance, information identifying specific playback device(s) that are currently playing a particular media item and/or a particular media item was added to the queue stored on the playback device(s).

In some embodiments, processing the commands may lead to a determination that the VAS needs additional information and audibly prompting a user for this information. For instance, the method 900 may involve prompting the user for additional information when executing a multi-turn command. In such cases, the method 900 may return to block 904 to capture additional voice input.

In various embodiments, the media playback system 100 may incorporate example methods and systems for room association and targeting described in application Ser. No. 15/682,506 filed Aug. 21, 2017, and titled "Room Association Based on Name," which is incorporated herein by reference in its entirety.

FIGS. 10A-15B are schematic diagrams showing various examples of voice inputs processed by the media playback system 100 and control interfaces which may represent states of the media playback system 100 before or after processing a voice input. As described below, command criteria associated with particular voice command(s) within voice input may provide voice control for a VAS, such as the VAS 160 discussed above. Voice input may be received by one or more of the NMDs 103, which may or may not be incorporated into one of the playback devices 102, as discussed above.

Although not shown for purpose of clarity, the voice input in the various examples below may be preceded by a wake word, such as "AMAZON's ALEXA®" or other wake words, as described above. In one aspect, the same wake word may be used to initiate voice capturing of a voice input that is to be sent to the VAS.

In one aspect, command criteria can be configured to group devices. In some embodiments, such command criteria may simultaneously initiate playback when the voice input involves a media variable and/or affected devices(s) are associated with a playback queue. FIG. 10A, for example, shows a user speaking a voice input to the NMD 103a to "play The Beatles in the living room and the balcony," and the controller interface in FIG. 10B shows the resulting grouping of the "Living Room" Room and the "Balcony" Room. In another example, the user may speak a specific track, playlist, mood, or other information for initiating media playback as described herein.

The voice input in FIG. 10A includes a syntax structure of "play [media variable] in the [first target variable] and the [second target variable]." In this example, the command to play meets command criteria that require two or more target variables as keywords in the voice input. In some embodiments, the "Living Room" Room's playback devices 102a, 102b, 102j, and 102k may remain in a bonded media playback device arrangement before and after speaking the voice input shown in FIG. 10A.

In some embodiments, the order in which the zone variables are spoken may dictate which of the playback device is designated at the "group head." For example, when the user speaks a voice input that contains the keyword "Living Room" followed by the keyword "Balcony," this order may dictate that the "Living Room" Room is to be the group head. The group head may be stored as a zone variable in the set of command information 990. The group head may be a handle for referring to a group of playback devices. When the user speaks a voice input that contains the group handle, the VAS 160 may detect an intent referring to all of the device(s) grouped with the "Living Room" Room. In this manner, the user need not speak keywords for each Set, Zone, or Area in a group of devices when collectively controlling the devices. In a related embodiment, the user may speak a voice input to change the group head to another Set, Zone, or Area. For example, the user may change the group head of the "Living Room" Room to be the "Balcony"

Room (in such a case the interface may show the order of the group as Balcony+Living Room rather than Living Room+Balcony).

In an alternate example, FIG. 10C shows a user speaking a voice input "to play The Beatles," but omitting the other keywords in the voice input of FIG. 10B. In this example, music by The Beatles may be played on a default Set, Room, or Area, which may be pre-defined.

Figure 11B:
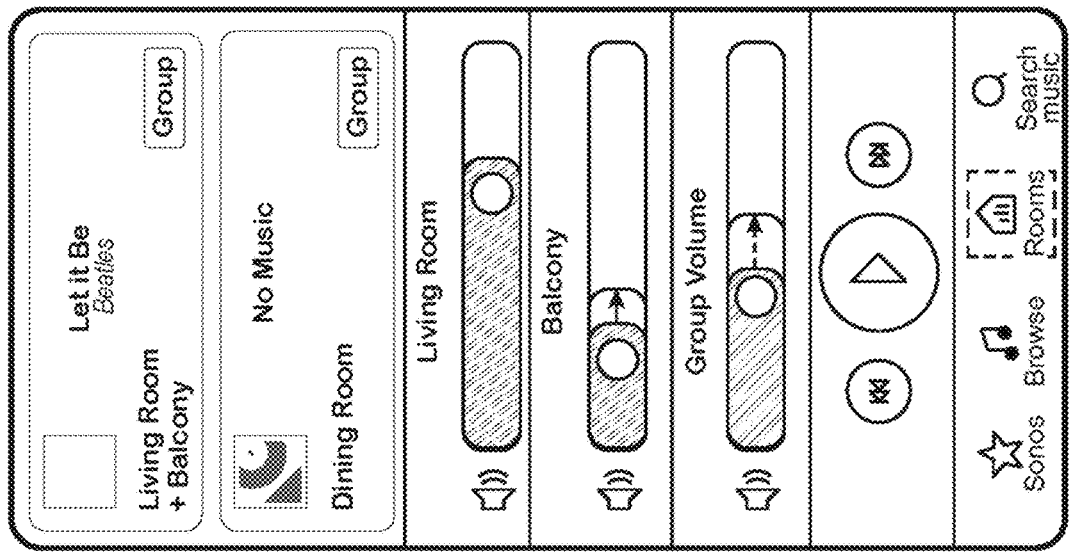
FIGS. 11A and 11B are diagrams showing example voice inputs for invoking a VAS in accordance with aspects of the disclosure.
Figure 11A:
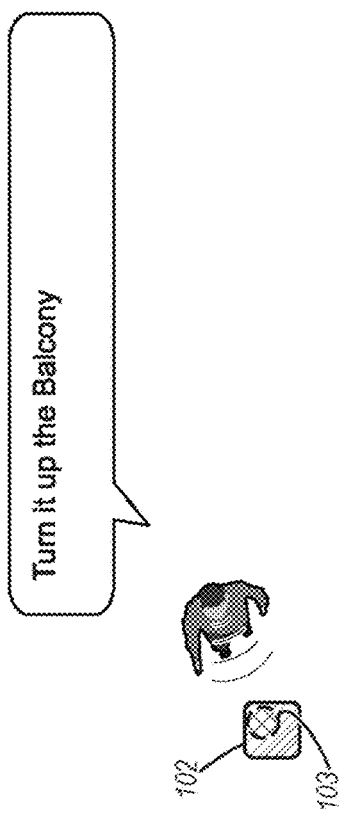

In yet another aspect, a name may refer to two or more elements in a home graph. For example, a user that speaks the voice input to "turn up the Balcony," as shown in FIG. 11A may refer to either the "Balcony" Room or the "Balcony" Set, which have the same name. Resolving whether the user intended the "Balcony" Room or "Balcony" Set may be resolved by navigating a data structure (e.g., data structure 998) to find the first matching name.

Yet further, a Set may share a name with another device in the same Room. For instance, illumination device 108 may also be named "Balcony." The media playback system 100 may resolve such conflicting element names by determining whether the user is in the vicinity of the playback device 102c and/or whether the "Balcony" is currently playing based on an associated control variable.

In a related aspect, the VAS 160 may determine to increase the volume of the playback device 102c in the "Balcony" Room when the user is in its vicinity, but not the volume in the "Living Room" Room where the user is not located. In such a case, the media playback system 100 may increase the volume in the "Balcony" Room, but not the "Living Room," Room as shown in FIG. 11B.

In various embodiments, voice inputs may be processed in conjunction with other inputs from the user via the individual playback, network microphone devices, and controller devices 102-104. For instance, a user may independently control the group volume, the individual volumes, playback state, etc. using the soft buttons and control features on the interface shown in FIG. 11B. Additionally, in the example of FIG. 11B, the user can press the soft button labeled "Group" to access another interface for manually grouping and ungrouping devices. In one aspect, providing multiple ways of interacting the media playback system 100 via voice inputs, controller inputs, and manual device inputs may provide seamless continuity of a control for an enhanced user experience.

As another grouping/ungrouping example, a voice input to "play Bob Marley in the Balcony," may cause the "Balcony" Room to automatically ungroup from the "Living Room" Room. In such a case, the "Balcony" Room may play Bob Marley and the "Living Room" Room may continue to play The Beatles. Alternately, the "Living Room" Room may cease playback if the command criteria dictate such as if the "Living Room" Room is no longer a group head of a group of playback devices. In another embodiment, the command criteria may dictate that the devices do not automatically ungroup in response to playback initiation commands.

Figure 12B:
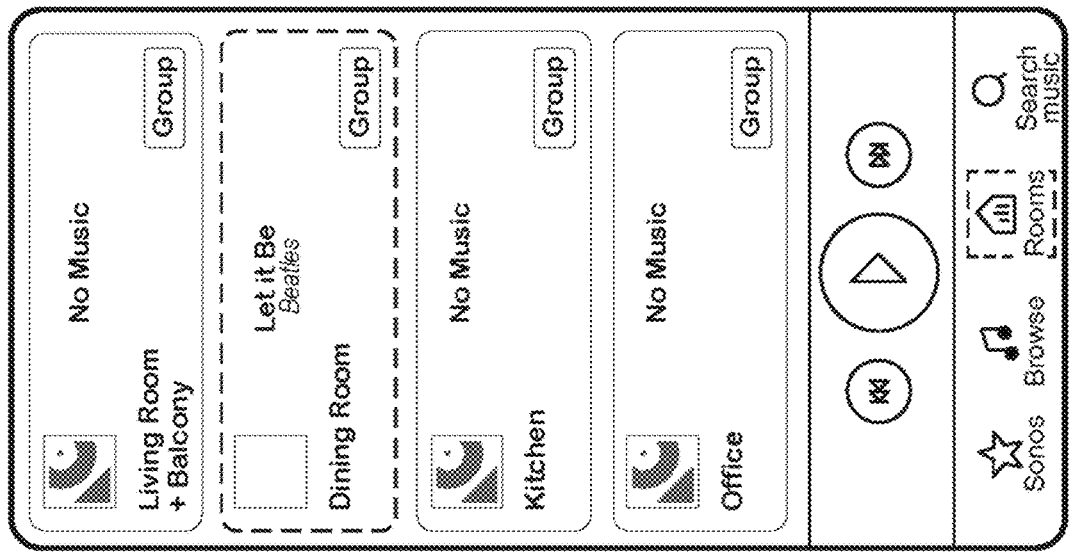
FIGS. 12A and 12B are diagrams showing example voice inputs for invoking a VAS in accordance with aspects of the disclosure.
Figure 12A:
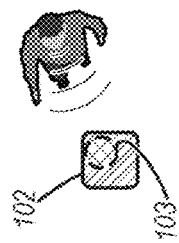

Command criteria may be configured to move or transfer currently playing music and/or the playback queue of a zone from one zone to another. For example, a user may speak the voice input of "move music from the Living Room to the Dining Room," as shown in FIG. 12A. The request to move music may move the music playing in the "Living Room" Room to the "Dining Room" Room, as shown in the controller interface of FIG. 12B.

In a related example, the user may move music to the "Dining Room" Room by speaking the voice input of "move music here" directly to the NMD 103f near the "Dining Room" Room shown in FIG. 1. In this case, the user does not expressly refer to the "Dining Room" Room, but the VAS 160 may infer the intent based on the user's proximity to the dining room. In related embodiments, the VAS 160 may determine to move the music to the "Dining Room" Room rather than another adjacent Room (such as the "Kitchen" Room) if it determines that the NMD 103f is bonded to the playback device 102l in the "Dining Room" Room.

In another example, the playback system 100 may infer information from metadata of currently playing content. In one such example, the user may speak "Move let it Be' (or 'The Beatles') to the Dining Room," which identifies the particular music to move to the desired Set, Room, or Area. In this way, the media playback system can distinguish between content that may be actively playing and/or queued for playback in other playback zone(s) and/or zone group(s) for determining which of the content to transfer.

In yet another example, all the devices associated with a group head, such as the "Living Room" Room, may cease playback upon moving the music from the group head to the "Dining Room" Room. In a related example, the "Living Room" Room may lose its designation as a group head when music is moved away from it.

Figure 13B:
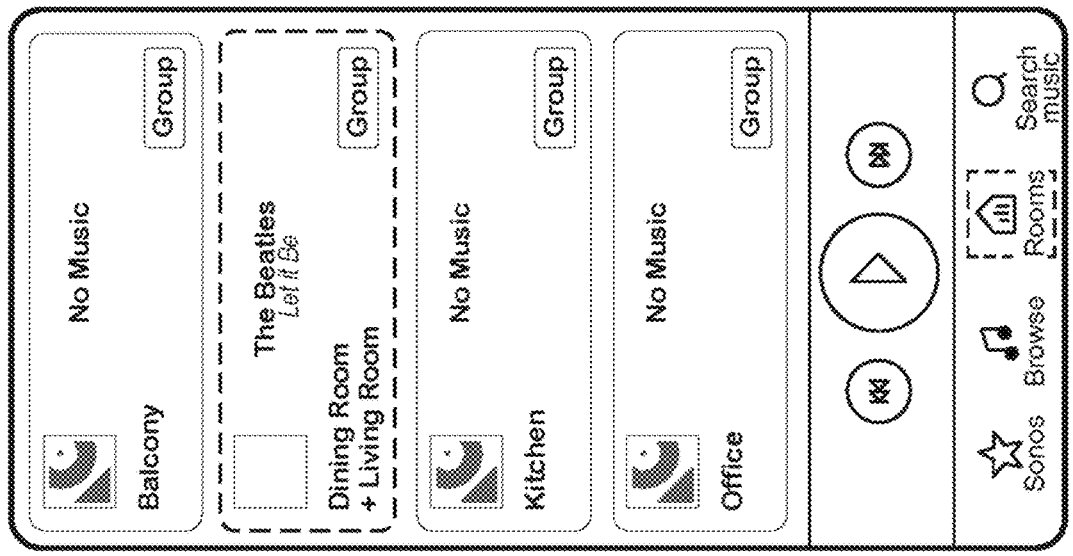
FIGS. 13A and 13B are diagrams showing example voice inputs for invoking a VAS in accordance with aspects of the disclosure.
Figure 13A:
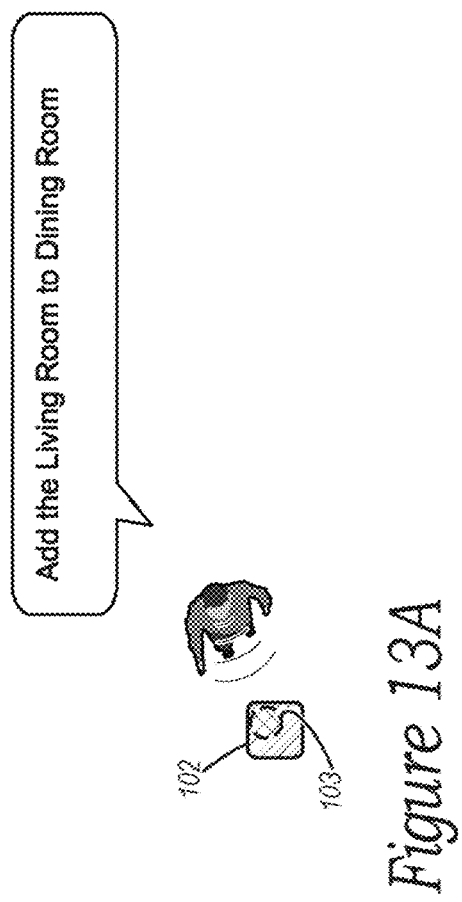

Command criteria may be configured to add devices to existing groups using voice input commands. For example, as shown in FIGS. 13A and 13B, a user may add the "Living Room" Room back to form a group with "Dining Room" Room by speaking the voice input of "add Living Room to Dining Room." In related embodiments, the user may add the "Living Room" Room by speaking the voice input of "play here, too" directly to the NMD 103a in the "Living Room" Room shown in FIG. 1. In this case, the user may not expressly refer to the "Living Room" Room in the voice input, but the VAS 160 may infer that the "Living Room" Room is to be added based on the user's proximity. In another example, if one were to assume that a listener is in the dining room when he or she has this intent, he or she may speak the command "add the living room." The "Dining Room" Room target in this case may be implied by the input device's containing Room.

Figure 14B:
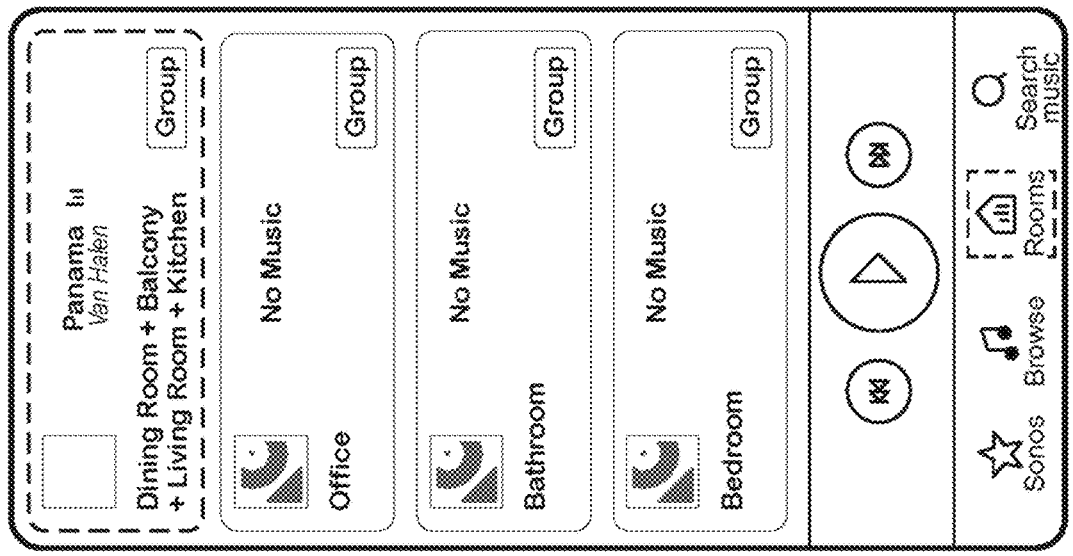
FIGS. 14A and 14B are diagrams showing example voice inputs for invoking a VAS in accordance with aspects of the disclosure.
Figure 14A:
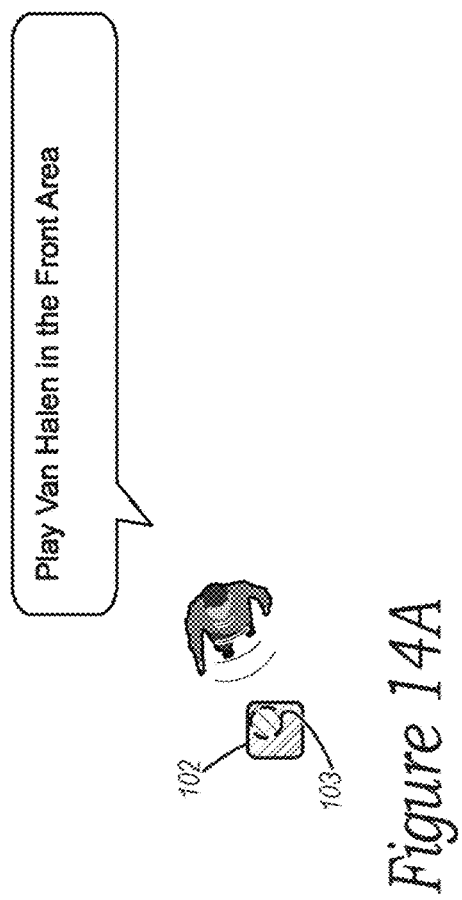

As another example of adding or forming groups, the user may instantiate a group using a voice input with a keyword associated with a custom target variable. For example, as discussed above, the user may pre-defined Areas within the Home that include a particular set of Rooms (e.g., "Front"). The user may instantiate the "Front" Area by speaking a voice input such as "play Van Halen in the Front Area," as shown in FIGS. 14A and 14B. The previous Dining Room group shown in FIG. 13B may be supplanted in response to the voice input shown in FIG. 14A.

Figure 15B:
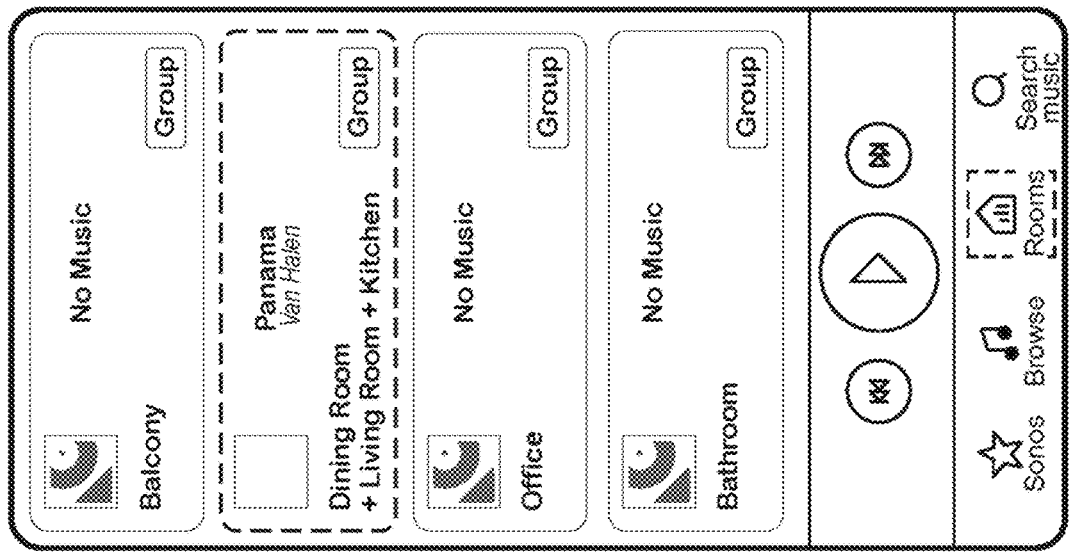
FIGS. 15A and 15B are diagrams showing example voice inputs for invoking a VAS in accordance with aspects of the disclosure.
Figure 15A:
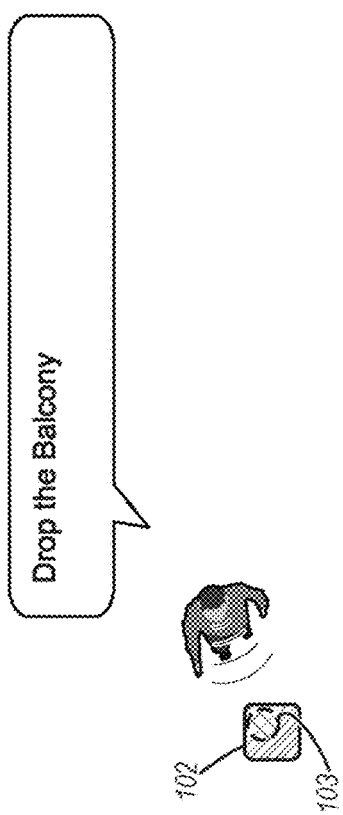

Command criteria may be configured to remove devices to existing groups using voice input commands. For example, the user may speak the voice input of "drop the Balcony" to remove the "Balcony" Room from the "Front" Area, as shown in FIGS. 15A and 15B. Other example cognates are possible, as discussed above. In yet another example, the user may speak directly to the NMD 103c in the "Balcony" Room shown in FIG. 1 to achieve the same result, such as by saying "stop here" or "stop in this room," assuming that the user is on the balcony.

VI. Example Control of Sets, Rooms, Areas, and Home Using GUI

Further example techniques involve control of the various Sets, Rooms, Areas within a Home using user interfaces, such as one or more GUIs. As described above, a GUI may work in tandem with a VUI for continuity of control. As noted above, the control device 103 may be configured to provide a controller interface 440. FIGS. 16A-H show additional controller interfaces that may be implemented by the control device 103 to control Sets, Rooms, Areas, and/or Home as defined by the home graph hierarchy.

For the purpose of illustration, FIGS. 16A-H relate to a Home that includes four Rooms, "Bedroom," "Dining Room," "Kitchen," and "Living Room." With the exception of the Dining Room, each Room in the Home includes one Set containing an individual playback device or bonded zone. The Dining Room includes two Sets ("Bookshelf" and "Credenza"), each containing an individual playback device or bonded zone. The Home also includes two pre-defined Areas ("Upstairs and "Downstairs"). The "Bedroom" Room and "Dining Room" Room are in the "Upstairs" Area while the "Kitchen" Room and "Living Room" Room are in the "Downstairs" Area.

Figures 16A, 16B:
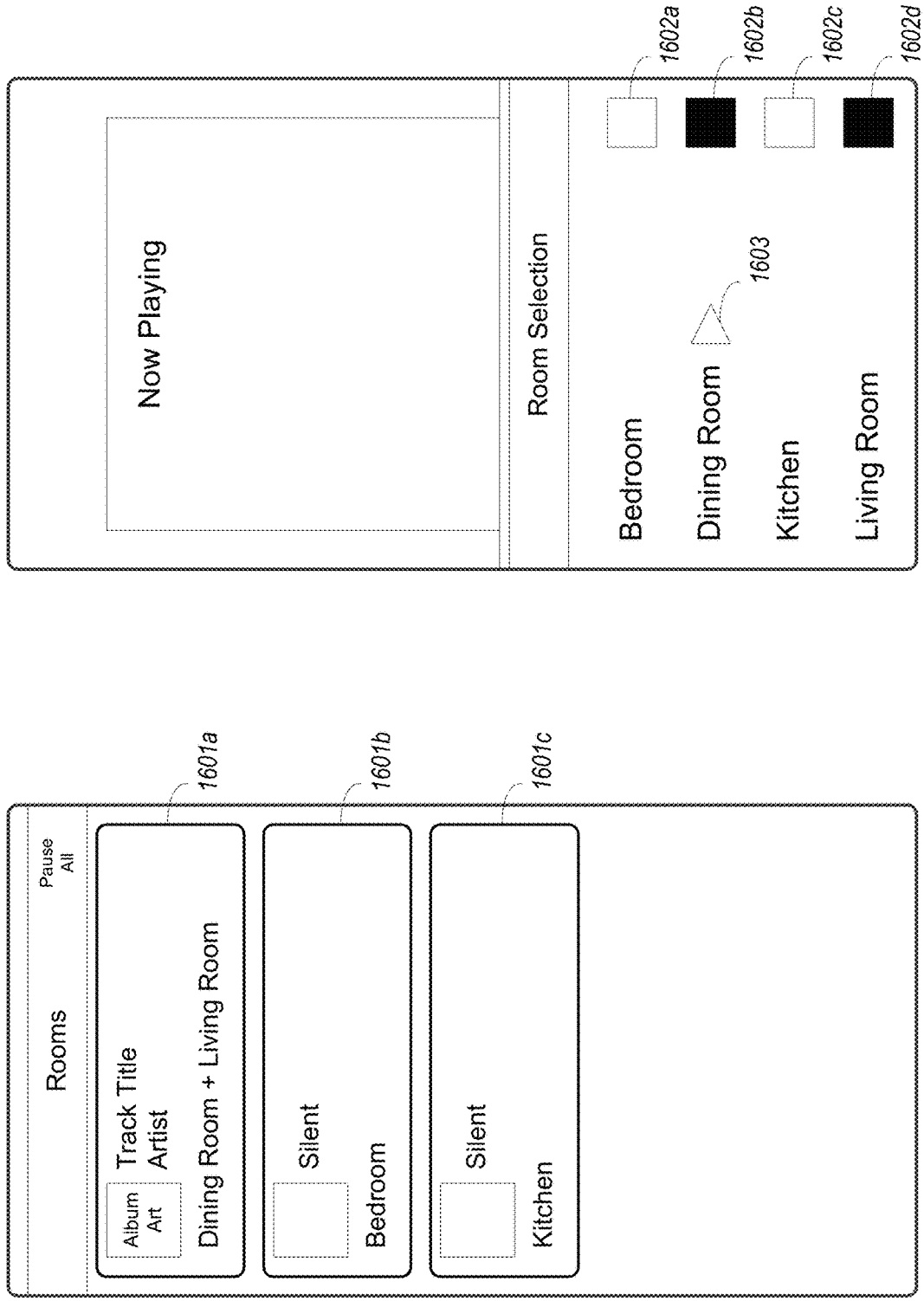

FIG. 16A shows an example of a Rooms control interface that indicates a current state of the Rooms by way of graphical elements 1601a, 1601b, and 1601c (referred to collectively as graphical element 1601). As shown by graphical element 1601a, the "Dining Room" Room and the "Living Room" Room are presently configured to play back in synchrony as part of a group configuration with the name "Dining Room+Living Room." The audio content being played back by the group configuration is indicated by way of the album art, track title, and artist. In contrast, as shown by graphical elements 1601b and 1601c, the "Bedroom" and "Kitchen" Rooms are not presently playing back audio content and are accordingly indicated as silent. In some implementations, graphical element 1601 is selectable. Selection of graphical element 1601 may show a now playing control interface for an individual Room, which may include further detail on now playing content and may include various transport and volume controls for that Room.

FIG. 16B shows an example of a Room Selection control interface that includes selectable controls 1602a, 1602b, 1602c, 1602d (referred to collectively as selectable control 1602) that indicate currently targeted Rooms. As noted above, in this example, the "Dining Room" Room and the "Living Room" Room are presently configured to play back in synchrony as part of a group configuration. As such, selectable controls 1602b and 1602d are shown as selected so as to distinguish from the non-targeted "Bedroom" and "Kitchen" Rooms, which have non-selected selectable controls 1602a and 1602d, respectively. Further, in this example, the Room picker control interface is overlaid over a now playing control interface, which is merely one example of how a Room picker interface may be displayed within a control interface comprising multiple interfaces corresponding to different control aspects of the media playback system 100.

Selectable control 1602 is dual function in that selectable control 1602 changes appearance (e.g., by changing color) to indicate a targeted Room and is selectable to toggle whether a given Room is targeted. In particular, selection of selectable control 1602a (e.g., by way of a touch input to control device 103) will toggle the "Bedroom" Room to targeted (given that the "Bedroom" Room was previously untargeted). Further, if a Room (e.g., the "Kitchen" Room) is targeted via a VUI (e.g., by a voice input such as "play music in Kitchen"), the corresponding selectable control 1602c changes appearance to indicate that the "Kitchen" Room is targeted for playback.

Within the Room Selection control interface, the "Dining Room" Room includes a control element 1603. The control element 1603 is displayed when a Room includes multiple Sets. When toggled, control element 1603 expands the Room Selection control interface to display the individual Sets in the corresponding Room, as shown in FIG. 16C. The expanded Room Selection control interface includes selectable controls 1604a and 1604b, which have similar dual function as selectable control 1602, but operate with respect to the "Bookshelf" and Credenza" Sets instead of the Rooms.

FIG. 16D shows an alternate Room Selection interface that lists the Sets and Rooms of the Home. As illustrated by the "Dining Room" Room and "Bookshelf" and "Credenza" Sets, Sets within a Room are indicated in a single list element. This alternate Room Selection Interface includes selectable controls 1605a, 1605b, 1605c, 1605d, and 1605e (referred to collectively as selectable control 1605). Selectable control 1605 has a similar dual function as selectable controls 1602 and 1604.

In an example, the control interfaces shown in FIGS. 16C and 16D could be used to control the same media playback system 100. In this particular example, the controller interface shown in FIG. 16C is used with a first protocol or standard (perhaps via a first API) and FIG. 16D is used with a second protocol or standard (perhaps via a second API) to indicate the state of the same media playback system 100.

In some implementations, the Rooms control interface may also indicate Areas, perhaps only if an Area is targeted for playback. FIG. 16E shows an example of a Rooms control interface when the pre-defined "Downstairs" Area are targeted for playback. Recall that an Area can be targeted for playback via a VUI by way of a voice input such as "play the Beatles downstairs" or via a GUI as discussed below. Moreover, the control device 103 may display the Rooms control interface shown in FIG. 16E or the Room Selection interface in FIG. 16F in response to a voice input that targets the "Downstairs" Area for playback so as to provide visual feedback of the voice input. The control device 103 may display corresponding instances of Rooms and/or Room Selection control interfaces in response to voice inputs targeting particular Sets, Rooms, Areas, or combinations thereof.

As shown in FIG. 16E, the current state of the "Downstairs" Area (which includes the "Kitchen" and "Living Room" Rooms) is indicated by way of graphical elements 1601d. By targeting the "Downstairs" Area for playback, the "Kitchen" and "Living Room" Rooms are configured to play back in synchrony as part of a group configuration corresponding to the pre-defined "Downstairs" Area. The audio content being played back by the group configuration corresponding to the pre-defined "Downstairs" Area is indicated by way of the album art, track title, and artist. In contrast, as shown by graphical elements 1601e and 1601b, the "Dining Room" and "Bedroom" Rooms are not presently playing back audio content and are accordingly indicated as silent.

FIG. 16F shows an example of a Room Picker interface that includes a selectable control 1606 corresponding to the "Downstairs" Area. Like selectable controls 1602, 1604, and 1605, selectable control is dual function. In particular, selectable control 1606 changes appearance (e.g., by changing color) to indicate when the "Downstairs" Area is targeted and is selectable to toggle whether that Area is targeted. In particular, selection of selectable control 1606 (e.g., by way of a touch input to control device 103) will toggle the "Downstairs" Area and to targeted (given that the "Downstairs" Area was previously untargeted). Further, toggling the selectable control 1606 will also toggle selectable controls 1602*c* and 1602*d*, as these selectable controls 1602*c* and 1602*d* correspond to the "Kitchen" and "Living Room" Rooms, which are in the "Downstairs" Area.

Figure 16H:
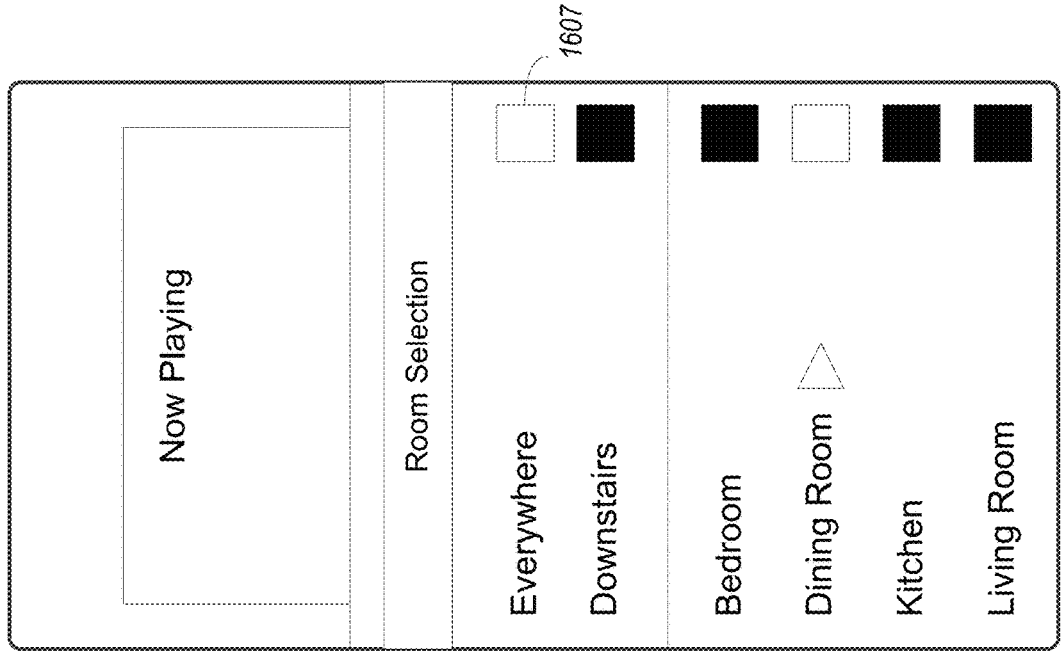
Figure 16G:
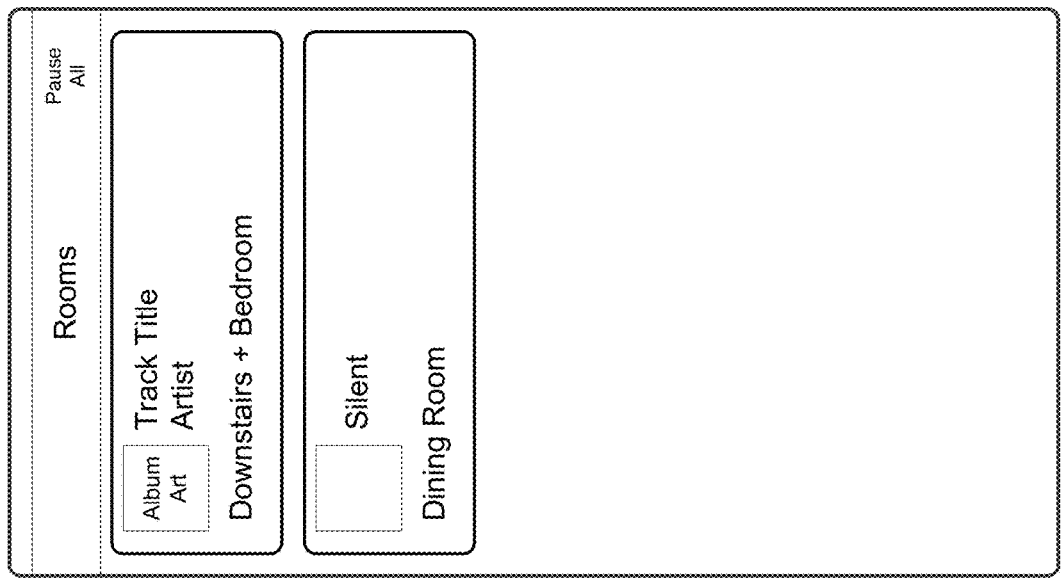

Still referring to FIG. 16F, by toggling a selectable control for a presently untargeted room (e.g., selectable control 1602 for the "Bedroom" Room), the untargeted Room is configured into a group configuration to play back in synchrony with the "Downstairs" Area. FIGS. 16G and 16H illustrate example states of the Rooms and Room Selection control interfaces after selectable control 1602 is toggled to target the "Bedroom" Room (in addition to the already-targeted "Downstairs" Area).

As shown in FIG. 16H, some implementations of the Room Selection control interface may include a selectable control 1607 that has a similar dual function as the selectable controls 1602, 1604, 1605 and 1606, but with respect to all Sets (i.e., all playback devices) within the Home.

As indicated by the FIGS. 16A-H, the Room Selection control interface can expand upward to overlay more of the now playing control interface to provide area to display controls corresponding to additional Rooms, Sets, or Areas. If all (or substantially all of the area of a display screen is used when a Home includes many Rooms, Sets, or Areas, then the Room Selection control interface may become vertically scrollable. Likewise, the Rooms control interface may become vertically scrollable when the graphical elements 1601 for various Rooms, Sets, and Areas use the available display area.

Figure 17B:
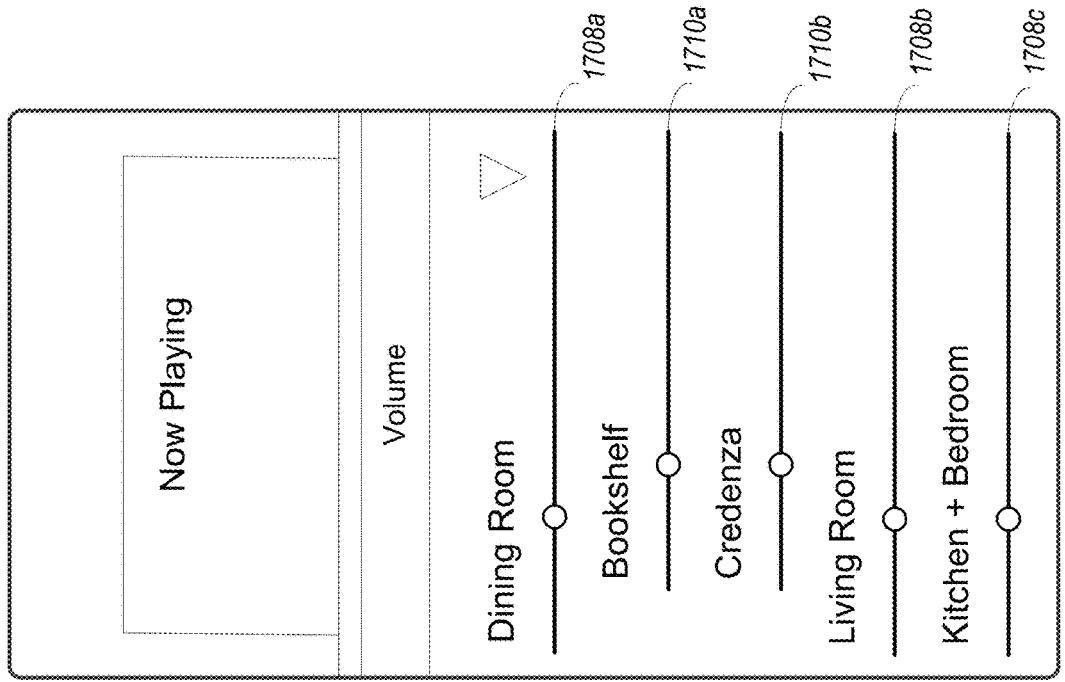
FIGS. 17A and 17B are diagrams showing example control interfaces for home graph volume control in accordance with aspects of the disclosure.
Figure 17A:
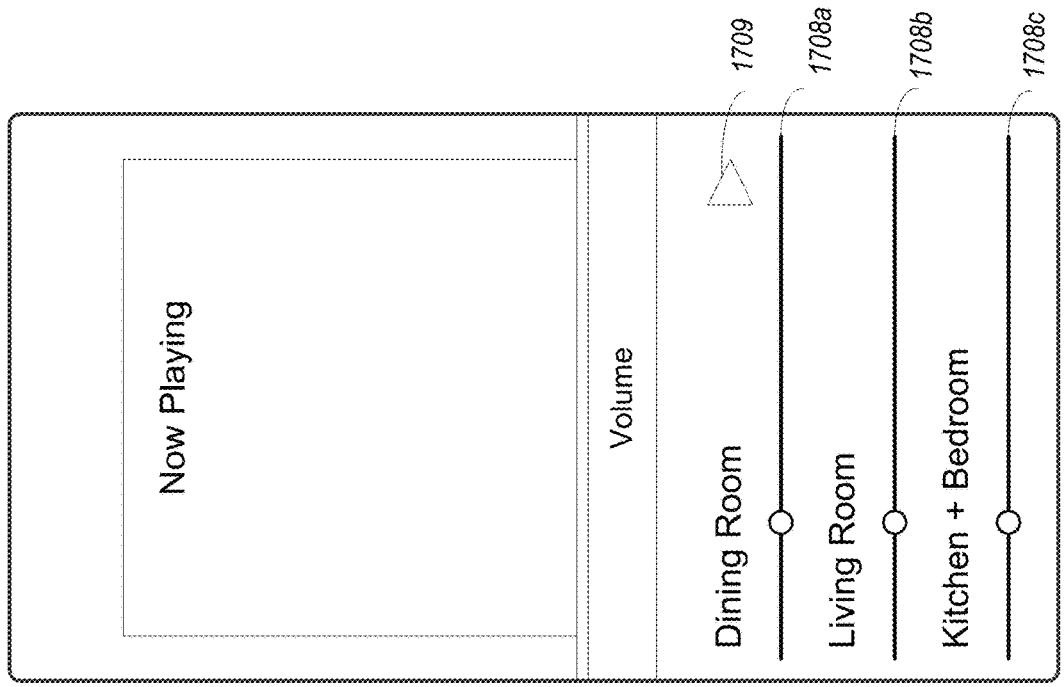

FIGS. 17A-B show additional controller interfaces that may be implemented by control device 103 to control volume of Sets, Rooms, Areas, and/or Home as defined by the home graph hierarchy. Like FIGS. 16A-H, FIGS. 17A-B relate to a Home that includes four Rooms, "Bedroom," "Dining Room," "Kitchen," and "Living Room." With the exception of the Dining Room, each Room in the Home includes one Set containing an individual playback device or bonded zone. The Dining Room includes two Sets ("Bookshelf" and "Credenza"), each containing an individual playback device or bonded zone. The Home also includes two pre-defined Areas ("Upstairs and "Downstairs"). The "Bedroom" Room and "Dining Room" Room are in the "Upstairs" Area while the "Kitchen" Room and "Living Room" Room are in the "Downstairs" Area.

FIG. 17A shows an example of a Volume control interface that indicates current volume levels of the "Dining Room" and "Living Room" Rooms as well as a "Kitchen+Bedroom" group configuration (including the "Kitchen" Room and "Bedroom" Rooms in a synchrony group) by way of volume sliders 1708*a*, 1708*b*, and 1708*c* (referred to collectively as volume slider 1708). Via input to control device 103, volume slider 1708 may be slid to the right or left to adjust volume level for the corresponding Room or group configuration. As such, the volume slider 1708 is dual function in that the control both indicates current volume level and is controllable to adjust the volume level.

Within the Volume control interface, the "Dining Room" Room includes a control element 1709. The control element 1709 is displayed when a Room includes multiple Sets. When toggled, control element 1709 expands the Volume control interface to display the individual Sets in the corresponding Room, as shown in FIG. 17B. The expanded Volume control interface includes selectable controls 1710*a* and 1710*b*, which have similar dual function as selectable control 1708, but operate with respect to the "Bookshelf" and Credenza" Sets instead of the Rooms.

As described in section IV above, a given control command (e.g., a volume adjustment) to a Set, Room, Area, or Home may be carried out by associated devices upwards or downwards in the home graph hierarchy. For instance, referring to FIG. 17B, a volume adjustment of the "Dining Room" Room via volume slider 1708*a* causes a corresponding volume adjustment of the "Bookshelf" and "Credenza" Sets (which is indicated by changes to volume sliders 1710*a* and 1710*b*), as these Sets are within the "Dining Room" Room. Likewise, a volume adjustment of a Set within a Room via the volume slider of the Set causes a corresponding volume adjustment of the Room. For example, referring again to FIG. 17B, a volume adjustment of the "Bookshelf" Set via volume slider 1710*a* causes a corresponding volume adjustment of the "Dining Room" Room (which is indicated by a change to volume sliders 1708*a*), as the "Bookshelf" Set is within the "Dining Room" Room.

Referring still to FIG. 17B, recall that the "Living Room" Room of the media playback system 100 includes a "Living Room TV" Set including a bonded zone of multiple physical playback devices 102*a*, 102*b*, 102*j* and 102*k*. As such, the volume slider 1708*b* indicates and controls volume for all four playback devices 102, treating the four physically distinct playback devices as one logical unit (i.e., a bonded zone).

Note that in FIGS. 17A and 17B, Rooms that include only one Set do not have a control element 1709 to expand the user interface to display the Set. Rather, the Room (e.g., the "Living Room" Room) serves as a stand-in for the "Living Room TV" Set. However, if the Room includes two Sets, then the control element 1709 is displayed to enable individual volume control of the each constituent Set.

If an Area is targeted for playback, the Volume control interface may include a volume slider for that Area. Volume adjustments to the volume slider for an Area cause corresponding volume adjustments to Rooms and Sets within that Area. Likewise, volume adjustments to Rooms and Sets within the Area cause a corresponding volume adjustment to the Area. The degree of volume adjustment made to a higher or lower level of the home graph hierarchy when volume of a Set, Room or Area is adjusted is controlled via a volume adjustment algorithm.

In some implementations, the volume adjustment algorithm is based on averaging of volume levels such that the volume level of a Room or Area is an average of the Sets and/or Rooms within that Room or Area. For example, referring to FIG. 17B, if the volume level of the "Bookshelf" Set within the "Dining Room" Room is adjusted upwards via the volume slider 1710*a*, the volume level of that the "Dining Room" Room is adjusted upwards as well such the its volume level is an average of the volume levels of the "Bookshelf" and "Credenza" Sets. As another example, if the volume level of the "Dining Room" Room is adjusted downwards via the volume slider 1708*a*, then the volume levels of both the "Bookshelf" and "Credenza" Sets are adjusted downwards proportionally such that the lower volume level of the "Dining Room" Room remains an average of the volume levels of the "Bookshelf" and "Credenza" Sets. The volume adjustment algorithm works on the same principle for Areas in that the volume slider for an Area is an average of the Rooms within that Area (which are in turn a function of the Sets within each Room).

Under another volume adjustment algorithm (referred to herein as the, volume sliders for the lowest level of the home graph hierarchy indicate an absolute volume level for the playback device(s) 102 within that Set. If a Room includes only one Set, then the volume level of the Room is the same as the Set. When a volume level for a Room that includes multiple Sets is adjusted, the volume levels of the multiple Sets are adjusted in proportion to the adjustment of the Room control. For instance, referring to FIG. 17B, if the volume level of the "Dining Room" Room is adjusted downwards by 25% (i.e., a 25% reduction) via the volume slider 1708*a*, then the volume levels of both the "Bookshelf" and "Credenza" Sets are adjusted downwards proportionally by 25% as well. This volume adjustment algorithm works on the same principle for Areas in that a volume adjustment of an Area will cause a proportional change in volume levels of Rooms within that Area.

Under this algorithm, adjustments to volume levels for the lowest level of the home graph hierarchy indicate an absolute volume level for the playback device(s) 102 and do not cause proportional adjustments to higher levels of the home graph hierarchy, which allows individual volume levels (indicating absolute volume) to be de-coupled from higher levels of the home graph hierarchy. For instance, when a volume level for the "Bookshelf" Set is adjusted upwards, the volume level of the "Dining Room" Room is adjusted as well to match the volume level of the "Bookshelf" Set or to match the volume level of the "Credenza" Set if that volume level is higher. Conversely, when a volume level for the "Bookshelf" Set is adjusted downwards, the volume level of the "Dining Room" Room is adjusted as well to match the volume level of the "Bookshelf" Set or to match the volume level of the "Credenza" Set if that volume level is lower. The volume level for the "Credenza" Set remains unchanged by the volume adjustment to the "Bookshelf" Set.

Referring back to FIG. 17B, as noted above, the volume slider 1708*c* controls volume for the "Kitchen+Bedroom" Room Group. As described in section III, since the playback devices 102 in the "Kitchen" and "Bedroom" Rooms are configured to play back in synchrony as part of a Room Group, control commands directed to a constituent Room or Set in the Room Group are carried out by other Sets and Rooms in the Room Group. Accordingly, adjustments to the volume slider 1708*c* affect volume level of the "Kitchen" and "Bedroom" Rooms, as well as the Sets that are in those Rooms. As with Sets, Rooms, and Areas, a volume adjustment algorithm controls the degree of volume adjustment made to constituent Rooms or Sets of a group when the volume level of that group is adjusted. Any suitable volume adjustment algorithm, such as the volume adjustments algorithms described above, can control the volume level of the group and its constituent Rooms and Sets.

To illustrate, using an averaging volume adjustment algorithm, the volume level of a group is the average of its constituent Rooms and/or Sets. For instance, referring to FIG. 17B, the current volume level of the "Kitchen+Bedroom" Room Group is the average of the "Kitchen" and "Bedroom" Rooms. If the volume level of the "Kitchen+Bedroom" Room Group is adjusted upwards via volume slider 1708*c*, then volume levels of both the "Kitchen" and "Bedroom" Rooms are adjusted upwards proportionally such that the increased volume level of the "Kitchen+Bedroom" Room Group remains an average of the volume levels of the "Kitchen" and "Bedroom" Rooms. As another example, if a volume level of the "Kitchen" Room is increased via a voice command (e.g., "turn up the Kitchen"), then the volume level of the "Kitchen+Bedroom" Room Group is increased as well such the its volume level is an average of the volume levels of the such the its volume level is an average of the volume levels of the "Kitchen" and "Bedroom" Rooms.

In various embodiments, the media playback system 100 may incorporate example methods and systems for group volume control described in U.S. Pat. No. 9,654,073 filed Jun. 7, 2013, and titled "Group Volume Control," which is incorporated herein by reference in its entirety.

In various embodiments, the media playback system 100 may incorporate example methods and systems for group volume control described in application Ser. No. 14/205,347 filed Mar. 11, 2014, and titled "Group Volume Control," which is incorporated herein by reference in its entirety.

VII. Example Methods

Figure 18:
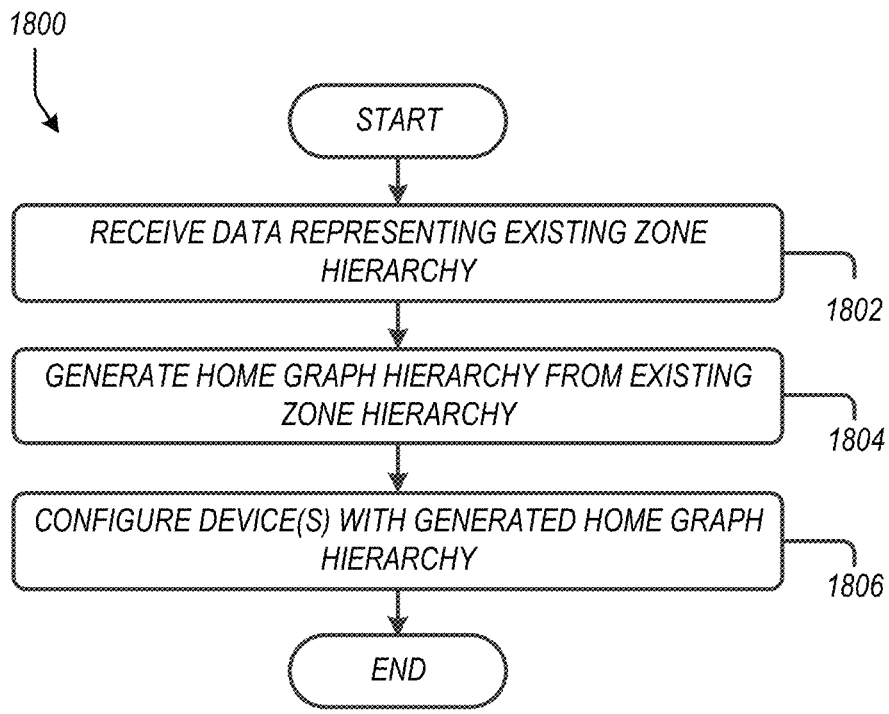
FIG. 18 shows a technique to generate a home graph hierarchy from an existing zone hierarchy.
Figure 19:
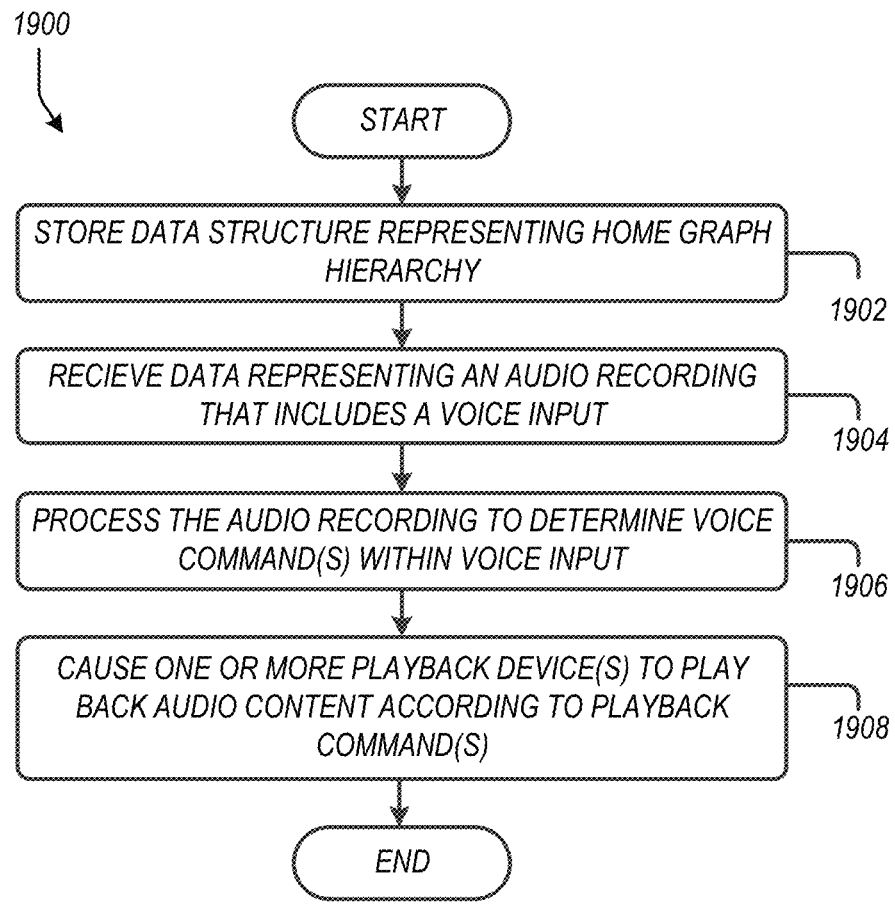
FIG. 19 shows a technique to facilitate VUI control via a home graph hierarchy.
Figure 20:
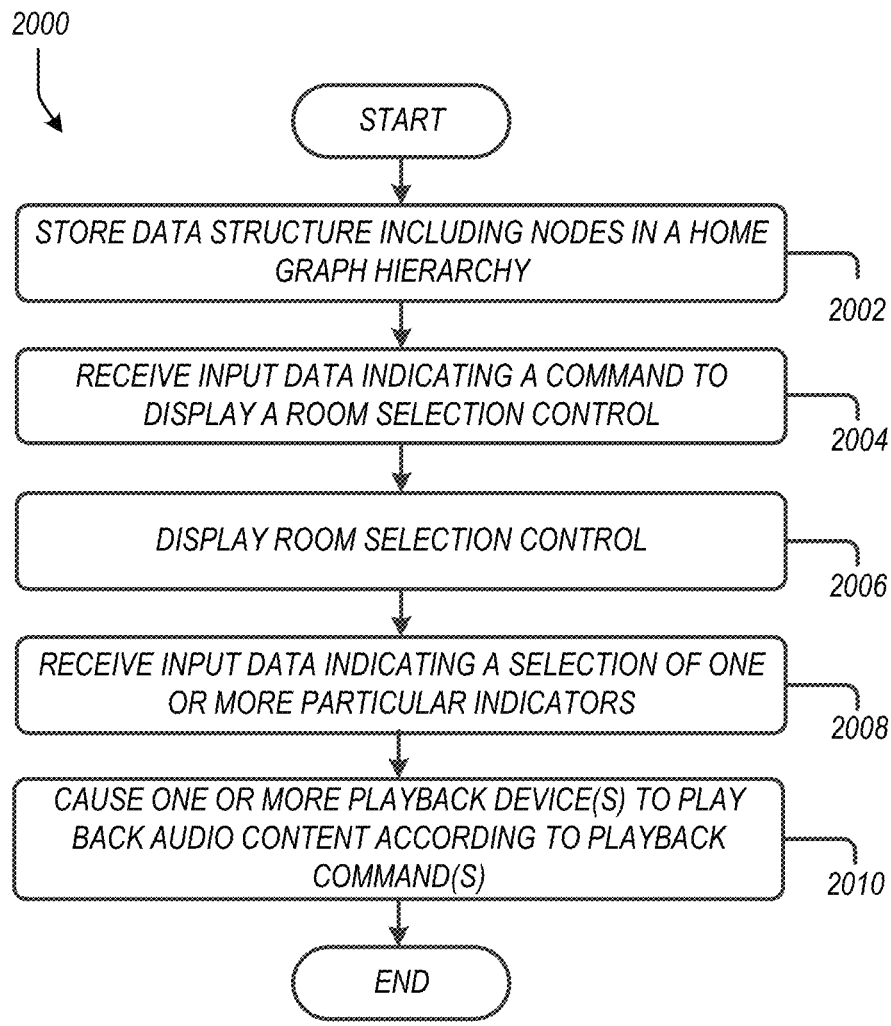
FIG. 20 shows a technique to facilitate GUI control via a home graph hierarchy.

Implementations 1800, 1900, and 2000 shown in FIGS. 18, 19, and 20, respectively present example embodiments of techniques described herein. Implementation 1800, 1900, and 2000 may include one or more operations, functions, or actions as illustrated by one or more of blocks shown in FIGS. 18, 19, and 20. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Example Methods for Home Graph Conversion

As discussed above, embodiments described herein involve home graph conversion. FIG. 18 illustrates an example implementation 1800 of a method by which a system generates a home graph hierarchy from an existing zone hierarchy.

At block 1802, the implementation 1800 involves receiving data representing an existing home group hierarchy. For instance, as described above in connection with FIG. 8A, an auto-generation engine 800 may receive state variables (e.g., a state table) indicating the configuration of one or more playback devices of the media playback system 100 (e.g., one or more of the playback devices 102*a-m*). The state variables indicate the zone names of the respective zones and their configuration as individual devices or bonded zones.

At block 1804, the implementation 1800 involves generating a home graph hierarchy from an existing zone hierarchy. Continuing the example above, the auto-generation engine 800 may reads the configuration of the zones from the state variables and generates Rooms, Sets, Areas, and/or a Home from these configurations as output. For instance, based on the state variables, the auto-generation engine 800 may generate Rooms based on existing zones in the media playback system 100. As shown in FIG. 8A, the configuration of the Living Room zone in the state variables may cause the auto-generation engine 800 to form a Room. The auto-generation engine 800 may assign the new Room with the same name as the zone ("Living Room").

At block 1806, the implementation 1800 involves configuring one or more devices with the generated home graph hierarchy. For example, the auto-generation engine 800 may configure the playback devices 102a, 102b, 102j, and 102k in the Living Room as one or more Sets within the "Living Room" Room. If these devices are configured into a bonded zone, the auto-generation engine 800 may configure these devices as a single set (e.g., a "Living Room TV" Set). Alternatively, the auto-generation engine 800 may configure each device as a respective set (e.g., as "Front," "Right Surround," and "Left Surround" Sets).

b. Example Methods for Voice UI Control Via a Home Graph Hierarchy

As discussed above, embodiments described herein involve VUI control via a home graph hierarchy. FIG. 19 illustrates an example implementation 1900 of a method by which a system facilitates VUI control via a home graph hierarchy.

At block 1902, the implementation 1900 involves storing a data structure that represents a hierarchy, such as the home graph hierarchy described herein. A system may store a data structure that represents smart devices within a household (e.g., those connected via a local area network). As shown in FIG. 9F, the data structure may include nodes in a hierarchal arrangement, such as a tree data structure. The system may include one or more servers of a voice assistant service, as described in connection with FIG. 6. Such servers may store the data structure. Other devices may also or alternatively store the data structure.

In an example, the data structure includes a root node representing the media playback system as a Home of the home graph hierarchy. The data structure further includes one or more first nodes in a first level. The first nodes represent respective devices of the media playback system as Sets of the hierarchy. Other types of smart devices may also be represented as Sets. The data structure also includes one or more second nodes in a second level as parents to one or more respective child first nodes to represent Sets in respective Rooms of the hierarchy. The nodes in the hierarchy are assigned respective names to facilitate referring to the nodes using voice input. An example of such a home graph hierarchy is illustrated in FIG. 9F. In further examples, the home graph hierarchy may include one or more third nodes in a third level as parents to one or more respective child second nodes to represent Rooms in respective Areas of the hierarchy.

At block 1904, the implementation 1900 involves receiving data representing an audio recording. For instance, the system may receive data representing an audio recording from a NMD. The NMD may capture voice inputs in audio recordings as described in connection with FIG. 9A.

In an example, an NMD records, via a microphone array, audio into a buffer and monitors the recorded audio for wake-words. When a wake-word is detected in the recorded audio, the NMD sends, via a network interface to the voice assistant service, data representing an audio recording from the buffer of the NMD. The audio recording includes a voice input following the detected wake-word within the buffer.

At block 1906, the implementation 1900 involves processing the audio recording to determine one or more voice commands within the voice input. As described in connection with FIGS. 9A-9E, a voice input may include various types of commands such as playback, control, targeting, and inquiry commands, among others. Example processing is described in connection with these figures.

As noted above, the voice input may include targeting commands. In processing the voice input, the system may determine that one or more first voice commands within the voice input represent respective target variables. Further, the system may determine that the target variables indicate one or more particular nodes of the data structure by referencing a name assigned to a respective node of the data structure. These target variables may indicate nodes on any level of the home graph hierarchy, including nodes that represent Sets, Rooms, Areas, or the Home.

The system may perform a search of the nodes of the data structure to determine which nodes are indicated by the target variables. Using the target variable(s) as the search key, the system may look for nodes having values (i.e., assigned names) that match the target variables. In an example, the data structure defines a tree and the system searches by traversing the tree.

As also noted above, the voice input may include playback commands, such as playback initiation or control commands. The system may determine that one or more second voice commands within the voice input correspond to one or more playback commands. Example playback commands are described above.

At block 1908, the implementation 1900 involves causing one or more playback devices to play back audio content according to the one or more playback commands. The particular one or more playback devices that play back the audio content include all playback devices represented by the one or more particular nodes of the data structure, as well as all playback devices represented by child nodes of the one or more particular nodes of the data structure. For instance, referring back to FIG. 9F, if the target variables indicate the "Dining Room" Room, then the "Bookshelf" Set and the "Credenza" Set play back the audio content. As another example, the target variables indicate the "Nook" Set, then the "Nook" Set plays back the audio content.

As noted above, in further examples, the home graph hierarchy may include one or more third nodes in a third level as parents to one or more respective child second nodes to represent Rooms in respective Areas of the hierarchy. As illustrated in FIG. 9F, if the target variables indicate the "Front Area" then all child nodes of the Front Area play back the audio content (i.e., the "Living Room TV" Set, the "Bookshelf" Set, the "Credenza" Set, and the "Sink" Set. The target variable may also indicate the Home node (e.g., by reference to "Nick's Room" or "everywhere"), which causes all playback devices represented in the hierarchy to play back the audio content.

c. Example Methods for Graphical UI Control Via a Home Graph Hierarchy

As discussed above, embodiments described herein involve GUI control via a home graph hierarchy. FIG. 20 illustrates an example implementation 2000 of a method by which a system facilitates GUI control via a home graph hierarchy.

At block 2002, the implementation 2000 involves storing a data structure that represents a hierarchy, such as the home graph hierarchy described herein. A system may store a data structure that represents smart devices within a household (e.g., those connected via a local area network). As shown in FIG. 9F, the data structure may include nodes in a hierarchal arrangement, such as a tree data structure. In an example, a control device may store the data structure to facilitate GUI control via a home graph hierarchy. As described above, one or more servers of a voice assistant service may also or alternatively store the data structure.

In an example, the data structure includes a root node representing the media playback system as a Home of the home graph hierarchy. The data structure further includes one or more first nodes in a first level. The first nodes represent respective devices of the media playback system as Sets of the hierarchy. Other types of smart devices may also be represented as Sets. The data structure also includes one or more second nodes in a second level as parents to one or more respective child first nodes to represent Sets in respective Rooms of the hierarchy. The nodes in the hierarchy are assigned respective names to facilitate referring to the nodes using voice input. An example of such a home graph hierarchy is illustrated in FIG. 9F.

At block 2004, the implementation 2000 involves receiving input data indicating a command to display a room selection control. For instance, a control device may receive, via a control application, input data indicating a command to display a room selection control. In some implementations, control device includes a touch-screen graphical display and the input data includes touch-input data.

At block 2006, the implementation 2000 involves displaying the room selection control. For example, the control device may display, via the control application on a graphical display, the room selection control. Example room selection controls are described in connection with FIGS. 16B, 16C, 16D, 16f, and 16H.

The room selection control includes multiple indicators corresponding to respective nodes in the data structure representing the hierarchy. The multiple indicators may include first indicators corresponding to respective first nodes of the one or more first nodes in the data structure and second indicators corresponding to respective second nodes of the one or more second nodes in the data structure. The first indicators represent respective Sets via the assigned respective names and the second indicators represent respective Rooms via the assigned respective names. Example first indicators include selectable control 1602 and example second indicators include selectable control 1604 shown in FIGS. 16B and 16C. Selectable control 1605 shown in FIG. 16D is another example of first and second indicators.

In some examples, the multiple indicators may further include third indicators corresponding to respective third nodes of the one or more third nodes in the data structure. The third indicators represent respective Areas via the assigned respective names. Selectable control 1606 shown in FIG. 16F is an example of a third indicator.

Yet further, the multiple indicators may include a fourth indicator corresponding to the root node in the data structure. As noted above, the root node represents the entire Home in the Home Graph hierarchy. Selectable control 1607 shown in FIG. 16H is an example of a fourth indicator.

At block 2008, the implementation 2000 involves receiving input data indicating a selection of one or more particular indicators. For instance, the control device may receive, via the displayed room selection control, input data indicating a selection of one or more particular indicators of the multiple indicators. These one or more particular indicators correspond to one or more particular nodes of the hierarchy.

At block 2010, the implementation 2000 involves causing one or more playback devices to play back audio content according to the one or more playback commands. The particular one or more playback devices that play back the audio content include all playback devices represented by the one or more particular nodes of the data structure, as well as all playback devices represented by child nodes of the one or more particular nodes of the data structure.

For instance, referring back to FIG. 16B, if selectable controls 1602b and 1602d are selected, then the "Dining Room" Room and the "Living Room" Rooms play back the audio content. Since the "Dining Room" Room includes the "Bookshelf" Set and the "Credenza" Set, these playback devices play back the audio content. The "Living Room" Room includes the "Living Room" Set, so this set plays back the audio content in synchrony with the "Bookshelf" Set and the "Credenza" Set.

FIGS. 16F and 16H indicate further examples. If selectable control 1606 is selected, then all Rooms with the "Downstairs" Area play back the audio content (including all Sets including playback devices within those Rooms). If selectable control 1607 is selected, then all Sets that include a playback device play back the audio content.

As described above, the example control hierarchy may facilitate other types of control, such as volume control. In an example, the control device receives, via the control application, input data indicating a command to display a volume control and then displays, via the control application on the graphical display, the volume control. The volume control may include volume sliders, knobs, or other types of volume controls. Volume control may correspond to respective nodes in the data structure. FIGS. 17A and 17B illustrate example volume sliders 1708 and 1710. An adjustments to a volume slider representing a particular node cause adjustment of the playback device corresponding to that node as well as any playback devices represented by child nodes to the particular node.

VIII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:
   a network microphone device (NMD) comprising a microphone array;
   a network interface;
   at least one processor; and
   at least one non-transitory computer-readable medium comprising program instructions that are executable by the at least one processor such that the system is configured to:
   store a data structure comprising nodes in a hierarchy representing interconnected devices, wherein the data structure comprises (i) a root node representing a structure, (ii) one or more first nodes in a first level, the first nodes representing respective devices and (iii) one or more second nodes in a second level as parents to one or more respective child first nodes, the second nodes representing respective rooms of the structure, wherein the rooms are labeled with respective room names;
   record, via the microphone array of the NMD, audio into a buffer, wherein the NMD is configured into a first room of the structure in the stored data structure;
   monitor the recorded audio for at least one keyword;
   when the at least one keyword is detected in the recorded audio, process a voice input within a portion of the recorded audio comprising the at least one keyword, wherein the program instructions that are executable by the at least one processor such that the system is configured to process the voice input comprise program instructions that are executable by the at least one processor such that the system is configured to:
   (i) determine that the voice input comprises at least one smart home command for a particular device type, wherein the voice input excludes keywords corresponding to the respective room names; and
   (ii) determine that keywords representing target variables indicating one or more particular nodes of the data structure are not recognized in the voice input; and
   (iii) determine, based on the stored data structure, that the first room of the structure includes at least one first smart home device of the particular device type, wherein a second room of the structure includes a second smart home device of the particular device type; and
   cause, via the network interface, the at least one first smart home device to carry out the at least one smart home command.

2. The system of claim 1, wherein the program instructions that are executable by the at least one processor such that the system is configured to process the voice input comprise program instructions that are executable by the at least one processor such that the system is configured to:
search the stored data structure for smart home devices of the particular device type that have the same parent node as the NMD, wherein the program instructions that are executable by the at least one processor such that the system is configured to determine, based on the stored data structure, that the first room of the structure includes the at least one first smart home device of the particular device type comprise program instructions that are executable by the at least one processor such that the system is configured to:
   determine, based on the search of the stored data structure, that the first room of the structure includes the at least one first smart home device of the particular device type.

3. The system of claim 2, wherein the stored data structure defines a tree, and wherein the program instructions that are executable by the at least one processor such that the system is configured to search the stored data structure for the smart home devices of the particular device type that have the same parent node as the NMD comprise program instructions that are executable by the at least one processor such that the system is configured to:
   traverse the tree to search for nodes that are under the same parent node as the NMD.

4. The system of claim 3, wherein the program instructions that are executable by the at least one processor such that the system is configured to traverse the tree comprise program instructions that are executable by the at least one processor such that the system is configured to:
   traverse the tree in level order beginning with a particular first node representing the NMD.

5. The system of claim 1, wherein the particular device type is an illumination device, and wherein the program instructions that are executable by the at least one processor such that the system is configured to cause the at least one first smart home device to carry out the at least one smart home command comprise program instructions that are executable by the at least one processor such that the system is configured to:
   cause, via the network interface, the at least one first smart home device to toggle an illumination state of the at least one first smart home device.

6. The system of claim 1, wherein the particular device type is a playback device, and wherein the program instructions that are executable by the at least one processor such that the system is configured to cause the at least one first smart home device to carry out the at least one smart home command comprise program instructions that are executable by the at least one processor such that the system is configured to:
   cause, via the network interface, the at least one first smart home device to change a playback state of the at least one first smart home device.

7. The system of claim 1, wherein the at least one non-transitory computer-readable medium further comprises program instructions that are executable by the at least one processor such that the system is configured to:
   when at least one additional keyword is detected in the recorded audio, process an additional voice input within an additional portion of the audio recording comprising the at least one additional keyword, wherein the program instructions that are executable by the at least one processor such that the system is configured to process the additional voice input comprise program instructions that are executable by the at least one processor such that the system is configured to:

(i) determine, based on the stored data structure, that one or more additional keywords within the additional voice input represent respective target variables indicating one or more particular nodes of the data structure; and (ii) determine that the voice input comprises at least one additional smart home command; and cause, via the network interface, one or more particular smart home devices to carry out the at least one additional smart home command, wherein the one or more particular smart home devices include (a) all smart home devices represented by the one or more particular nodes of the data structure and (b) all playback devices represented by child nodes of the one or more particular nodes of the data structure.

8. The system of claim 7, wherein the program instructions that are executable by the at least one processor such that the system is configured to determine that the one or more additional keywords within the additional voice input represent respective target variables indicating the one or more particular nodes of the data structure comprise program instructions that are executable by the at least one processor such that the system is configured to:

determine that at least one additional keyword within the voice input represents a particular target variable referencing a name of a particular second node representing a particular room, the particular room including the second smart home device and a third smart home device, and wherein the program instructions that are executable by the at least one processor such that the system is configured to cause the one or more particular smart home devices to carry out the at least one additional smart home command comprise program instructions that are executable by the at least one processor such that the system is configured to:

cause the first smart home device and the second smart home device to carry out the at least one additional smart home command.

9. The system of claim 8, wherein the second smart home device comprises a first playback device and the third smart home device comprises a second playback device, and wherein the program instructions that are executable by the at least one processor such that the system is configured to cause the first smart home device and the second smart home device to carry out the one or more particular smart home devices to carry out the at least one additional smart home command comprise program instructions that are executable by the at least one processor such that the system is configured to:

cause the first playback device and the second playback device to play back audio content in synchrony.

10. A network microphone device (NMD) comprising:
a microphone array;
at least one processor; and
at least one non-transitory computer-readable medium comprising program instructions that are executable by the at least one processor such that the NMD is configured to:
store a data structure comprising nodes in a hierarchy representing interconnected devices, wherein the data structure comprises (i) a root node representing a structure, (ii) one or more first nodes in a first level, the first nodes representing respective devices and (iii) one or more second nodes in a second level as parents to one or more respective child first nodes, the second nodes representing respective rooms of the structure, wherein the rooms are labeled with respective room names;

record, via the microphone array of the NMD, audio into a buffer, wherein the NMD is configured into a first room of the structure in the stored data structure;

monitor the recorded audio for at least one keyword;

when the at least one keyword is detected in the recorded audio, process a voice input within a portion of the recorded audio comprising the at least one keyword, wherein the program instructions that are executable by the at least one processor such that the NMD is configured to process the voice input comprise program instructions that are executable by the at least one processor such that the NMD is configured to:

(i) determine that the voice input comprises at least one smart home command for a particular device type, wherein the voice input excludes keywords corresponding to the respective room names; and (ii) determine that keywords representing target variables indicating one or more particular nodes of the data structure are not recognized in the voice input; and (iii) determine, based on the stored data structure, that the first room of the structure includes at least one first smart home device of the particular device type, wherein a second room of the structure includes a second smart home device of the particular device type; and cause, via a network interface, the at least one first smart home device to carry out the at least one smart home command.

11. The NMD of claim 10, wherein the program instructions that are executable by the at least one processor such that the NMD is configured to process the voice input comprise program instructions that are executable by the at least one processor such that the NMD is configured to:

search the stored data structure for smart home devices of the particular device type that have the same parent node as the NMD, wherein the program instructions that are executable by the at least one processor such that the NMD is configured to determine, based on the stored data structure, that the first room of the structure includes the at least one first smart home device of the particular device type comprise program instructions that are executable by the at least one processor such that the NMD is configured to:

determine, based on the search of the stored data structure, that the first room of the structure includes the at least one first smart home device of the particular device type.

12. The NMD of claim 11, wherein the stored data structure defines a tree, and wherein the program instructions that are executable by the at least one processor such that the NMD is configured to search the stored data structure for the smart home devices of the particular device type that have the same parent node as the NMD comprise program instructions that are executable by the at least one processor such that the NMD is configured to:

traverse the tree to search for nodes that are under the same parent node as the NMD.

13. The NMD of claim 12, wherein the program instructions that are executable by the at least one processor such that the NMD is configured to traverse the tree comprise program instructions that are executable by the at least one processor such that the NMD is configured to:

traverse the tree in level order beginning with a particular first node representing the NMD.

14. The NMD of claim 10, wherein the particular device type is an illumination device, and wherein the program instructions that are executable by the at least one processor such that the NMD is configured to cause the at least one first smart home device to carry out the at least one smart home command comprise program instructions that are executable by the at least one processor such that the NMD is configured to:

cause, via the network interface, the at least one first smart home device to toggle an illumination state of the at least one first smart home device.

15. The NMD of claim 10, wherein the particular device type is a playback device, and wherein the program instructions that are executable by the at least one processor such that the NMD is configured to cause the at least one first smart home device to carry out the at least one smart home command comprise program instructions that are executable by the at least one processor such that the NMD is configured to:

cause, via the network interface, the at least one first smart home device to change a playback state of the at least one first smart home device.

16. The NMD of claim 10, wherein the at least one non-transitory computer-readable medium further comprises program instructions that are executable by the at least one processor such that the NMD is configured to:

when at least one additional keyword is detected in the recorded audio, process an additional voice input within an additional portion of the audio recording comprising the at least one additional keyword, wherein the program instructions that are executable by the at least one processor such that the NMD is configured to process the additional voice input comprise program instructions that are executable by the at least one processor such that the NMD is configured to:
(i) determine, based on the stored data structure, that one or more additional keywords within the additional voice input represent respective target variables indicating one or more particular nodes of the data structure; and
(ii) determine that the voice input comprises at least one additional smart home command; and
cause, via the network interface, one or more particular smart home devices to carry out the at least one additional smart home command, wherein the one or more particular smart home devices include (a) all smart home devices represented by the one or more particular nodes of the data structure and (b) all playback devices represented by child nodes of the one or more particular nodes of the data structure.

17. The NMD of claim 16, wherein the program instructions that are executable by the at least one processor such that the NMD is configured to determine that the one or more additional keywords within the additional voice input represent respective target variables indicating the one or more particular nodes of the data structure comprise program instructions that are executable by the at least one processor such that the NMD is configured to:

determine that at least one additional keyword within the voice input represents a particular target variable referencing a name of a particular second node representing a particular room, the particular room including the second smart home device and a third smart home device, and wherein the program instructions that are executable by the at least one processor such that the NMD is configured to cause the one or more particular smart home devices to carry out the at least one additional smart home command comprise program instructions that are executable by the at least one processor such that the NMD is configured to:

cause the first smart home device and the second smart home device to carry out the one or more particular smart home devices to carry out the at least one additional smart home command.

18. The NMD of claim 17, wherein the second smart home device comprises a first playback device and the third smart home device comprises a second playback device, and wherein the program instructions that are executable by the at least one processor such that the NMD is configured to cause the first smart home device and the second smart home device to carry out the one or more particular smart home devices to carry out the at least one additional smart home command comprise program instructions that are executable by the at least one processor such that the NMD is configured to:

cause the first playback device and the second playback device to play back audio content in synchrony.

19. At least one non-transitory computer-readable medium comprising program instructions that are executable by at least one processor such that a system is configured to:

store a data structure comprising nodes in a hierarchy representing interconnected devices, wherein the data structure comprises (i) a root node representing a structure, (ii) one or more first nodes in a first level, the first nodes representing respective devices and (iii) one or more second nodes in a second level as parents to one or more respective child first nodes, the second nodes representing respective rooms of the structure, wherein the rooms are labeled with respective room names;
record, via a microphone array of a network microphone device (NMD), audio into a buffer, wherein the NMD is configured into a first room of the structure in the stored data structure;
monitor the recorded audio for at least one keyword;
when the at least one keyword is detected in the recorded audio, process a voice input within a portion of the recorded audio comprising the at least one keyword, wherein the program instructions that are executable by the at least one processor such that the system is configured to process the voice input comprise program instructions that are executable by the at least one processor such that the system is configured to:
(i) determine that the voice input comprises at least one smart home command for a particular device type, wherein the voice input excludes keywords corresponding to the respective room names; and
(ii) determine that keywords representing target variables indicating one or more particular nodes of the data structure are not recognized in the voice input; and
(iii) determine, based on the stored data structure, that the first room of the structure includes at least one first smart home device of the particular device type, wherein a second room of the structure includes a second smart home device of the particular device type; and
cause, via a network interface, the at least one first smart home device to carry out the at least one smart home command.

20. The at least one non-transitory computer-readable medium of claim 19, wherein the program instructions that are executable by the at least one processor such that the system is configured to process the voice input comprise program instructions that are executable by the at least one processor such that the system is configured to:
- search the stored data structure for smart home devices of the particular device type that have the same parent node as the NMD, wherein the program instructions that are executable by the at least one processor such that the system is configured to determine, based on the stored data structure, that the first room of the structure includes the at least one first smart home device of the particular device type comprise program instructions that are executable by the at least one processor such that the system is configured to:
- determine, based on the search of the stored data structure, that the first room of the structure includes the at least one first smart home device of the particular device type.

* * * * *